(12) United States Patent
Zaveri et al.

(10) Patent No.: US 9,965,151 B2
(45) Date of Patent: May 8, 2018

(54) SYSTEMS AND METHODS FOR GRAPHICAL USER INTERFACE INTERACTION WITH CLOUD-BASED APPLICATIONS

(71) Applicant: CLOUDON LTD, Herzliya (IL)

(72) Inventors: Jay Zaveri, Campbell, CA (US); Doron Yaacoby, Kfar Vitkin (IL); Alyssa Woodman, Sunnyvale, CA (US); Jerome Domurat, Los Gatos, CA (US)

(73) Assignee: CLOUDON LTD., Herzliya (IL)

( * ) Notice: Subject to any disclaimer, the term of this patent is extended or adjusted under 35 U.S.C. 154(b) by 1183 days.

(21) Appl. No.: 13/870,936

(22) Filed: Apr. 25, 2013

(65) Prior Publication Data

US 2013/0246932 A1    Sep. 19, 2013

Related U.S. Application Data

(63) Continuation-in-part of application No. 13/608,971, filed on Sep. 10, 2012.
(Continued)

(51) Int. Cl.
*G06F 3/0484* (2013.01)
*G06F 3/01* (2006.01)
(Continued)

(52) U.S. Cl.
CPC .......... *G06F 3/0484* (2013.01); *G06F 3/017* (2013.01); *G06F 3/04815* (2013.01); *G06F 3/04883* (2013.01); *G06F 9/4445* (2013.01)

(58) Field of Classification Search
CPC ........ G06F 3/016; G06F 21/00; G06F 3/0481; G06F 1/163; G06F 3/011
See application file for complete search history.

(56) References Cited

U.S. PATENT DOCUMENTS 7,676,549 B2    3/2010 McKeon et al.
2007/0180449 A1    8/2007 Croft et al.
(Continued)

FOREIGN PATENT DOCUMENTS

WO    2013/036920 A1    3/2013
WO    2013/036959 A1    3/2013

OTHER PUBLICATIONS

International Application No. PCT/US2012/054509, International Search Report and Written Opinion dated Nov. 20, 2012.
(Continued)

*Primary Examiner* — Jeffrey A Gaffin
*Assistant Examiner* — Mandrita Brahmachari
(74) *Attorney, Agent, or Firm* — DLA Piper LLP US

(57) ABSTRACT

Systems and methods may: execute a virtualized application instance in a virtual computing environment; receive from a remote client device first object data relating to a first set of user interactions received with respect to a client-side graphical use interface (GUI) object at the remote client device, the client-side GUI object representing a GUI object of the virtualized application instance; translating the first object data to second object data relating to the GUI object of the virtualized application instance, the second object data executing a command when applied to the GUI object of the virtualized application instance; and synchronizing the GUI object of the virtualized application instance with the client-side GUI object by applying the second object data to the GUI object of the virtualized application instance.

22 Claims, 41 Drawing Sheets

Related U.S. Application Data

(60) Provisional application No. 61/533,135, filed on Sep. 9, 2011, provisional application No. 61/714,709, filed on Oct. 16, 2012, provisional application No. 61/714,710, filed on Oct. 16, 2012.

(51) Int. Cl.
*G06F 3/0488* (2013.01)
*G06F 3/0481* (2013.01)
*G06F 9/44* (2018.01)

(56) References Cited

U.S. PATENT DOCUMENTS

| | | | |
|---|---|---|---|
| 2007/0271428 | A1 | 11/2007 | Atluri |
| 2008/0183641 | A1 | 7/2008 | Tang et al. |
| 2009/0172557 | A1* | 7/2009 | Muta .................. 715/740 |
| 2009/0182778 | A1 | 7/2009 | Tormasov |
| 2009/0183182 | A1 | 7/2009 | Parthasarathy et al. |
| 2010/0011301 | A1 | 1/2010 | Binyamin |
| 2010/0031203 | A1 | 2/2010 | Morris et al. |
| 2010/0211920 | A1 | 8/2010 | Westerman et al. |
| 2010/0235830 | A1* | 9/2010 | Shukla et al. .................. 718/1 |
| 2010/0259491 | A1 | 10/2010 | Rajamani et al. |
| 2010/0269048 | A1 | 10/2010 | Pahlavan et al. |
| 2010/0269152 | A1* | 10/2010 | Pahlavan et al. .................. 726/3 |
| 2010/0306682 | A1 | 12/2010 | Williamson |
| 2011/0184993 | A1 | 7/2011 | Chawla et al. |
| 2011/0202837 | A1 | 8/2011 | Fong et al. |
| 2011/0246904 | A1 | 10/2011 | Pinto et al. |
| 2011/0265164 | A1 | 10/2011 | Lucovsky et al. |
| 2012/0096365 | A1 | 4/2012 | Wilkinson et al. |
| 2012/0166516 | A1 | 6/2012 | Simmons et al. |
| 2012/0167044 | A1 | 6/2012 | Fortier et al. |
| 2012/0226742 | A1 | 9/2012 | Momchilov et al. |
| 2012/0327009 | A1 | 12/2012 | Fleizach |
| 2013/0219322 | A1 | 8/2013 | Cranfill et al. |

OTHER PUBLICATIONS

International Application No. PCT/US2012/054440, International Search Report and Written Opinion dated Nov. 27, 2012.

Miller, Michael, "Googlepedia: The Ultimate Google Resource," Third Edition, Que Publishing, pp. 276 and 283, Oct. 29, 2008.

Vaughan-Nichols, Steven J., "Dropbox and Google Docs Integration may be on its way," ZDNet, Jan. 16, 2011 [retrieved from http://www.zdnet.com/blog/networking/dropbox-and-google-docs-integration-may-be-on-its-way/564 on Aug. 1, 2014].

International Application No. PCT/IB13/03131, International Search Report and Written Opinion dated May 21, 2014.

International Application No. PCT/IB13/03035, International Search Report and Written Opinion dated Jun. 18, 2014.

Box.net Makes Viewing Files Online Easier by Christina Warren, Mashable, http://mashable.com/2010/01/21/box-integrated-file-viewer/#1OLwgVVeNOgM, Jan. 21, 2010.

\* cited by examiner

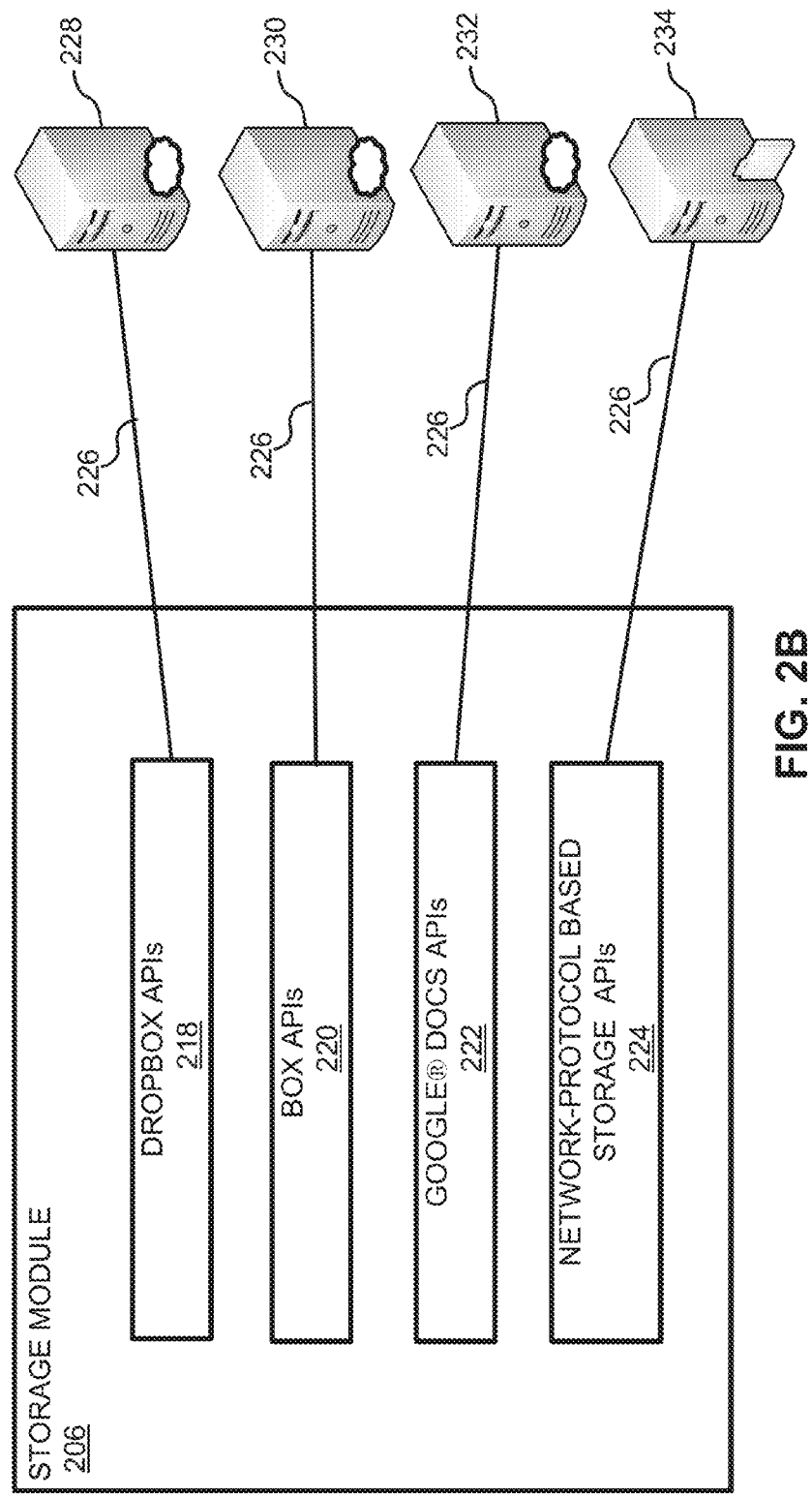

SYSTEMS AND METHODS FOR GRAPHICAL USER INTERFACE INTERACTION WITH CLOUD-BASED APPLICATIONS

CROSS-REFERENCE TO RELATED APPLICATIONS

The present application is a continuation-in-part of and claims the benefit of U.S. patent application Ser. No. 13/608,971, filed Sep. 10, 2012, entitled "Systems and Methods for Gesture Interaction with Cloud-Based Applications," which claims the benefit of U.S. Provisional Patent Application No. 61/533,135, filed Sep. 9, 2011, entitled "Systems and Methods for Workspace and Gesture Interaction with Cloud-Based Enterprise Applications," each of which is incorporated by reference herein. The present application also claims the benefit of U.S. Provisional Patent Application Ser. No. 61/714,709, filed Oct. 16, 2012, entitled "Systems and Methods for Graphical User Interface Interaction with Cloud-Based Applications," and U.S. Provisional Patent Application Ser. No. 61/714,710, filed Oct. 16, 2012, entitled "Systems and Methods for Object-Based Interaction with Cloud-Based Applications," each of which is incorporated by reference herein. The present application also incorporates by reference U.S. patent application Ser. No. 13/870,918, filed Apr. 25, 2013, entitled "Systems and Methods for Object-Based Interaction with Cloud-Based Applications."

BACKGROUND

1. Technical Field

The present invention(s) generally relate to server-based computing and, more particularly, relate to providing a client with workspace interaction with cloud-based applications.

2. Description of Related Art

In a server-based computing environment, hardware upgrades, application deployment, technical support, and/or data storage can be provided by one or more terminal application servers. As such, use of server-based computing to support multiple clients can reduce application costs and ensure that applications are accessible by some or all of the supported clients. Server-based computing also provides enhanced security and eliminates the need for patch through software upgrades to a plurality of different clients. Traditionally, server-based computing has been implemented by way of remote desktop computing or remote application computing.

With remote desktop computing, one or more terminal application servers provide one or more clients with access to a plurality of software applications, and manage data transfers to each client through a separate data communication line. Generally, users access the terminal server through their end user devices (also known as "clients" or "client devices") by authenticating into a network with a username and password, with an access card, based on biometric information, or by any other authentication method. Upon establishing a remote desktop computing session, each client serves as a remote desktop display capable of displaying applications which are provided by the terminal application server. The remote desktop is created by and handled within the terminal application server based on applications installed on the terminal application server. The clients also allow users to input data through a mouse, keyboard, or the like, such that the users can interact with the application provided by the terminal application server.

Unfortunately, traditional remote desktop computing is limited by the inability of the terminal server to provide access to disparate operating systems (e.g., a traditional terminal server configured to provide Microsoft® Windows® operating system is not capable of providing Apple® OS X®-operating system), thereby requiring a user of remote desktop computing to interface with different terminal servers for access to different operating systems. Traditional remote desktop computing is also limited by the inability of the terminal server to provide the operating system with embedded access to a third-party, cloud-based storage (e.g., those provided by Dropbox, Box, or Google® Docs).

In remote application computing, a plurality of terminal application servers are used, each of which is dedicated to one or more applications. A user can use a remote client to authenticate through a network and access the terminal application server corresponding to a desired application. A single communication line is established between the client and the terminal application server for each application which is provided to the user.

Unfortunately, like remote desktop computing, traditional remote application computing also suffers from various limitations, such as requiring a data communication channel for each provided application, resulting in a need for excessive bandwidth. This is particularly true when traditional remote application computing is utilized to provide access to two or more applications developed to run on different operating system (e.g., a traditional terminal application server configured to serve Microsoft® Windows®-compatible applications is not capable of providing Apple® OS X®-compatible applications). Consequently, users of traditional remote application computing access applications of differing operating system compatibilities with separate connections to disparate traditional terminal application servers, each configured to operate a different operating system. This also results in excessive bandwidth usage, as each connection requires a separate data communication channel. Furthermore, traditional remote application computing lacks the ability to provide applications with embedded/in-application access to files located on third-party, cloud-based storage.

SUMMARY

Various systems and methods described herein relate to server-based computing, where the systems and methods may implement graphical user interface (GUI) interaction between a client device and a virtualized application instance operating on a server (e.g., cloud-based server). In particular, various embodiments permit mapping of a graphical user interface (GUI) element (hereinafter, also referred to as "GUI object") presented by a virtualized application instance (e.g., as video output), to a graphical user interface elements (GUI) presented by a remote device that is controlling the virtualized application instance. The various embodiments enable user interactions received at a remote client device with respect to client-side GUI objects to be mapped to user interactions with respect to GUI objects of the virtualized application. By doing so, client-side GUI objects native and/or enhanced to the operating environment the remote client device can be utilized in place of GUI objects of the virtualized application instance as the remote client device controls the virtualized application instance. This may be particularly useful where the virtualized application instance may be running in an operating environment that is different from that of the remote client device and/or where the virtualized application instance is not compatible with or enhanced for the remote client device. For instance, with respect to touch-based remote client device, the client-side GUI objects may be larger in size, visually enhanced, touch or gesture-enabled, and native GUI types, while the virtualized application instance the touch-based remote client device is control may be configured for mouse and keyboard control using a display larger than that of the remote client device.

In some instances, while the graphical user interface (GUI) elements of the remote client device replace and/or are disposed over the graphical user interface (GUI) elements being presented by the virtualized application instance, the document content presented by the virtualized application instance (e.g., document viewing area presented in the video output) is provided to and viewable by the remote client device.

Some embodiments provide for server-side systems and/or methods that: execute a virtualized application instance in a virtual computing environment; receive from a remote client device first object data relating to a first set of user interactions (e.g., input events, such as mouse events or gesture events) received with respect to a client-side graphical use interface (GUI) object at the remote client device, the client-side GUI object representing a GUI object of the virtualized application instance; translating the first object data to second object data relating to the GUI object of the virtualized application instance (hereinafter also referred to as a "server-side GUI object"), the second object data executing a command when applied to the GUI object of the virtualized application instance; and synchronizing the GUI object of the virtualized application instance with the client-side GUI object by applying the second object data to the GUI object of the virtualized application instance.

For some embodiments, the second object data comprises a second set of user interactions (e.g., input events, such as mouse events or keyboard events) intended for the GUI object of the virtualized application instance. According to some embodiments, the application of the second object data to the GUI object of the virtualized application instance comprises performing the second set of user interactions with respect to the client-side GUI object.

In particular embodiments, the system and/or method may further capture context data for the GUI object of the virtualized application instance, and such context data transmitted to the remote client device as third object data. For instance, the system and/or method may capture the current graphical representation of the GUI object of the virtualized application instance, such as its position, size, color, orientation, visibility, or text as it is presented in the video output of the virtualized application instance.

For various embodiments, the client-side GUI object and/or the GUI object of the virtualized application instance may be a text box, a dialog box, a button, a drop down box, a toolbar, a toolbar item, a menu, a menu item, a radio option, or a check box. Others can include those configured for or enhanced for particular input methodologies including, for example, touch-enabled, gesture-enabled, and motion-enabled input methods.

Some embodiments provide for client-side systems and methods that: present a virtualized application instance operating in a virtual computing environment on a remote server; receive a set of user interactions with respect to a client-side graphical user interface (GUI) object, the client-side GUI object representing a GUI object of the virtualized application instance; provide first object data relating to the set of user interactions received with respect to the client-side GUI object; transmit to the remote server the first object data; receive from the remote server the second object data; and synchronize the client-side GUI object with the GUI object of the virtualized application instance based on second object data relating to the GUI object of the virtualized application instance.

In some embodiments, the second object data comprising context data relating to the GUI object of the virtualized application instance. For example, the context data relating to the GUI object of the virtualized application instance could include the graphical representation of the GUI object as presented by the virtualized application instance through its video output. Accordingly, in certain embodiments, the synchronization of the client-side GUI object with the GUI object of the virtualized application instance may comprise updating a current graphical representation of the client-side GUI object according to a current graphical representation of the GUI object of the virtualized application instance based on the second object data.

According to certain embodiments, a method is provided, comprising operations described herein. Likewise, embodiments may be implemented as a computer program product comprising computer instruction codes configured to cause the computer system to perform the operations described herein.

Other features and aspects of various embodiments will become apparent from the following detailed description, taken in conjunction with the accompanying drawings, which illustrate, by way of example, the features of such embodiments.

BRIEF DESCRIPTION OF THE DRAWINGS

Various embodiments are described in detail with reference to the following figures. The drawings are provided for purposes of illustration only and merely depict some embodiments. These drawings shall not be considered limiting of the breadth, scope, or applicability of embodiments.

FIG. 2B is a block diagram illustrating an exemplary storage module that is part of an exemplary system for providing application access in accordance with various embodiments.

DETAILED DESCRIPTION

Various systems and methods described herein relate to server-based computing, where systems and methods provide a computing device with access to an application that is executing remotely from the computing device and that has access to data (e.g., one or more files) residing on a cloud-based storage (e.g., provided by a third-party cloud-based storage service). For some systems and methods, the application may be remotely executed and provided such that the application accessed by a user has native access to a cloud-based storage, and data (e.g., files) residing on the cloud-based storage. In this way, various embodiments may provide a user on a client device with universal and agnostic access to applications that would otherwise be non-operable on the client device, and permit such applications with universal and/or agnostic access to cloud-based storage services that are otherwise disconnected from, disparate from, or incompatible with the accessed applications. Additionally, some embodiments may permit an original application, natively operating on the client device but incompatible with a particular file (e.g., an e-mail application operating on the client device attempting to open a spreadsheet file otherwise incompatible with e-mail application), to upload the file to a cloud-based storage service, and enable a remotely execution application, provided in accordance with the embodiments, compatible with the file, and capable of accessing the cloud-based storage service, open the file on behalf of the original application.

Those skilled in the art will appreciate accessing a file, as understood herein, can include, for example, creating, deleting, viewing (e.g., opening), or modifying the file and any of content contained therein. Additionally, as understood herein, those skilled in the art will appreciate that accessing an application can include, for instance, starting, stopping, using, or otherwise controlling operation of the application, and may further include modifying the availability of the application (e.g., adding or deleting availability of the application). Any mention of a cloud-based service (e.g., storage, application) within this description will be understood to include, without limitation, services provided by private clouds, public clouds, and hybrid clouds.

Figure 1:
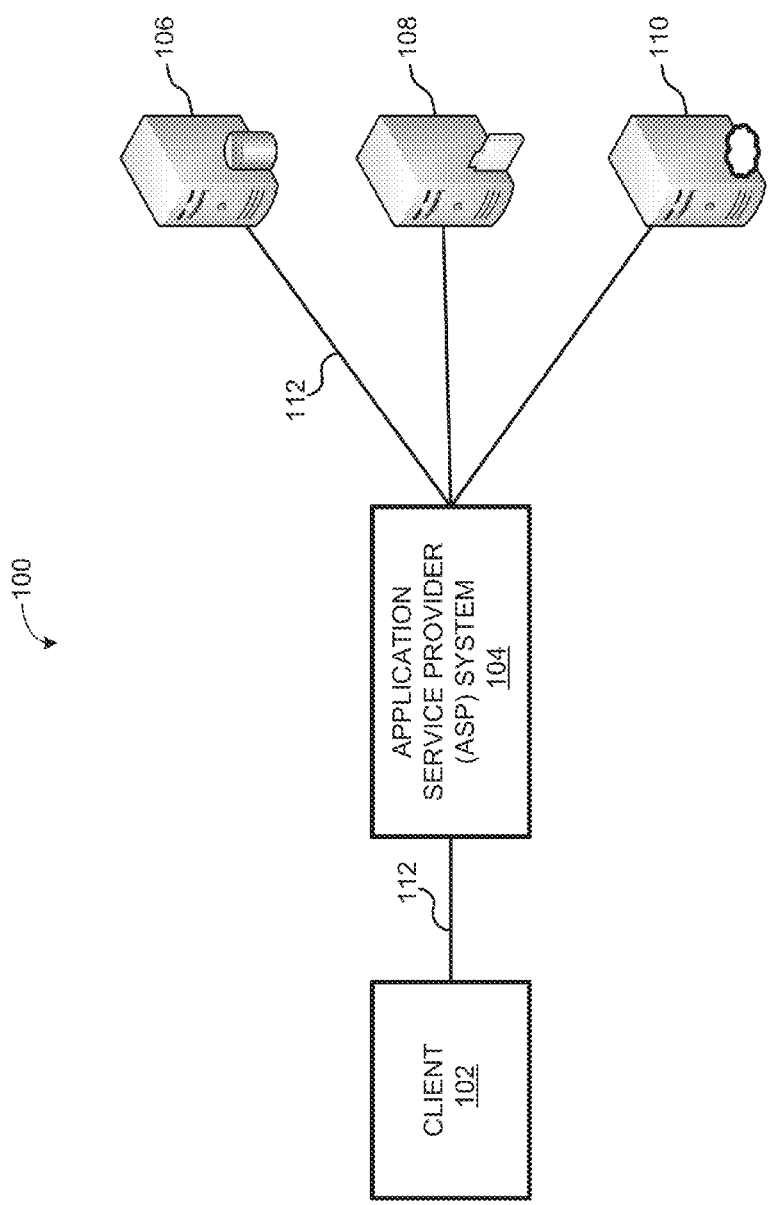
FIG. 1 is a block diagram illustrating an exemplary environment utilizing an exemplary system for providing access to an application (hereafter also referred to as "application access") in accordance with various embodiments.

FIG. 1 is a block diagram illustrating an exemplary environment 100 utilizing an exemplary system for providing access to an application (hereafter also referred to as "application access") in accordance with various embodiments. As shown in FIG. 1, the exemplary environment 100 comprises a client 102, an application service provider (ASP) system 104, a database server 106, a file server 108, and a cloud-based service server 110, each of which may be communicatively coupled with each other using communication connections 112. In some embodiments, the communication connections 112 may be implemented or facilitated using one or more local or wide-area communications networks, such as the Internet, WiFi networks, WiMax networks, and the like. Depending on the embodiments, some or all of the communication connections 112 may utilize encryption (e.g., Secure Sockets Layer [SSL]) to secure information being transferred over the connections 112 between the various entities shown in the exemplary environment 100.

Each of the client 102, the ASP system 104, the database server 106, the file server 108, and the cloud-based service server 110 may be implemented using one or more digital devices, which may be similar to the digital devices discussed later with respect to FIG. 13. For instance, client 102 may be any form of computing device capable of receiving user input (e.g., configured for user interaction), capable of displaying a client user interface (e.g., through which an application can be viewed or controlled), and capable of communicating with the ASP system 104 over one or more of the communication connection(s) 112. Such computing devices may include a mobile phone, a tablet computing device, a laptop, a desktop computer, personal digital assistant, a portable gaming unit, a wired gaming unit, a thin client, a set-top box, a portable multi-media player, or any other type of network accessible user device known to those of skill in the art. Further, one or more of the ASP system 104, the database server 106, the file server 108, or the cloud-based service server 110 may comprise of one or more servers, which may be operating on or implemented using one or more cloud-based services (e.g., System-as-a-Service [SaaS], Platform-as-a-Service [PaaS], or Infrastructure-as-a-Service [IaaS]).

The client 102 may be configured to communicatively connect with the ASP system 104 and be provided with access to an application through the ASP system 104. The application being provided through the ASP system 104 may be executed remotely from the client 102, and/or may be executed on or under the control of the ASP system 104. The ASP system 104 may be executing or controlling the execution of the application on behalf of the client 102 and, as such, may facilitate access (e.g., video, audio, and data access) and user interaction between the executing application and the client 102. The ASP system 104 may further execute or control the execution of the application such that the application has native access (e.g., in-application access) to one or more files residing on a cloud-based storage external to the client 102 and the ASP system 104. In various embodiments, such a cloud-based storage service may be provided by a third-party cloud-based storage service (e.g., Dropbox or Box), which is separate and distinct from the ASP system 104. Execution or execution control of the application may further provide the client 102 with the application having native access to databases (e.g., served by the database server 106) or to file servers (e.g., the file server 108) that are separate and distinct from the ASP system 104.

By executing or controlling execution of the application such that the application has access to data separate and distinct from the execution of the application, the ASP system 104 may provide the client 102 with remote access to the application that might otherwise not be operable on the client 102 and that has access to data storage provided by third-party services. In some embodiments, this may also allow an operator of the ASP system 104 to provide user with applications as a remotely accessible service (e.g., for rent) without the need for maintaining long-term storage data on the ASP system 104 (e.g., user data opened in the applications are provided by a storage system and that is distinct from the ASP system 104; the storage system may be maintained by the user or a third-party on behalf of the user).

This may be useful, for example, when the application is incompatible with the operating system running on the client 102, when the client 102 lacks the requisite resources to locally execute the application (e.g., lack of memory space or processor performance), or when the client 102 lacks sufficient resources to properly execute the application locally.

In some instances, the cloud-based storage services accessed by various embodiments may provide additional cloud-based services in conjunction with the storage services. These additional cloud-based services may include such web-application services relating to word processing documents, spreadsheet documents, presentation documents, and the like. An example of such a cloud-based service is Google® Docs. Various embodiments may utilize web-application services, in conjunction with or in place of virtualized applications, when accessing various files through the ASP system 104. Take for instance where a spreadsheet file accessed through the ASP system 104 is stored on a Dropbox. According to certain embodiments, the ASP system 104 may access the spreadsheet file from Dropbox and use a Google® Docs web application to open the spreadsheet file for viewing and/or modification purposes.

Figure 2A:
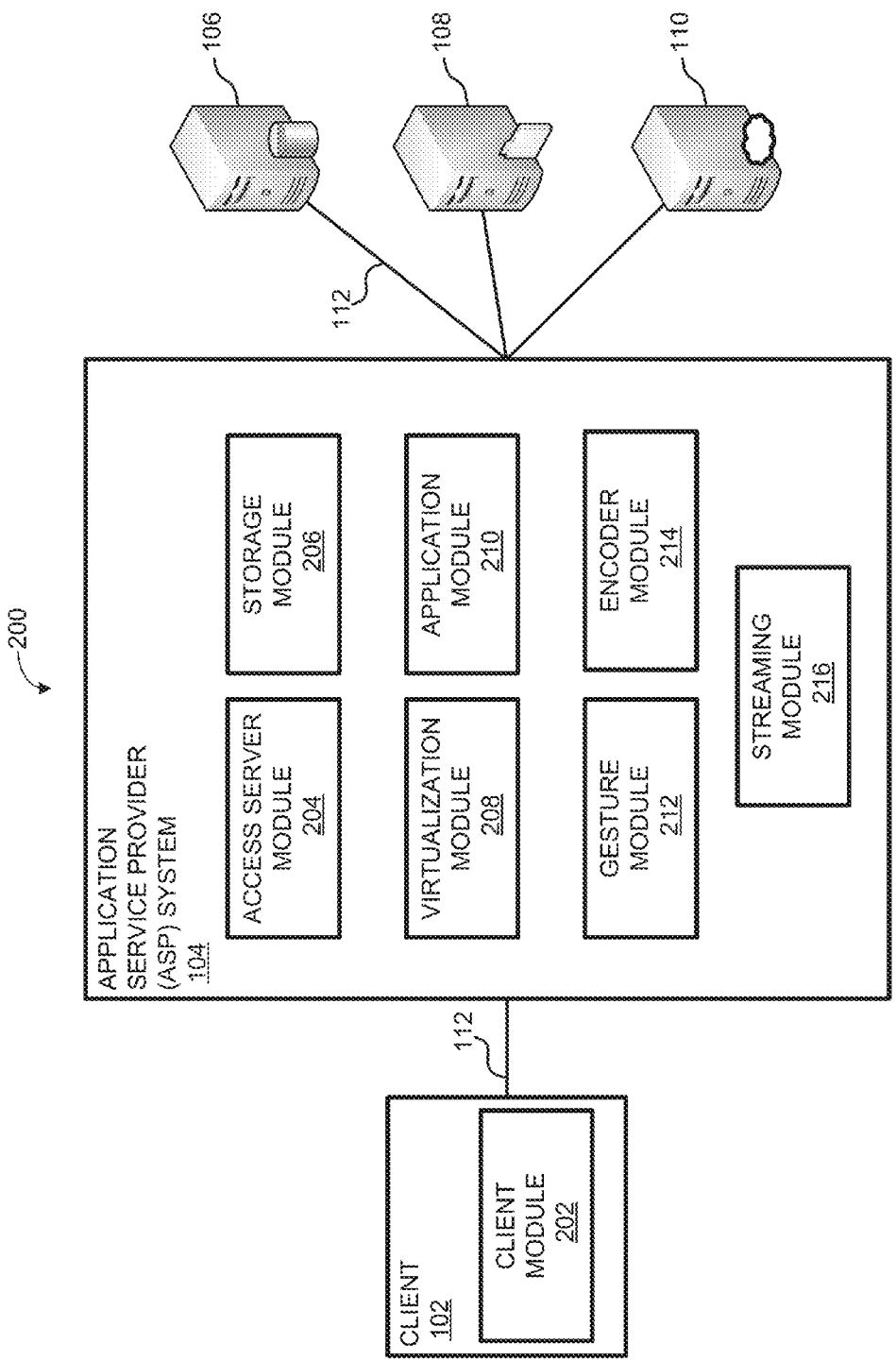
FIG. 2A is a block diagram illustrating an exemplary environment utilizing an exemplary system for providing application access in accordance with various embodiments.

FIG. 2A is a block diagram illustrating an exemplary environment 200 utilizing an exemplary system for providing application access in accordance with various embodiments. In particular, FIG. 2A presents further details regarding the client 102 and the ASP system 104 in accordance with some embodiments. As shown, the client 102 comprises a client module 202. The ASP system 104 comprises an access server module 204, a storage module 206, a virtualization module 208, an application module 210, a gesture module 212, an encoder module 214, and a streaming module 216.

For some embodiments, the client module 202 may be configured to facilitate communication between the client 102 and the ASP system 104, provide a user at the client 102 with a client user interface configured to facilitate user interaction with the ASP system 104, relay user input received through the client user interface (from the user at the client 102) to the ASP system 104, and relay output (e.g., video, audio, or other) from an application provided by the ASP system 104 to one or more components of the client 102 configured to receive and present the output through the client user interface (e.g., video output to the video display of the client 102, and audio data to the sound processor of the client 102).

For some embodiments, the client module 202 may provide the client user interface by generating the client user interface at the client 102 and then presenting the client user interface to a user through a display device (e.g., video display of a tablet computing device) of the client 102. Additionally, some embodiments may provide the client user interface by generating the client user interface at the ASP system 104 (e.g., in the access server module 204), and then sending the generated client user interface from the ASP system 104 (e.g., the access server module 204) to the client module 202 for presentation to the user (e.g., through a display device coupled to the client 102). In general, the presented client user interface is a graphical user interface (GUI) adapted for user interaction through the client 102 and its coupled peripherals, which may include a touch screen. Those skilled in the art will appreciate that the configuration, appearance, and behavior of the client user interface provided by the client module 102 may vary based on, among other things, the type of digital device comprising the client 102 or the computing resources of the client 102 available to the client module 202 (e.g., peripherals available to the client 102, or modes of input available through the client 102).

The client module 202 may further be configured to receive and relay control information from an input device (e.g., peripheral) coupled to the client 102 (e.g., physical or on-screen keyboard integrated into the client 102, or peripheral externally communicatively coupled to the client 102) to the ASP system 104. Likewise, the client module 202 may relay control information, or other data, between devices (communicatively) coupled to the client 102 and the ASP system 104 (e.g., the client module 202 relays print data from the ASP system 104 to a printer coupled to the client 102).

The client module 202 may also be configured to provide a file manager interface at the client 102 operable in presenting one or more files, stored on one or more separate and disparate cloud-based storage services (e.g., third-party services) or stored locally at the client 102, for access through the client 102. For some embodiments, the file manager interface may allow a user at the client 102 to request file management operations with respect to the files presented through the file manager interface, which include files locally stored and/or stored on various cloud-based storage services. The file management operations supported may include adding, deleting, renaming, and moving files stored on one or more cloud-based storage services or locally at the client 102. Files presented through the file manager interface may also be selectable for opening through the ASP system 104 (e.g., in a virtualized application instance accessed through the ASP system 104).

According to some embodiments, when the files from different storage services (e.g., different third-party cloud-based storage services and/or locally stored at the client) are presented, the files may be presented in a segregated manner according to their storage source (e.g., grouped according to storage source), or presented in a common pane with little or no indication of a file's storage source. In some embodiments, when a file presented through the file manager interface is selected for opening, the ASP system 104 may access the file directly from its corresponding storage source (e.g., cloud-based storage service or local file storage at the client) or obtain a cached copy of the file selected its corresponding storage source, and then present the file for access through a virtualized application instance. Where a cached copy of the file is utilized for opening the file, the ASP system 104 may be configured to commit any changes/update performed on the cached copy to the original copy at the original storage location (e.g., commitment occurs when the virtual application instance is closed).

Figure 10:
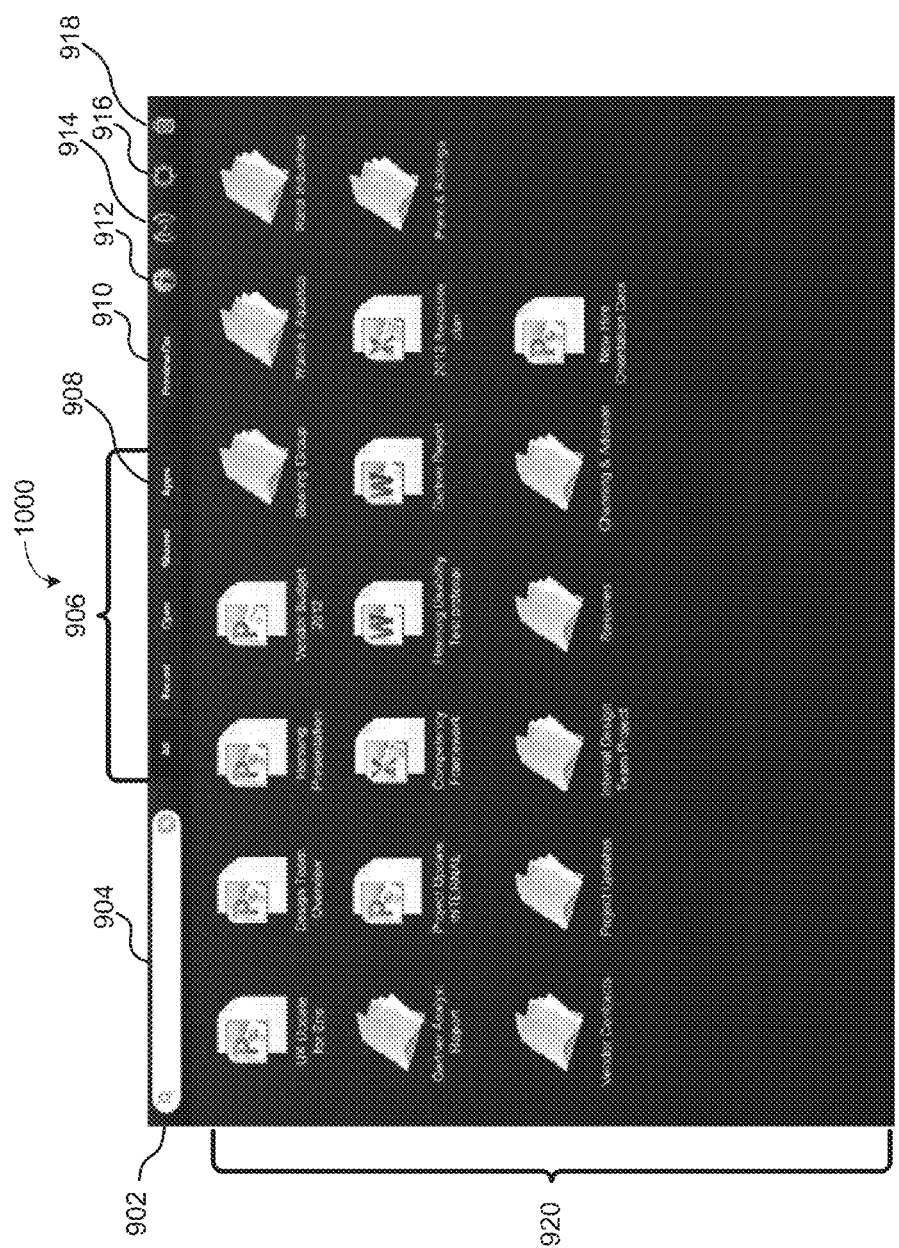

By providing a file manager interface having universal and/or agnostic access to one or more disparate file storage services and/or the local storage source, various embodiments can provide users (e.g., at the client 102) with a universal file workspace, through which files stored in disparate locations can be universally/agnostically accessed for management, viewing, or editing purposes. FIG. 10 presents an exemplary client user interface, according to some embodiments, that includes file manager interface and that could be presented by the client module 202 at client 102.

Continuing with reference to FIG. 2A, the access server module 204 may be configured to facilitate user access to files or applications (e.g., by a user at the client 102) that are provided through the ASP system 104. In some embodiments, the access server module 204 may achieve this by performing some or all of the following on behalf of a user accessing the ASP system 104 from the client 102: (a) establishing and maintaining communication between the client 102 and the ASP system 104; (b) authenticating access to the ASP system 104 (and its various components) by the user; (c) establishing and maintaining one or more application access sessions (also referred to herein as "application sessions") for the user, whereby each application access session may comprise an instance of an application (e.g., an instance of a particular version of an application) being executed or controlled by the ASP system 104 on behalf of the user at the client 102; (d) implementing user preferences and settings for the user's access of the ASP system 104; (e) implementing and enforcing user policy on the user's access of the ASP system 104; (f) enabling access by the applications being executed or controlled by the ASP system 104 to data (e.g., files) stored on or stored using third-party data storage services (e.g., third-party cloud-based storage services, such as Dropbox or Google® Docs); (g) monitoring the user's access of the ASP system 104; (h) maintaining statistics or analytics based on the user's access of the ASP system 104; and (i) facilitating billing of the user based on their access or usage of the ASP system 104.

In some embodiments, the access server module 204 may on behalf of the client 102, negotiate, establish and otherwise facilitate the establishment of a connection between the client module 202 and an application being provided via the virtualization module 208 and the application module 210. Once established, the access server module 204 may continue to monitor or control the connection, possibly in accordance with user preferences, settings, and policies utilized by the ASP system 104.

The access server module 204 may further be configured to manage the overall operation of the ASP system 310 discussed further herein. For example, the access server module 204 may be operable to track and manage resources for the ASP system 104, which may involve monitoring/managing computer resource utilization (e.g., memory utilization, processor utilization, or network bandwidth utilization) by various components of the ASP system 104 or cloud-based services (e.g., SaaS, PaaS, or IaaS) utilized by various components of the ASP system 104. As another example, the access server module 204 may be responsible for distributing the workload of serving two or more clients similar to the client 102 across one or more access servers performing the operations of the access server module 204.

The storage module 206 may be configured to establish and/or maintain access to data on third-party data storage services by an application executing or being controlled by the ASP system 104 on behalf of the user at the client 102. In some embodiments, the storage module 206 may achieve this by receiving, storing, and utilizing access parameters (e.g., third-party access parameters such as protocol information, username, password, encryption key, signature file identifier, navigation address, third-party storage identifier, or the like) provided by the user (at the client 102) in association with a third-party data storage service (e.g., a cloud-based data storage service, such as Dropbox or Google® Docs) which the user wishes to access through the ASP system 104. For example, when the user requests access to data (e.g., files) stored using a third-party data storage service, the storage module 206 may establish a connection with the third-party data storage service using the stored access parameters (e.g., protocol information, username, password, encryption key, signature file identifier, navigation address, third-party storage identifier, or the like) provided by the user, retrieve a listing of the data stored on/using or otherwise made available through the third-party data storage service in association with the access parameters provided, and access the data according to the user's access request. Depending on the embodiment, the user may cause data stored on the third-party data storage service to be accessed by the ASP system 104, for example, when the user requests to review a listing of data (e.g., files) stored on the third-party data storage service or when the user chooses to access data (e.g., open, view, or edit a file) using an application provided by the ASP system 104 (e.g., through the application module 210).

In addition to establishing and/or maintaining access to data on third-party data storage services (e.g., Dropbox, Box, or Google® Docs), the storage module 206 may be configured to permit the ASP system 104 to manage data on the third-party data storage services on behalf of the client 102. For instance, the storage module 206 may permit the ASP system 104 to implement file management functions with respect to files stored on disparate third-party data storage services, thereby enabling a user at the client 102 to perform file management operations through the client module 202. According to some embodiments, the storage module 206 may be operable with the client module 202 such that users can utilize file management functions through a file manager interface (e.g., a file management graphical user interface) presented by the client module 202.

The virtualization module 208 may be configured to establish, monitor, maintain, or otherwise manage execution of an instance of an application in a virtual computing environment (hereafter, also referred to as a "virtualized application instance") for access by the user at the client 102. An instance of the application may be executed in a virtual computing environment in association with an application session established for access by the user at the client 102. Accordingly, in some embodiments, the virtualization module 208 may initiate or manage execution of an instance of the application based on requests received from the access server module 204.

In some embodiments, the instance of an application, which is operated in a virtual computing environment for the benefit of user access, may be based on a particular version of the application. Depending on the embodiment, the version of the application chosen/selected for execution as the application instance may be determined by the access server module 204, the virtualization module 208, the application module 210, or some combination thereof. Factors influencing the determination of the version may include, for the example, the number of user licenses available for a given version of the application, the type of data to be accessed by the application (e.g., file has a format A that is compatible with a version B of the application), the user accessing the application (e.g., user's access privileges or user's subscription type with respect to the ASP system 104), the capabilities of the client device 102 (e.g., the client device 102 is equipped with a high-definition display compatible with the high-definition output of a particular version of an application), the computing resources presently available to the ASP system 104, or network bandwidth required to provide the client 102 with access to the given version of the application. In some embodiments, the virtualization module 208 may utilize an internal hypervisor or interface with an external hypervisor configured to manage execution of the instance of an application in a virtual computing environment. Additionally, the virtualization module may employ the use of a cloud-based services (e.g., SaaS, IaaS, or PaaS), possibly provided by a third-party (e.g., Amazon® EC2®, GoGrid®, or Rackspace®), to execute the instance the instance of an application in the virtual computing environment.

In various embodiments, the virtualization module 208 of the ASP 104 may initiate any number of virtualized application instances. For example, the virtualization module 208 may initiate (e.g., command initiation of) any number of virtualized application instance by the ASP 104 and/or any number of servers (e.g., other ASP systems 104 and/or other servers). In some embodiments, the virtualization module 208 creates and executes a local virtualization environment.

The application module 210 may be configured to obtain or retrieve a version of an application for execution in a virtual computing environment for access by the user at the client 102. For example, the application module 210 retrieves a version of the application on behalf of the virtualization module 208, and then provides the retrieved version to the virtualization module 208 for execution in a virtual computing environment. Depending on the embodiment, the application module 210 may retrieve the version of the application based on a request from the virtualization module 208 or the access server module 204 (e.g., which, as described herein, may be responsible for managing application sessions for the user access). The application module 210 may retrieve the version of the application from an application repository (not shown), which for some embodiments may be implemented using one or more file servers, database servers, or some combination thereof. For example, the version of the application may be retrieved from a cloud-based services configured to serve the version of the application (e.g., to the application module 210) upon request. The application repository may store a variety of versions for a given application (e.g., for Microsoft® Word®, the application repository may store Word® 2011, Word® 2008, Word® 2004, and Word® 2001), and provide the appropriate version of the given application based on the request discussed above. Each version of the application may be stored on the application repository as a single, separate application executable file, as a directory containing the version's associated executable file(s) and any supporting files (e.g., software library files), or as a binary image or compressed file containing the version's associated executable file(s) and any possible supporting files (e.g., software library files), or some combination thereof.

For some embodiments, retrieval of the version of the application may comprise the application module 210 retrieving a path or link to data (e.g., a copy of the application or an image of the application) corresponding to the version of the application to be retrieved. This path or link to the data may then be conveyed by the application module 210 to the virtualization module 208, which uses the data at the path/link to instantiate a virtualized application instance.

For some embodiments, the virtualization module 208 and the application module 210 may be implemented as single module (not shown) that utilizes a cloud-based service (e.g., SaaS, IaaS, or PaaS) to provide a version of an application executing in a virtual computer environment. Such a cloud-based service may be provided by a third-party cloud-based service, which may be manage or controlled by the ASP system 104 using APIs compatible with the service.

To utilize the cloud-based services for the virtualization module 208, the application module 210, and possibly other components of the ASP system 104, the ASP system 104 may employ application programming interfaces (APIs) (e.g., those provided by Amazon®, GoGrid®, or Rackspace®) that permit the ASP system 104 and its various components to provision (e.g., request the use of), consume, and release services provided by cloud-based services. For example, the virtualization module 208 may utilize an Infrastructure-as-a-Service (IaaS) API (e.g., driver) to provision one or more virtual machines to operate one or more virtualized application instances, while the application module 210 the IaaS API to for provisioning virtual machines to store copies/images of applications (utilized by the virtualization module 208 to instantiate virtualized application instances).

In context of an application being provided to the client 102 by the ASP system 104 for user access, the gesture module 212 may be configured to translate or map user input received from the client module 202 (e.g., via the access server module 204) to an alternative user input compatible with the application being provided. In some embodiments, such a translation/mapping may be implemented when the client 102 is incapable of receiving the alternative user input from the user through the one or more input devices available through the client 102 (e.g., the client 102 lacks an input device having a special keyboard buttons compatible with the application being provided). Such functionality may be particularly beneficial where a digital device, such as a mobile phone or a tablet device, that rely on a touch-based input devices (e.g., touch-based screens) and on-screen input devices in place of external input devices. For example, a tablet device capable of receiving touch-based input gestures may have its two-finger or three-finger on-screen swipe gestures translated or mapped to page-up or page-down commands with respect to a word processing application being provided through the ASP system 104.

The encoder module 214 may be configured to receive and encode output data from an application being executed or controlled by the ASP system 104 (e.g., using the virtualization module 208) for access by the user at the client 102. In various embodiments, dependent upon the application being executed/controlled, the output received may comprise video output data, audio output data, or general output data (e.g., file output). Additionally, the video, audio, or data output received by the encoder module 214 may be provided by the virtual computing environment executing a virtualized instance of an application (e.g., at the request of the virtualization module 208). To facilitate the functionality of the encoder module 214, the encoder module 214 may be implemented as a virtual driver (e.g., virtual display driver, or virtual audio driver) employed by the virtual computing environment when producing output from a virtualized application instance operating in the virtual computing environment.

The format in which the output is encoded by the encoder module 214 may depend on the type of output being encoded (e.g., video, audio, or raw data), the preferences or privileges of the user accessing the application (e.g., the user may lack the privilege to receive audio based on the current account type), the resources available to the ASP system 104, the capabilities of the client device 102, and/or the communication bandwidth available between the client 102 and the ASP system 104 (e.g., the client 102 is a mobile phone communicating with the ASP system 104 over a low-speed cellular connection). Further, in some embodiments, the encoder module 214 may be configured (e.g., according to user preferences or system settings) to encrypt the output provided by the application (e.g., for security purposes), and/or compress the output provided by the application being executed/controlled to utilize less communication bandwidth. Those skilled in the art would fully appreciate that any number of known codecs (e.g., H.264 standard codecs, such as Application Distribution Protocol [ADP]), ciphers, or encoding methodologies may be utilized by the encoder module 214 when performing the encoding process in accordance with various embodiments.

The streaming module 216 may be configured to receive the encoded output from the encoder module 214 and transmit the encoded output to the client module 202 as a data stream. For some embodiments, the format utilized for the data stream may vary, for example, according to the communication bandwidth available between the client 102 and the ASP system 104, the types of communication connections being utilized between the client 102 and the ASP system 104, the capabilities of the client device 102, the preferences of the user accessing the application through the ASP system 104, and/or the settings of the ASP system 104. Those skilled in the art will appreciate a number of known communication protocols (e.g., transport protocols, such as User Datagram Protocol [UDP]) or data streaming formats may be utilized by the streaming module 216 as encoded output from the application is streamed to the client module 202. The encoder module 214 may further employ the video encoding techniques described in U.S. patent application Ser. No. 12/301,767 (published as U.S. Patent Application Publication No. 2010/0011301), filed on Nov. 20, 2008, which is hereby incorporated by reference.

In various embodiments, the streaming module 216 may transmit one or more data streams to the client module 202 in order to deliver various types of output being provided by the application being access (e.g., one data stream of audio and a separate data stream for video). Upon receiving the data stream(s) from the streaming module 216, the client module 102 may decode the encoded output received over the data stream, and present the output on the client 102 through the client user interface provided by the client module 202.

FIG. 2B is a block diagram illustrating the storage module 206 configured to establish or maintain access to data on third-party data storage services (e.g., Dropbox, Box, or Google® Docs) by an application executing or being controlled by the ASP system 104 on behalf of the user at the client 102. In addition to storing and utilizing access parameters in association with different data storage services (e.g., third-party cloud-based storage), the storage module 206 may comprise various application programming interfaces (APIs) that facilitate access to the different storage services over network connections 226. For example, as illustrated in FIG. 2B, the storage module 206 may comprise Dropbox APIs 218 enabling access data stored at a Dropbox cloud-based storage server 228, Box APIs 220 enabling to access data stored at a Box cloud-based storage server 228, and Google® Docs APIs 222 configured to access data stored at a Google® Docs cloud-based services. In some embodiments, the web APIs utilized by the storage module 206 may comprise web-based APIs (e.g., web application APIs) provided by such third-party cloud service operators as Dropbox and Google® for accessing various cloud-based service, including storage services and file management services.

As also illustrated in FIG. 2B, the storage module 206 may comprise network-protocol based storage APIs that permit access to a network file system 234 using non-web-based methodologies. For certain embodiments, the storage module 206 may utilize the network-protocol based storage APIs to access file system based on various network protocols including, for example, Network File System (NFS), Samba, file transfer protocol (FTP), and the like.

Figure 3:
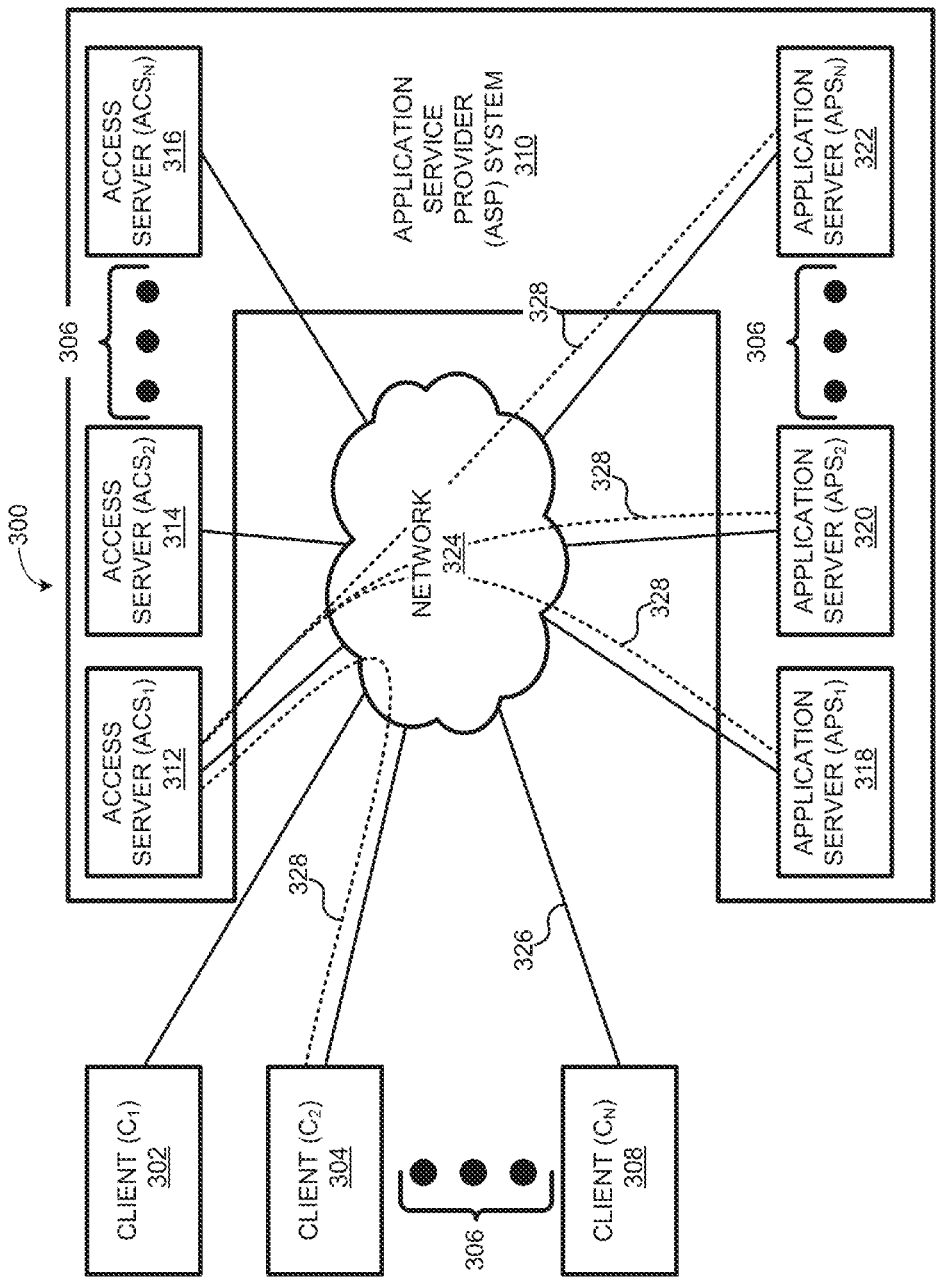
FIG. 3 is a block diagram illustrating an exemplary environment utilizing an exemplary system for providing application access in accordance with various embodiments.

FIG. 3 is a block diagram illustrating an exemplary environment 300 utilizing an exemplary system for providing application access in accordance with various embodiments. As shown, the exemplary environment 300 comprises clients $C_1$ to $C_n$ (represented by clients 302, 304, and 308), an application service provider (ASP) system 310, and a network 324 enabling communication between the clients 302, 304, and 308 and the ASP system 310 over network connections 326. Depending on the embodiment, the clients 312, 314, and 316 may be similar in function and implementation to the client 102, and the ASP system 310 may be similar in function and implementation to the ASP system 104, each of which was discussed in detail with reference to FIGS. 1 and 2. As such, in accordance with various embodiments described herein, the clients 312, 314, and 316 may comprise one or more digital device(s) configured to communicating with the ASP system 310 through the network 324, the ASP system 310 may comprise one or more server configured to provide the clients 312, 314 and 316 with access to files and applications.

As further shown in FIG. 3, the functionality of the ASP system 310 may be implemented by way of access servers $ACS_1$ to $ACS_n$ (represented by access servers [ACSs] 312, 314, and 316), and application servers $APS_1$ to $APS_n$ represented by (application servers [APSs] 318, 320, and 322). Although a limited number of clients, ACSs, and APSs are depicted in FIG. 3, those skilled in the art will appreciate that there may be any number of clients, ACSs, and APSs. Ellipses 306 in FIG. 3 indicate that any number of clients, ACSs, and APSs could be present in the exemplary environment 300.

In some embodiments, the ACSs 312, 314, and 316 may implement some or all of the functionality provided by the access server module 204 as described in reference to FIG. 2A, and the APSs 318, 320, and 322 may implement some or all of the functionality provided by some or all of the storage module 206, the virtualization module 208, the application module 210, the gesture module 212, the encoder module 214, and the streaming module 216 as described in reference to FIG. 2A. Specifically, according to some embodiments, the workload of providing some or all of the services or functionalities of the access server module 204 may be distributed amongst some or all of the ACSs 312, 314, and 316, and the workload of providing, while the workload of providing some or all of the services or functionalities of the storage module 206, the virtualization module 208, the application module 210, the gesture module 212, the encoder module 214, and the streaming module 216 may be distributed amongst some or all of the APSs 318, 320, and 322. In some instances, the ACSs 312, 314, and 316 may utilize load balancing to distribute the workload amongst the available ACSs, and the APSs 318, 320, and 322 may utilize load balancing to distribute the workload amongst the available APSs. In various embodiments, one or more digital devices may manage and/or provide load balancing to any number of ACSs and/or any number of APSs. By distributing the workload amongst multiple ACSs and APSs, certain embodiments may provide acceptable performance (e.g., enough availability of computing resources to provide the requested applications with user-acceptable performance), scalability (e.g., near real-time user scalability according to demand or the number of users currently utilizing the ASP system 310 increases or decreases, or application scalability to provide more variety of applications operating on a variety of operating systems), and reliability (e.g., through redundancy of servers and components, or lower bandwidth per user) with respect to the ASP system 310.

In the example illustrated in FIG. 3, a dashed line 328 illustrates a virtual communication channel (hereafter referred to as "virtual communication channel 328") between the client 304 and the application servers 318, 320, and 322 established via the access server 312. In some embodiments, the virtual communication channel between the client 304 and the application servers 318, 320, and 322 may be implemented by way of one or more network connections 326 between the client 304 and the access server 312, and one or more networks connections 326 between the access server 312 and each of the application servers 318, 320, and 322. Alternatively, in some embodiments, the virtual communication channel between the client 304 and the application servers 318, 320, and 322 may be implemented by the access server 312 mediating one or more network connections 326 directly between the client 304 and each of the application servers 318, 320, and 322.

Once established, the virtual communication channel 328 enables data flow over the network connections 326 between the client 304 and the access server 312, and data flow between the client 304 and the application servers 318, 320, and 322 via the access server 312. Through such data flows, the client 304 may, for example, be serviced by the access server 312 (e.g., in accordance with the access server module 204 described in FIG. 2A) or obtain access to application services provided by each of the application servers 318, 320, and 322 (via the access server 312).

Figure 4:
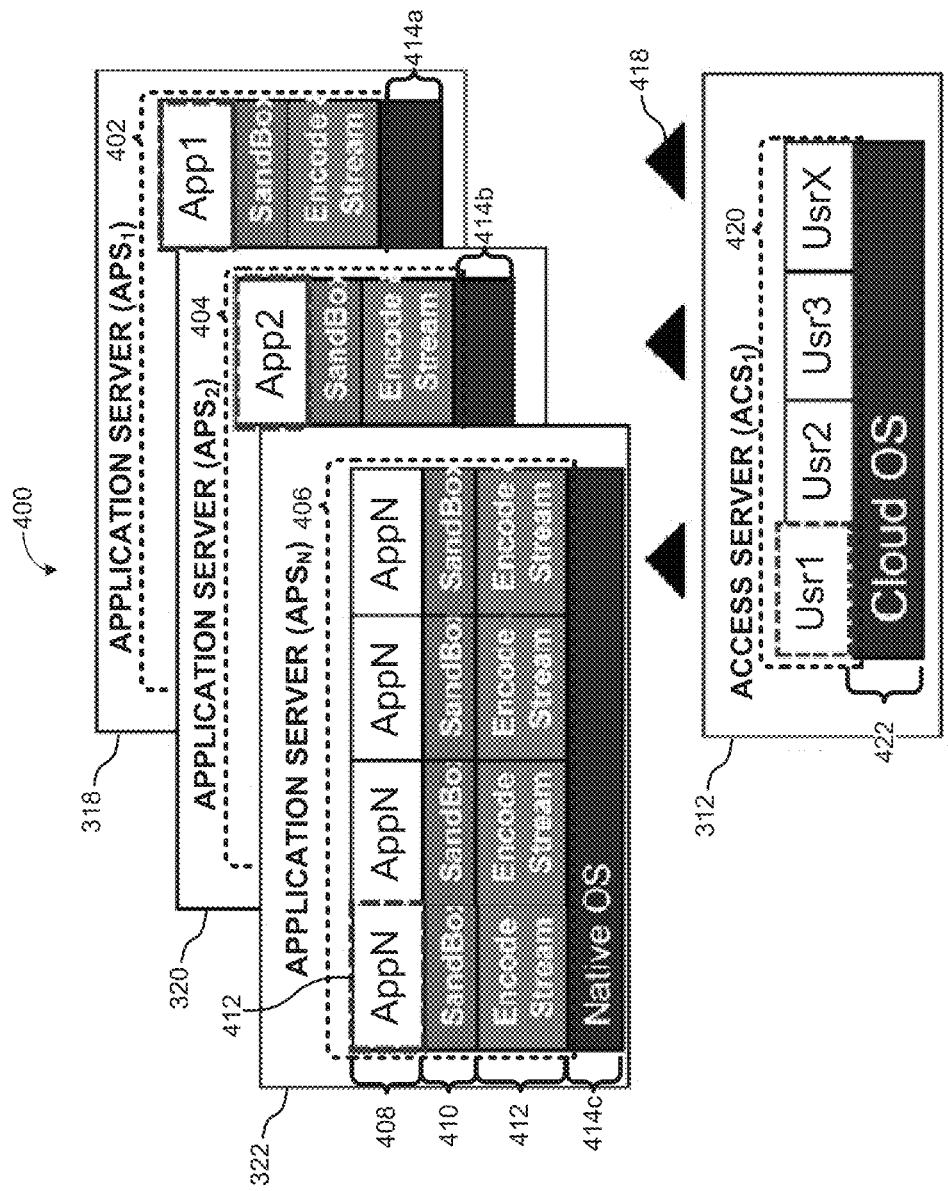
FIG. 4 is a block diagram illustrating an exemplary logical construct for an exemplary system for providing application access in accordance with various embodiments.

FIG. 4 is a block diagram illustrating an exemplary logical construct 400 for an exemplary system for providing application access in accordance with various embodiments. The structure and functionality represented by the exemplary logical construct 400 may be implemented by any number of embodiments described herein, including those of FIG. 1, 2 or 3. For example, as shown in FIG. 4, the exemplary logical construct 400 may be implemented using the APSs 318, 320 and 322 of the ASP system 310 described in reference to FIG. 3, and implemented using the ACS 312 of the ASP system 310 described in reference to FIG. 3.

The exemplary logical construct 400 illustrates how each of the APSs 318, 320, and 322 may respectively comprise a set of virtualized application instances (402, 404, 406), and a native operating system (414a, 414b, 414c) configured to support operation of the respective set (402, 404, 406). Additionally, the exemplary logical construct 400 further illustrates how each of the sets 402, 404, and 406 of virtualized application instances may comprise a virtualized application instance 412, which may be executing a version of an application (represented as application layer 408) at the request or control of an ASP system (e.g., the ASP system 310 in FIG. 3). In accordance with some embodiments, the application layer 408 may be executing in a (computer) sandbox (represented as sandbox layer 410 under the application layer 408), which may be configured to separate computing resources (e.g., on a physical computer or a virtual machine) utilized in performing the version of the application 408 (e.g., memory, processor, etc.) from versions of applications performing in other virtualized application instances a given APS (e.g., from other virtualized application instances operating in the set 406 of the APS 422). Depending on the embodiment, a separate sandbox may be utilized for each application session containing a virtualized application instance, or a separate sandbox may support multiple application sessions (i.e., multiple virtualized application instances) in association with a single user. The output from the application layer 408 executing on the sandbox layer 410 may result in output (e.g., video, audio, or other data) that is encoded and streamed (e.g., as one or more data streams) to a user (e.g., one a set of users 318 on ACS 312) via an encode and stream layer 412 (which may be implemented by the encoder module 214 and the streaming module 216 described with reference to FIG. 3).

In some embodiments, each of the native operating systems 414a, 414b, and 414c and the sets 402, 404, and 406 of virtualized application instances may be implemented using a cloud-based service, such as a platform cloud-based service (e.g., PaaS) or infrastructure cloud-based service (e.g., IaaS).

The exemplary logical construct 400 also illustrates how through connections 418 the ACS 312 services the set of user 318 using the APSs 318, 320, and 322. To facilitate user access to the one or more applications provided by the APSs 318, 320, and 322, the ACS 312 may be configured with a cloud-on operating system 422 configured to perform the functionalities similar to those described with respect to the access server module 204 in FIG. 2A.

Figure 5:
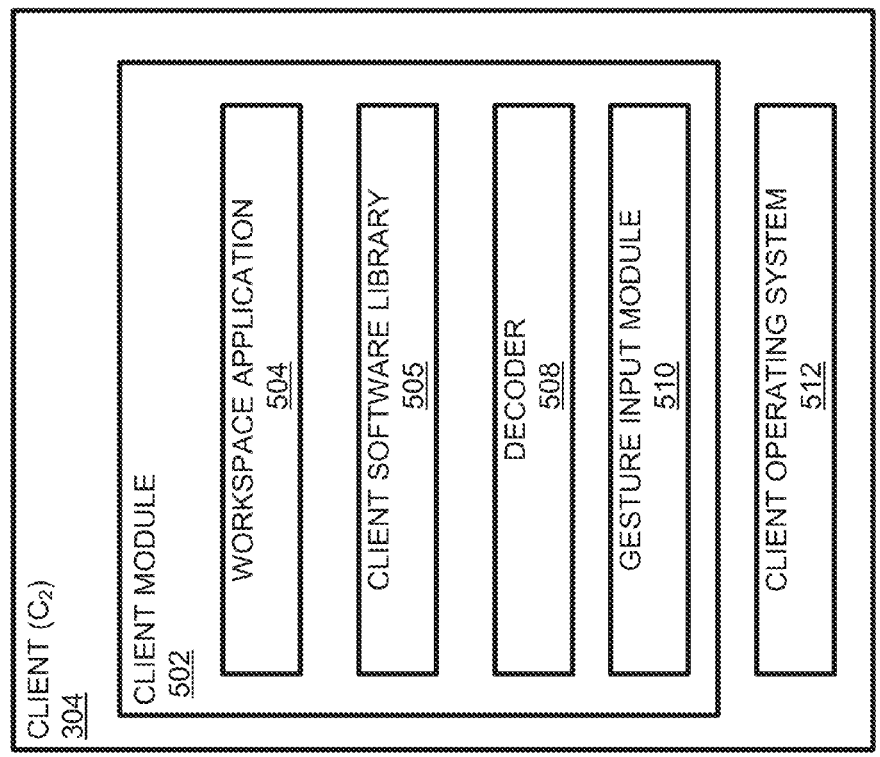
FIG. 5 is a block diagram illustrating an exemplary client configured to operate with an exemplary system for providing application access in accordance with various embodiments.

FIG. 5 is a block diagram illustrating an exemplary client, specifically the client 304, configured to operate with an exemplary system for providing application access in accordance with various embodiments. As shown, the client 304 comprises a client module 502 and a client operating system 512 operable in supporting operations by the client module 502 on the client 304. Depending on the embodiment, the client module 502 may be similar to the client module 202 described with respect to FIG. 2A, where the client module 502 may facilitate communication between the client 304 and an ASP system (e.g., the ASP system 310), provide a user at the client 304 with a client user interface configured to facilitate user interaction with an ASP system (e.g., the ASP system 310), relay user input received through the client user interface from the user at the client 304 to an ASP system (e.g., the ASP system 310), and relay output (e.g., video, audio, or other data) from an application provided by an ASP system (e.g., the ASP system 310) to one or more components of the client 304 configured to receive and present the output through the client user interface.

To implement such functionalities (and others), the client module 502 may comprise a workspace application 504 configured to present the client user interface to a user through a video display coupled to the client 304 (e.g., including generating or presenting a graphical user interface associated with the client user interface and handling the presentation of application output received from an ASP system), a client software library 506 configured to support various functionalities of the client module (e.g., support the functions of the workspace application 304 or the decoder 508), and the decoder 508 configured to decode encoded output data (e.g., video, audio, or other data) received from an ASP system (e.g., the ASP system 310) and provide the decoded output data (e.g., to the workspace application 504) for presentation to the user of the client 304 (e.g., video output data routed to the video display of the client 304, and audio data routed to the sound processor of the client 304). In some embodiments, the workspace application 504 may be a runtime application compatible with the operating system 512 of the client 304. Accordingly, for some embodiments, the workspace application 504 is a native application of the client 304. Additionally, the workspace application 504 may be configured to provide access to applications that may be incompatible with the operation system 510 of the client 304 or that may otherwise not be operable on the client 304 without the use of the workspace application 504.

The workspace application 504 may also be configured to provide universal and/or agnostic file management access to various files that are stored at separate and disparate data storage services but made available through an ASP system (e.g., the ASP system 310). Accordingly, in some embodiments, the workspace application 504 may comprise a file management interface adapted to user requests for file management operations, such as adding (e.g., by creation of a new file or by upload), deleting, moving, and renaming files. For some embodiments, the workspace application 504 may utilize web-based application programming interfaces (APIs), which may be associated with one or more web applications (e.g., Google® Docs), to access files stored on cloud-based services. For example, in order to list files accessible through the ASP system (e.g., the ASP system 310), the workspace application 504 may utilize web-based APIs for a given cloud-based service (e.g., Dropbox, Box, or Google® Docs) to directly perform file management operations (e.g., listing of stored files, adding files, deleting files, or renaming files) with respect to that service. Then, when a file listed through the workspace application 504 is selected for opening through the ASP system (e.g., using a virtualized application instance provided through the ASP system 310), the workspace application 504 may instruct the ASP system to obtain a copy to the selected file from it respective storage source (e.g., cloud-based storage source or local storage source) or directly access the file from its respective storage source. Thereafter, the ASP system may initiate a virtualized application instance having access to the selected file, and the output data of the virtualized application instance may be transmitted to the client 304.

The hardware of the client 304 (e.g., touch screen of the client 304) may be adapted to receive gestures as user input to the client 304, which results in a gesture input being detected by the operating system 512 (e.g., Apple® iOS) or another application operating on the operating system 512. Gestures receivable by the client 304 generally depends on the means by which the client 304 receives gestures. For example, where the client 304 is configured with a touch-based screen (e.g., capacitive screen), the exemplary gestures may include finger-dragging gestures (e.g., dragging in the up, down, left, or right direction), pinching (e.g., pinch-in or pinch-out), swiping (e.g., quick, light, single finger, dual finger, three finger, four finger, five finger, up-to-down, down-to-up, left-to-right, or right-to-left swipe), finger tapping (e.g., single, double, triple, short, or long tap), and flicking (e.g., in one of eight movement directions).

In some embodiments, the client module 502 may comprise a gesture input module 510 configured to receive user input entered into the client 304, recognize the user input as a gesture input, and generate or capture data regarding the gesture input (hereafter, "gesture data"). Subsequent to generation/capture, the gesture input module 510 may transmit the gesture data to an ASP system (e.g., the ASP system 310), possibly through an access server (e.g., the ACS 312). In some instances, the gesture input module 510 may transmit the gesture data to the APS system (e.g., the APS system 318 via the ACS 312) concurrently with other user input data received at the client 304 (e.g., non-gesture input data received) and intended for transmission to the ASP system.

Depending on the configuration of the client 304, a user may enter user inputs by way of a touch screen of the client 304, by way of physical moving the client 304 configured such that a accelerometer of the client 304 can translate the movement as entry (e.g., shaking the client device is recognized as a gesture), or by way of hand gestures captured by a camera coupled to the client 304.

Those skilled in the art will appreciate that although the gesture input module 510 is shown as being part of the client 304, the gesture input module 510 for various embodiments is in no way limited to being implemented in such a manner. Those skilled in the art will appreciate that various embodiments may implement some or all of the gesture input module 510 at an APS server (e.g., the APS server 320).

In some embodiments, the operating system 512 may be adapted to natively support gestures and, as such, may readily recognize a set of gestures received by way of user input at the client 304 (e.g., swipe, tap, ping, or flick on a touch screen of the client 304). For example, where the client 304 is a tablet device configured with a touch-based screen for receiving gesture inputs, the client 304 may receive a gesture input through user inputs at the touch-based screen, the operating system 512 of the tablet device may receive and natively recognize those user inputs as comprising a gesture input, and the operating system 512 (e.g., through a API feedback or programming constructs) provide data relating to the gesture input ("gesture data") to the gesture input module 510. For some embodiments, the operating system 512 may disseminate gesture data by generating one or more gesture input messages in response to recognizing the gesture input. The gesture input messages may be passed amongst various components of the operating system 512 and/or amongst applications being supported by the operating system 512, which includes the client module 502. Where a given gesture input is predefined in the operating system 512 to perform a particular, native command (or invoke a certain functionality), the gesture input module 510 may prevent the particular command from being performed when the given gesture input is received. In such cases, the particular command may be blocked while the gesture data for the gesture input may be passed along to the ASP system for execution in the virtualized application instance and/or the virtual computing environment operating the virtualized application instance. For some such embodiments, while the client module 202 is being accessed on the client 304 (e.g., client module 202 is the current, active application), the gesture input module 510 may temporarily prevent the native command from being performed by overriding the functionality of the given gesture input on the client 304.

In regard to the data generated/captured in relation to the gesture input, the gesture data may comprise a gesture type, a gesture phase (e.g., phases of gesture input as it is inputted by a user), coordinates relating to the gesture (e.g., X/Y coordinates of start and stop of gesture), velocity of gestures (e.g., X/Y components of a vector data representing the gesture), pressure associated with the gesture, or a gesture timestamp (e.g., gesture start and stop timestamp). Based on the gesture data, various embodiments may map the gesture input, which is received at the client 304, to a set of input events compatible with the virtualized application instance and/or the virtual computing environment operating at the ASP system (e.g., the ASP system 310). The mapping eventually determined (e.g., at the ASP system 310) may depend on such factors as version of the application instantiated in the virtualized application instance that is to receive the set of input events, version of the operating system running in the virtual computing environment that supports the virtualized application instance, user-preferences or system defined preferences (e.g., user defined mappings), or some combination thereof.

Upon receiving the gesture data (e.g., data regarding a two-finger swipe) from the gesture input module 510, the ASP system (e.g., the ASP system 310) may operate on the gesture data, map the gesture data to a set of input events, and execute the set of input events in the virtual computing environment. Take for example where a user inputs a two-finger swipe moving left to right on the touch screen of a client, based on the gesture data transmitted by the gesture input module 510 to the ASP system, the ASP system may map the swipe to a left to right scrolling input event, which causes the horizontal scroll bar of a viewing pane in the currently active virtualized application instance (e.g., document open in Microsoft® Word®) to scroll right.

Typically, the executed set of input events may effectuate a performance change or a behavioral change with respect to the virtualized application instance currently active at an ASP system (e.g., operating on or being controlled by the ASP system 310) on behalf of the client 304. In order to achieve this, for some embodiments, the set of input events may be operable for execution in the virtualized application instance and/or the virtual computing environment supporting the virtualized application instance. In this manner, various embodiments may render/convert gesture inputs, which may be natively compatible with the operating system and/or applications of client 304, to a set of input events that are compatible with a virtualized application instance and/or its supporting virtual computing environment. This may be particularly useful where the gesture inputs received at the client 304 (and intended for execution in the virtualized application instance) are not natively compatible with, or not fully supported by, the virtualized application instance and/or the virtual computing environment of the virtualized application instance. Such would be the case where, for example, the client 304 is running a version of an Android® operating system, the virtualized application instance comprises a version of Microsoft® Windows® application, and gestures that are natively supported by the Android® operating system of the client 304 (e.g., such as pinch or flick) are not natively supported by the version of Microsoft® Windows® application and/or the Microsoft Windows® operating system supporting the virtualized application instance.

Depending on the embodiment, the mapping of the gesture data to the set of input events may depend on/take into consideration the version of the application comprised in the virtualized application instance and/or the version of the operating system running in the virtual computing environment that is to the set of input events. Those skilled in the art will appreciate that various versions of applications and various version of operating systems may support different types of input events in comparison to one another.

Figure 6:
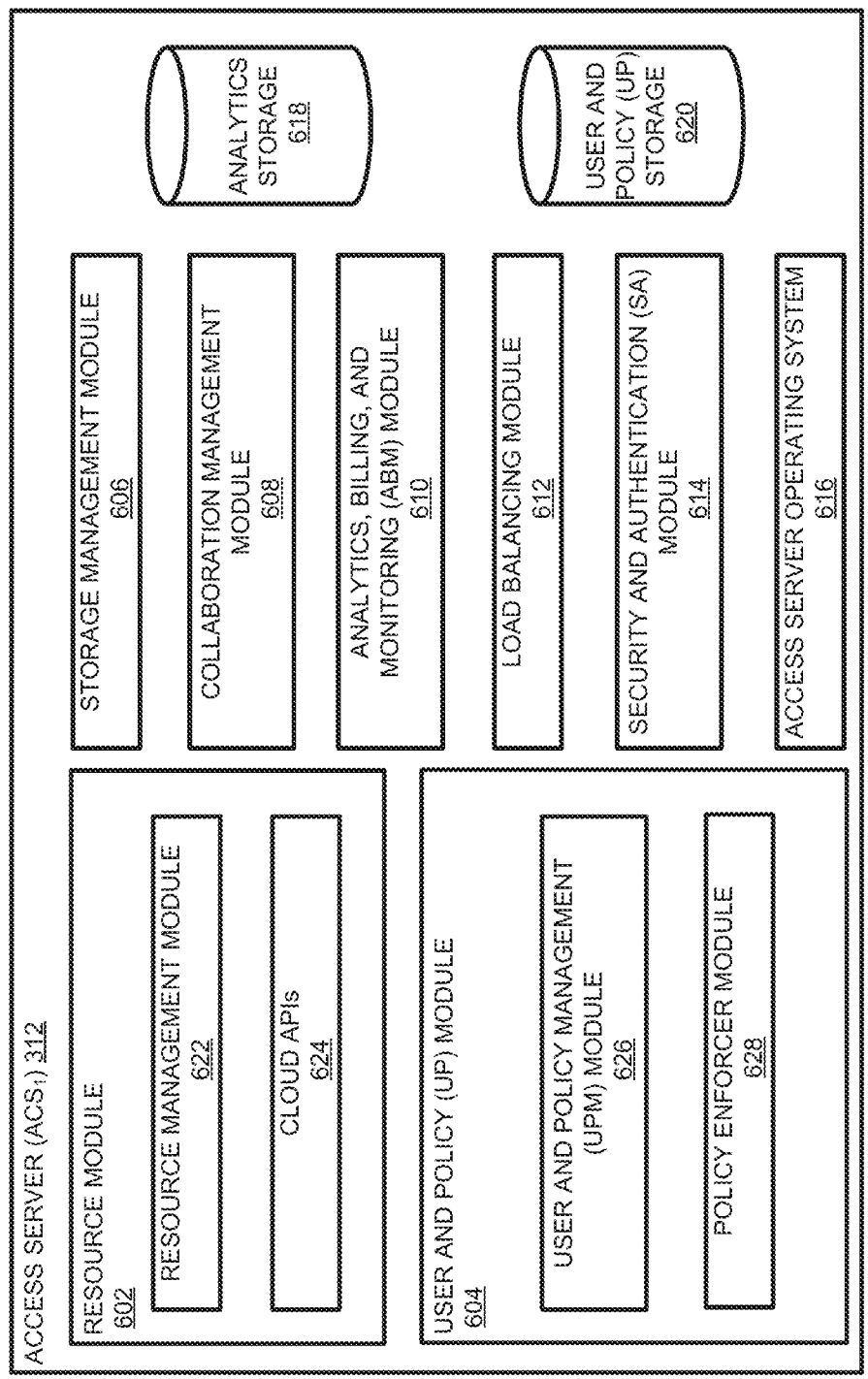
FIG. 6 is a block diagram illustrating an exemplary access server that is part of an exemplary system for providing application access in accordance with various embodiments.

FIG. 6 is a block diagram illustrating an exemplary access server, specifically the access server (ACS) 312, which is part of an exemplary system for providing application access in accordance with various embodiments. As shown, the ACS 312 comprises a resource module 602, a user and policy (UP) module 604, a storage management module 606, a collaboration management module 608, an analytics, bill, and monitoring (ABM) module 610, a load balancing module 612, a security and authentication (SA) module 614, an access server operating system 616 (configured to support operations of the ACS 312 and its various components), an analytics storage 618, and a user and policy (UP) storage 620.

The resource module 602 may be configured manage resources in association with the access server 312 performing its various functions within the ASP system 310, which can include managing application servers (APSs) utilized by the ASP system 310 to provide clients (e.g., the client 304) with application access, or managing resources utilized by various components of the ACS 312. To this effect, the resource module 602 may comprise a resource management module 622 adapted to dynamically allocate, assign, and monitor resources that may be utilized by or otherwise associated with the ACS 312 or the ASP system 310 in general. Included in those resources may be cloud-based resources utilized by the ACS 312, other ACSs in the ASP system 310, APSs in the ASP system 310, or other components in the ASP system 310. In some embodiments, the management of cloud-based resources may be implemented through cloud application programming interfaces (APIs) 624, which may be comprised in the resource module 602. The cloud APIs 624 may include, for example, those provided by Amazon®, GoGrid®, or Rackspace® in connection with their respective cloud-based services.

The user and policy (UP) module 604 may be configured to perform various user-related operations in connection with the ASP system 310. For example, the UP module 604 may facilitate implementation of user preferences and settings, user policy enforcement, and user session management (e.g., sessions in which users generally access the ASP system 310, or in which users are provided with application access). In some embodiments, the UP module 604 may comprise a user and policy management (UPM) module 624 that, in connection with the ASP system 310, may enable a user (e.g., a regular user, a super user, or an administrator) to manage (e.g., add, remove, or modify) one or more user accounts, preferences, settings, or policies. Such user-related parameters may determine or facilitate a user's access to various applications and a user's access to various storage services (e.g., cloud-based and otherwise) in connection with the various applications available through the ASP system 310. The user accounts, preferences, settings, or policies may also include parameters used in establishing access to a cloud-based storage service by an application (e.g., virtualized application instance) provided through the ASP system 310 (e.g., by way of the ACS 312).

For some embodiments, the UPM module 624 may be configured to provide a web-based interface through which an owner, operator, or administrator of the ASP system 310 can perform operations supported by the UP module 604 (e.g., user account, preference, and settings management). In addition, the UP module 604 (e.g., through the UPM module 626) may further be configured to interface and communicate with a user or policy management tool, external to the ASP system 310, that is adapted to view/monitor, create, delete, modify, or provide (e.g., from a source external to the ASP system 310) user related accounts, preferences, settings, and policies used by the ASP system 310.

The user and policy (UP) storage 620 of the ACS 312 may be configured to store information relating to user account, preference, setting, or policy, which can be accessed or operated upon by the UP module 604.

The policy enforcer module 628 may be configured to implement and enforce user policy when a user is accessing the ASP system 310, particularly through the ACS 312. In order to accomplish policy enforcement, the policy enforcer module 612 may adapted to actively monitor a user's access of the ASP system 310 and validate actions performed by the user during the access.

The storage management module 606 may be configured to add, remove, modify, or manage connections between the ASP system 310 and various storage entities, which may include databases, cloud-based storage services, and/or traditional file servers (e.g., a private enterprise file server). For example, the storage management module 606 may assist in storage-related connections for the ASP system 310 by establishing storage-related connections between various APSs (e.g., the APS 318), which are operating virtualized application instances (for access by users of the ASP system 310), and a storage entity (e.g., a third-party, cloud-based storage service), which may be internal or external to the ASP system 310. The establishment could, for some embodiments, involve logging into the storage entity using third-party user credentials stored and provided (e.g., by the UP module 604) in association with a user accessing the ASP system 310.

In some embodiments where the storage entity is a cloud-based storage service, the storage management module 606 may utilize application program interfaces (APIs), such as those provided by a third-party offering the cloud-based storage service, to log into the cloud-based storage service and establish a storage connection between the storage service and a virtualized application instance. In various embodiments, the storage management module 606 allows various virtualized environments to access one or more remote cloud-based storage services or facilities. The storage may be access by different programs in any number of ways (e.g., through drive letters as if the cloud-based storage was merely another local data drive).

In addition, in some embodiments, where direct integration with a cloud-based storage service is not available (e.g., no APIs are available), the storage management module 606 may facilitate locally storing (e.g., locally caching) on the ASP system 310 (e.g., on the ACS 312 or an APS presently operating a virtualized application instance) files from the cloud-based storage service being accessed by a virtualized application instance, and then (when necessary) updating such files on the cloud-based storage service using the locally stored files and through less direct means (e.g., web-based upload through a scripted bot).

The collaboration management module 608 may be configured to enable collaborative access, by two or more users, to applications provided through the ASP system 310 and the storage entities natively accessible by the applications, such as third-party, cloud-base storage services (e.g., Dropbox, Box, or Google® Docs). Depending on the configuration of the embodiment, the collaboration features may be synchronous (e.g., based on concurrent access and control of the same virtualized application instance/application session by two or more users) or asynchronous (e.g., two or more users having access to the same data, such as files, but through disparate application sessions, typically accessed at different times).

The analytics, bill, and monitoring (ABM) module 610 may be configured to permit an owner, operator or administrator of the ASP system 310 to perform various functions relating to gathering statistics and generating analytics regarding operation of the ASP system 310, implementing a billing system for the ASP system 310, and to monitoring various operational aspects of the ASP system 310 and its associated components (e.g., associated ACSs 312, 314, and 316 and APSs 318, 320, and 322).

For some embodiments, the statistics gathered or the analytics generated may include information based on the overall operation of the ASP system 310, operation of the ACS 312 or its counterparts ACSs 314 and 318, one or more of the APSs 318, 320, and 322, or information relating to user usage of or user access (e.g., application or storage) through the ASP system 310. The information may pertain to performance or usage of various computing resources, including for instance memory (e.g., static or volatile), processing resources, networking resources (e.g., networking connections or equipment), and cloud-based resources (e.g., SaaS, PaaS, or IaaS, which may be privately operated or provided by a third-party vendor). The ABM module 610 may be configured to export the statistical/analytical information gathered or generated to external services or computer applications operable in analyzing or reporting on the information provided. The exportation process may between the ABM module 610 and an external service/computer application may be facilitated through an interface (e.g., API utilized by the service or application, or utilized by the ABM module 610).

In support of its statistical/analytical functions, the analytics storage 618 of the ACS 312 may be utilized in storing statistics gathered or analytics generated by the ABM module 610. Additionally, in certain embodiments, the analytics storage 618 may be utilized to store rules, programs, or scripts that determine what statistics are gathered by the ABM module 610 for the ASP system 310, or what analytics are generated by the ABM module 610 for the ASP system 310.

With respect to the billing system, the ABM module 610 may relating to implementing a billing system by which user access usage of the ASP system 310 can be tracked, reported on, or charged by the owner, operator or administrator of the ASP system 310. In various embodiments, the billing functionalities of the ABM module 610 may be performed according to a billing schedule/rates defined by the owner, operator or administrator in association with user utilization of application or storage access services provided by the ASP system 310. In embodiments where the ASP system 310 utilizes one or more third-party services in conjunction with performing its functionalities, the billing schedule/rates may be updated/dynamically adjusted (possibly in real-time) to account for a change in costs/expenses relating to those third-party services. For instance, where various functionalities of the ASP system 310 rely on cloud-based services (e.g., SaaS, PaaS, or IaaS) provided by a third-party, an adjustment in rate charged for such cloud-based services (which may be charged) may be automatically reflected in the billing schedule/rates applied by the ABM module 610 to a user's access through the ASP system 310. Depending on the embodiments, the rate adjustment to the billing schedule/rates may be according to the types of applications or storage services accessed through the ASP system 310 and how those types utilize the third-party services.

For some embodiments, the ABM module 610 may further be configured to interface and communicate with an external billing or accounting service or computer application configured to receive billing information from the ABM module 610. Such billing information may contain, for example, charges accrued by users accessing the ASP system 310 in generally or, possibly, only those charges accrued by users accessing the ASP system 310 through the ACS 312 in particular.

The load balancing module 612 may be configured to facilitate load balancing features with respect to the ACS 312. For some embodiments, the load balancing support may include enabling the ACS 312 to receive access server-related tasks/operations distributed by the ASP system 310 amongst the various ACSs (e.g., 312, 314, and 316), or enabling the ACS 312 to distribute application server-related tasks/operations amongst the various APSs (e.g., 318, 320, and 322).

The security and authentication (SA) module 614 may be configured to perform operations relating to user login or authentication for the ASP system 310. To perform such operations, the SA module 614 may (directly or indirectly) interface and communicate with an authentication mechanism internal to the ASP system 310 (not shown) or external to the ASP system 310, which may be maintained by a third-party (e.g., a private enterprise authentication system, possibly maintained by an organization with which the user is associated). For example, the SA module 614 may establish a (secure) connection with an Microsoft® Active Directory® server or other Lightweight Directory Access Protocol (LDAP)-compatible server, operated and maintained external to the ASP system 310 (e.g., within the user's enterprise network), in performing login or authentication operations. The SA module 614 may, for some embodiments, utilize a single-sign-on (SSO) mechanism, such as those known in the art, for user login or user authentication.

Figure 7:
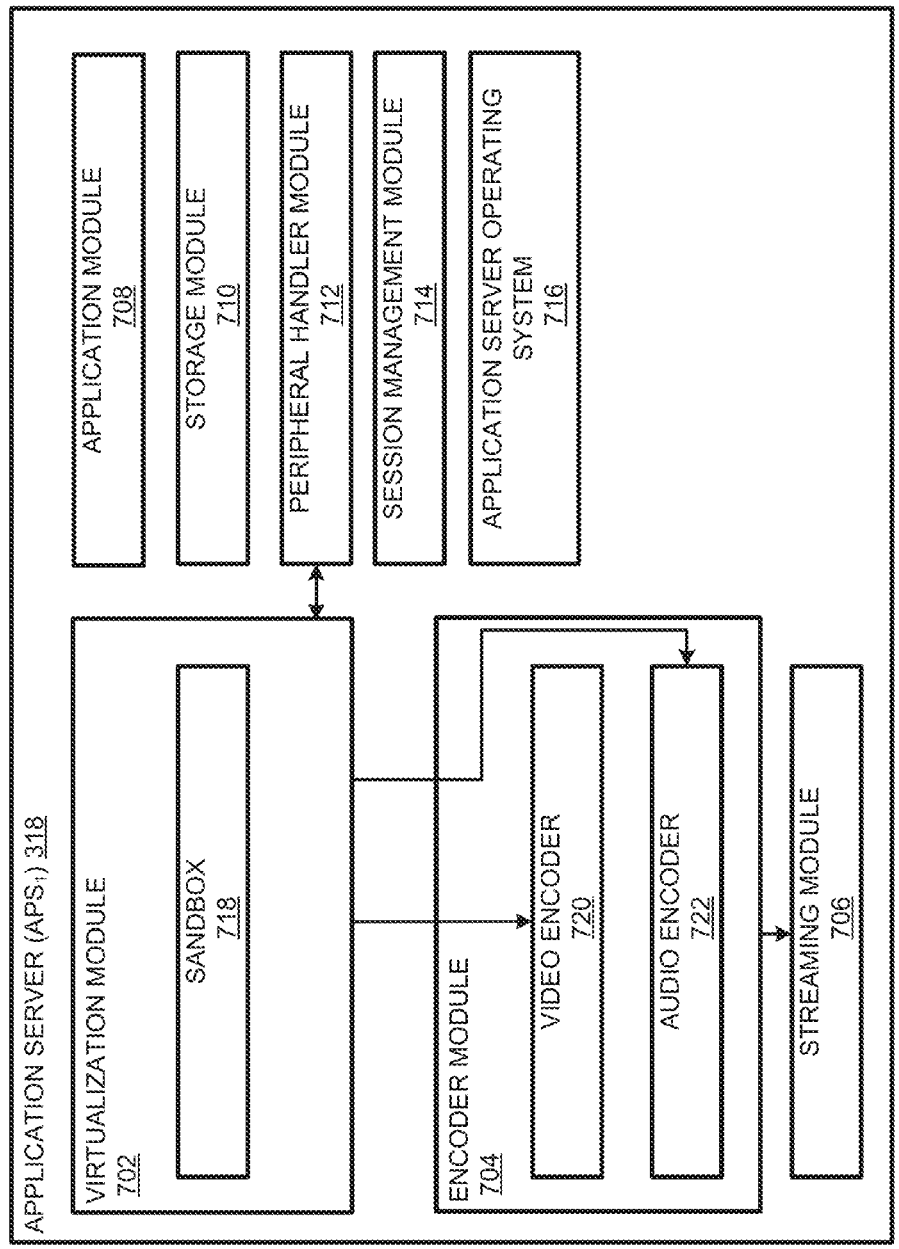
FIG. 7 is a block diagram illustrating an exemplary application server that is part of an exemplary system for providing application access in accordance with various embodiments.

FIG. 7 is a block diagram illustrating an exemplary application server, specifically the application server (APS) 318, which is part of an exemplary system for providing application access in accordance with various embodiments. As shown, the APS 318 comprises a virtualization module 702, an encoder module 704, a streaming module 706, an application module 708, a storage module 710, a peripheral handler module 712, a session management module 714, and an application server operating system 716 (configured to support operations of the APS 318 and its various components).

In some embodiments, the virtualization module 702 may be similar in operation or functionality to the virtualization module 208. Accordingly, the virtualization module 702 may be configured to establish, monitor, maintain, or otherwise manage execution of a virtualized application instance for the APS 318. As described herein, the virtualized application instance for the purpose of a user at client device accessing the virtualized application instance through the ASP system 310. As shown in FIG. 7, the virtualization module 702 may comprise a (computer) sandbox 718 that, in accordance with some embodiments, is configured to separate computing resources (e.g., memory, processor, input/output), of a (physical or virtual) computer system, utilized in performing virtualized application instances. In some instances, each virtualized application instance may be instantiated in a separate sandbox. In various embodiments, the sandbox 718 may be operating within the virtualization module 702 or, alternatively, be operating external to the virtualization module 702, the APS 318, or the ASP 310 (e.g., in a cloud-based service, such as an IaaS or PaaS) but under the control of the virtualization module 702 (e.g., via APIs).

In general, the computing environment implemented by the sandbox 718 may be configured to receive input data and transmit output data. Examples of input data to the sandbox 718 can include communications data (e.g., network data) or control information (e.g., produced by a human machine interface [HMI] device, such as a mouse or keyboard). Examples of output data from the sandbox 718 can include video data (e.g., data generally produced and outputted to a video display) or audio data (e.g., data generally produced and outputted to audio output device, such as speakers). For some embodiments, providing a user at a client 304 with access to a virtualized application instance operating in the sandbox 718 can comprise conveying input data or output data between the client 304 and the ASP system 310 and, more specifically, between the client module 502 operating on the client 304 and the virtualization module 702 of the APS 318.

Before conveying the output data from the virtualization module 702 (e.g., from the sandbox 718) to the client 304 (e.g., to the client module 502), some embodiments may utilize the encoder module 704 to encode the output data in a format capable of being decoded at the client 304. For some embodiments, the encoder module 704 may perform this encoding in accordance similar to the encoder module 214 described with respect to FIG. 2A.

As shown in FIG. 7, the encoder module 704 may specifically comprise a video encoder 720 configured to receive video output data from the virtualization module 702 (e.g., generated by the virtualized application instance operating in the sandbox 718) and encode that video output data to encoded video data. Additionally, the encoder module 704 may specifically comprise an audio encoder 722 configured to receive audio output data from the virtualization module 702 (e.g., generated by the virtualized application instance operating in the sandbox 718) and encode that video output data to encoded audio data.

As also shown in FIG. 7, the encoded (video or audio) data produced by the encoder module 704 may be provided to the streaming module 706 for delivery to the client 304 (e.g., to the client module 502), possibly as one or more data streams (e.g., each carrying a different type of data). For example, the streaming module 706 may receive encoded audio data and encoded video data from the encoder module 704 and generate a single data stream (i.e., containing both the audio and the data) that is subsequently delivered to the client module 502 of the client 304. The client module 502, in turn, may extract the encoded audio data and the encoded video data from the received data stream, and decode the data (e.g., using the decoder 508) for presentation to a client at the client 304 (e.g., through a client user interface generated by the workspace application 504). In some embodiments, the operation or functionality of the streaming module 706 may be similar to of the streaming module 216 described in FIG. 2A.

The application module 708, for some embodiments, may be similar in operation or functionality to the application module 210 described in FIG. 2A. Accordingly, the application module 708 may be configured to obtain a version of an application (e.g., Microsoft® Excel®) from an application repository maintaining an application copy/image of that version (e.g., operating on a cloud-based server). Upon obtaining the version of the application, the application module 708 may provide the version to the virtualization module 702, either by reference (e.g., data path to the version) or as a copy, for instantiation as a virtualized application instance operating in the sandbox 718.

In some embodiments, the storage module 710, possibly in combination with the storage module 614, is similar in operation or functionality to the storage module 206 described in FIG. 2A. For example, the storage module 710 may be configured to operate in conjunction with the storage management module 606 of the ACS 312 to add, remove, modify, or manage connections between the ASP system 310, particularly the APS 318, and various storage entities, such as databases, cloud-based storage services, and traditional file servers (e.g., a private enterprise file server). According to some embodiments, the storage module 710 in combination with the storage management module 606 may establish a storage-related connections between a virtualized application instance operating in the virtualization module 702 (e.g., in the sandbox 718) and a third-party, cloud-based storage service (e.g., Dropbox, Box, or Google® Docs), which is generally external to the ASP system 310. As described herein, the establishment of a connection between the virtualized application instance and the third-party, cloud-based storage service may involve logging into the storage entity using third-party user credentials stored and provided (e.g., by the UP module 604) in association with a user accessing the virtualized application instance.

In various embodiments, the peripheral handler module 712 may be configured to handle input data received from a user at the client 304 (e.g., from the client module 502) and convey/redirect such input data to the virtualization module 702 (e.g., a virtualized application instance operating in the sandbox 718). As described herein, the input data may include, for example control information generated by a human machine interface (HMI) device, such as a mouse, keyboard, joystick, or touch screen. While conveying/redirecting the received input data, the peripheral handler module may translate the input data from a first input type, native to an environment of at least one of the client devices, to a second input type, native to an environment of the virtualized application instance. For some embodiments, the system may further comprise a peripheral handler module configured to redirect an output data received from the virtualized application instance to a peripheral coupled to at least one of the client devices.

For instance, where the control information received from the client 304 is fully or partially incompatible with the version of the application (e.g., Microsoft® Excel® 2011) operating in the virtualized application instance or incompatible with the operating system of the virtual computing environment in which the virtualized application instance is operating (e.g., Microsoft® Excel® 2011), the peripheral handle module 712 may be capable of translating, converting or remapping the control information from a first input data type that is native/compatible with the client 304 or with the operating system of the client 304 (e.g., Apple® iOS), to a second input data type that is native/compatible with the version of the application operating in the virtualized application instance or with operating system of the virtual computing environment in which the virtualized application instance is operating. Take for example where control information received from the client 304 (e.g., the client module 502) contains gestures entered on a touch screen at the client 304. Such control information, which may be native to/compatible with mobile devices (e.g., based on Android® or Apple® iOS), may be translated or remapped by the peripheral handler module 712 to mouse movements or keyboard inputs that, in the virtual computing environment of the virtualized application instance, equate to or are a substitute for the gestures originally entered at the client 304. Accordingly, for certain embodiments, the operation or functionality of the peripheral handle module 712 may include the operations or functionalities described with respect to the gesture module 212 of FIG. 2A.

In accordance with some embodiments, the session management module 714 may be configured to manage or monitor application sessions in association with virtualized application instances being operated by the virtualization module 702. In accordance with embodiments described herein, an application session may be generated for one or more virtualized application instances being accessed by a given user at the client 304. As such, the application session may be utilized by the ASP system 310 to associate one or more virtualized application instances with a given user accessing those virtualization application instances through the ASP system 310. In some embodiments, an application session may be established concurrently with (e.g., at or near the time of) the instantiation of the virtualized application instance associated with the session. Alternatively, an application may be established and associated with a virtualized application instantiation already operating in the virtualization module 702 (e.g., one that was initially started for another user during another application session, but has now been reset for the newly established application session associated with another user).

In addition to storing the association between a virtualized application instance and a given user, the application session maintained by the session management module 714 may periodically save the current state of the virtualized application instance as operated upon by the user. In doing so, the session management module 714 may preserve application sessions after a user at the client 304 has signed out of the ASP system 310 or the client 304 has lost network connection with the ASP system 310 (or the APS 318). For some embodiments, such a feature may permit the user at the client 304 to resume previous stared application sessions without the need to start with a new virtualized application instance in a new application session.

Figure 8:
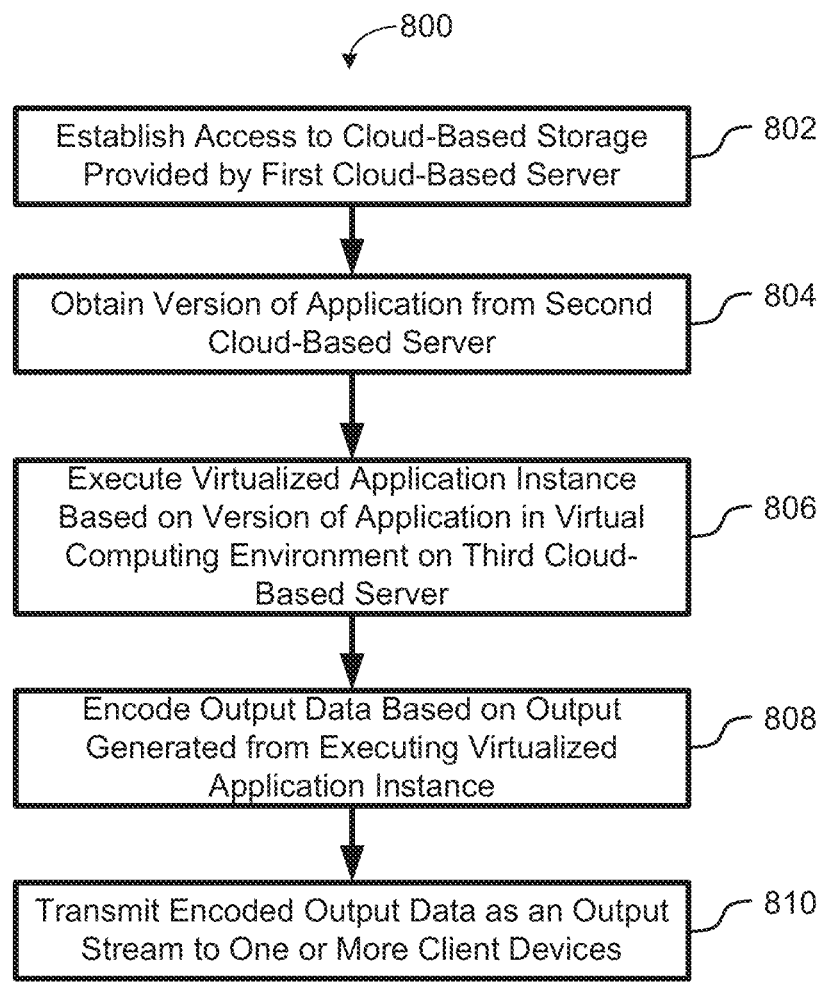
FIG. 8 is a flowchart illustrating an exemplary method for providing application access in accordance with various embodiments.

FIG. 8 is a flowchart 800 illustrating an exemplary method for providing application access in accordance with various embodiments. For some embodiments, the method presented by the flowchart 800 may be implemented using various components of the ASP system 104 of FIG. 2A, as described below. For example, the method may begin at step 802 with the access server module 204 establishing access to a cloud-based storage provided by a first cloud-based server (e.g., the cloud-based service server 110, which may be operated by a third party such as Dropbox, Box, or Google® Docs) over a network (e.g., network connection 112). In some embodiments, the access with the cloud-based storage is established using access parameters provided by a user at a client (e.g., the client 102) before or during step 802, or parameters stored on the ASP system 104 in association with the user at the client. Additionally, in establishing access to the cloud-based storage, the access server module 204 may employ various standard or proprietary file system protocols, including those known to those skilled in the art (e.g., network file system protocols, such as Samba [SMB], Network File System [NFS], or Andrew File System [AFS]). Such file system protocols may support data (e.g., file) access connections between the ASP system 104 (e.g., the access server module 204, the virtualization module 208, or the application module 210, through which a virtualized application instance can then access data.

At step 804, the application module 210 may obtain a version of an application (e.g., Microsoft® Excel®) from a second cloud-based server (e.g., an application repository). At step 806, the virtualization module 208 may execute a virtualized application instance based on the version of the application obtained at step 804, in a virtual computing environment (e.g., using a cloud-based service, such as SaaS, IaaS, or PaaS). In various embodiments, the virtualized application instance may be executed such that the virtualized application instance has native/direct access to data stored on/made available through the cloud-based storage with which access is established at step 802. Each virtualization may be performed in a sandbox.

As the virtualized application instance is executed, at step 808, the encoder module 214 may receive output data (e.g., video, audio, or other data) from the executing virtualized application instance (e.g., video output from a video editing application executing in the virtualized application instance) and encode the received output data in a format compatible for decoding by the client module 202 (e.g., as or once the encoded output data is delivered from the ASP system 104 to the client 102).

The output data encoded by the encoder module 214 at step 808 may be delivered by the ASP system 104 to the client 102 for decoding and presentation (e.g., through the client user interface). In some embodiments, the encoded output data from the encoder module 214 may be delivered to the client 102 at step 810 as a data stream generated by the streaming module 216. Depending on the embodiment, the data stream delivered may be such that the client 102 can extract and decode the encoded output data contained in the stream (e.g., using the client module 202). Additionally, for some embodiments, the streaming module 216 may generate the data stream such that the data stream comprises two or more individual data containing different data types. For example, an audio data stream generated by the streaming module contains may contain encoded audio output data from the virtualized application instance executing on the ASP system 104 on behalf of a client at the client 102.

Though the steps of the above method may be depicted and described in a certain order, those skilled in the art will appreciate that the order in which the steps are performed may vary between embodiments. Additionally, those skilled in the art will appreciate that the components described above with respect to the method of the flowchart 800 are merely examples of components that may be used with the method, and that other components may also be utilized in some embodiments.

FIGS. 9-12 provide screenshots 900, 1000, 1100, and 1200 of an exemplary client user interface configured to interact with an exemplary system for providing application access in accordance with various embodiments. As noted herein, the exemplary client user interface presented by the screenshots 900, 1000, 1100, and 1200 may be an interface generated or otherwise provided by a client module (e.g., the client module 202 of FIG. 2A) operating on a client (e.g., tablet computer, or mobile phone), accessible to a user, and configured to allow the user to select and open files or applications made available to them through the exemplary system (e.g., the ASP system 104 of FIG. 1).

Figure 9:
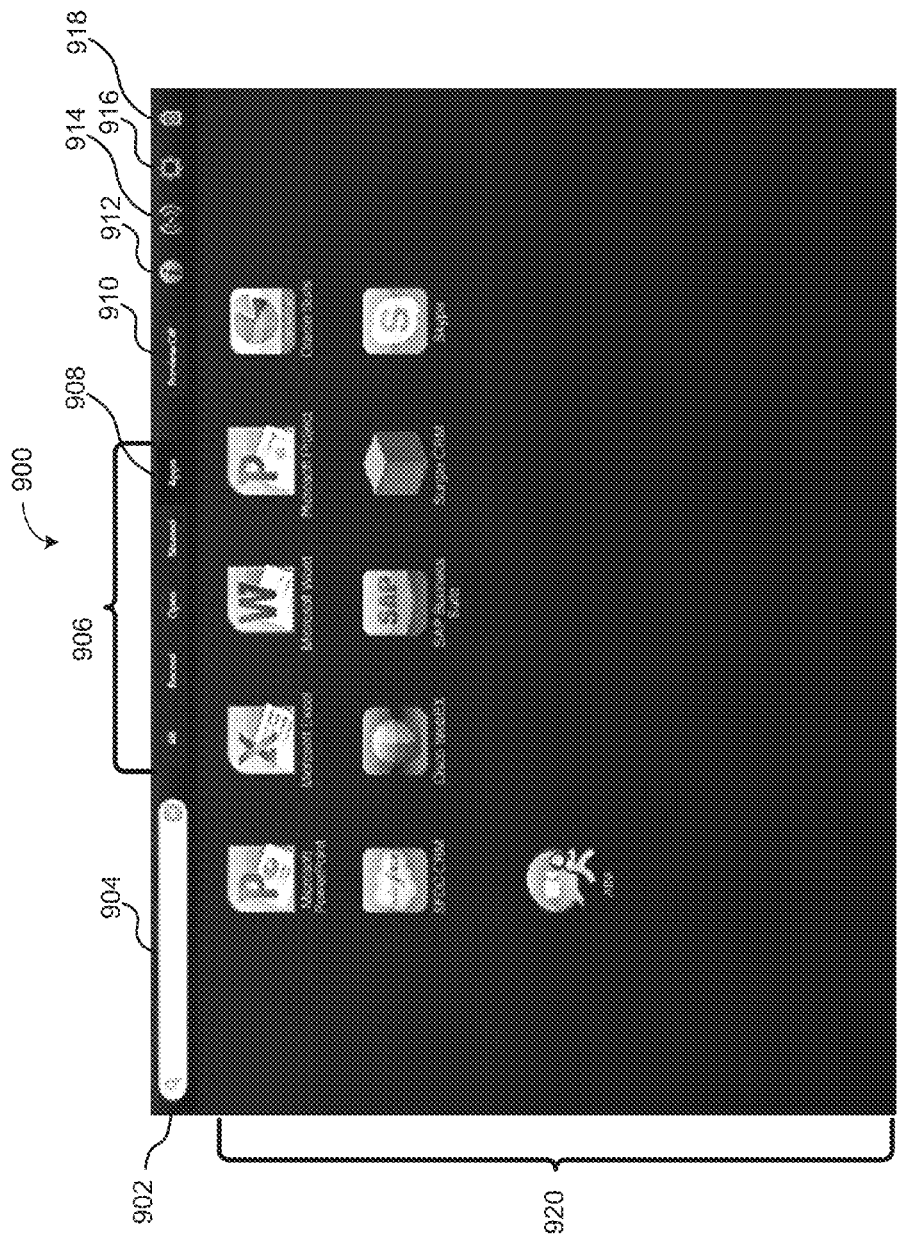
FIGS. 9-12 provide screenshots of an exemplary client user interface configured to interact with an exemplary system for providing application access in accordance with various embodiments.

In FIG. 9, the screenshot 900 presents the exemplary client user interface configured in an application-view mode, where the exemplary client user interface presents a listing of the applications (e.g., listing of icons representing applications) provided by the exemplary system (e.g., the ASP system 104 of FIG. 1) for access (e.g., selection and invocation, or for previewing the listing) by a user using the exemplary client user interface. As shown in the screenshot 900, the exemplary client user interface includes a function bar 902 at top of the interface, which may be configured to provide a user with menu selections, option selections, and search capabilities, and a viewing pane 920, which may be configured to present a listing of items (e.g., listing of files or listing of applications available through the exemplary client user interface) in accordance with user selections made through function bar 902.

The shown application icons may indicate different applications that are available to the user. Each application may be initiated within one or more virtualizations. In some embodiments, each application has a separate virtualization. The virtualization may be performed by the ASP 104, ACS 312, APS 318, or the like.

To facilitate the user interaction with the exemplary client user interface and more particularly the function bar 902 of the interface, the function bar 902 may comprise a search field 904 by which a user can textually search for files or applications accessible to the user through the exemplary client user interface. The function bar 902 may also comprise a view-mode selection bar 906 by which a user can select the toggle between different viewing modes for the viewing pane 920 (e.g., an application-view mode, where applications accessible to the user are listed in the viewing pane 920, or a file-view mode where files accessible to the user are listed in the viewing pane 920). For example, the view-mode selection bar 906 may allow a user to select between viewing, in the viewing pane 920, a listing of all accessible files, a listing of files recently access by the user, a listing of files currently open, a listing of files shared with other users (e.g., via the collaboration module 608), or a listing of applications available for access (e.g., by a user selecting an application toggle button 908). For some embodiments, the function bar 902 may provide a preview toggle button 910, which may be selected by a user to enable or disable a file preview feature of the viewing pane 920. Through use of the preview feature, a file may be displayed through the viewing pane 920 as read-only, possibly for presentation purposes (e.g., slide show) or for providing a quick preview of the file before it is opened for editing.

When a user wishes to view or change their account information (e.g., username, password, payment method, balance, e-mail address, etc.), they may select an account information button 912 that may be included on the function bar 902. Likewise, when a user wishes to share (or collaborate on) a listed item in the viewing pane 920 (e.g., file or application) with another user (e.g., a sharing user), the user may select a share button 914 included on the function bar 902, which may cause a share/collaboration menu to be provided by the exemplary client user interface.

As discussed herein, through a share/collaboration menu, some embodiments permit a user to grant one or more other online or offline users of an ASP system (e.g., the ASP system 104) share access to the particular virtualized application instance currently operating in the viewing pane 920 (or, alternatively, one already operating in the background for the user but not presently shown in the viewing pane 920), share access to the file currently being accessed through the particular virtualized application instance. For some embodiments, a user may implement limitations on the share access they authorize for other users, including an expiration time associated with the share grant and the type of share access to be granted (e.g., asynchronous share access, synchronous share access, password-protected access, or read-only access). Additionally, in some embodiments, the share/collaboration menu may permit the current user to receive from another user (of the ASP system) a request for share access and the type of share access that the current user may approve or deny, to view history relating to access of a shared file or application by other users, or to monitor the shared access of a file or application by other users.

In order to configure the settings of either the exemplary client user interface, the client module providing the exemplary client user interface (e.g., the client module 202 of FIG. 2A), or the exemplary system operating in conjunction with the exemplary client user interface (e.g., the ASP system 104 of FIG. 1), a user may select a configuration button 916 on the function bar 902. Deleting a listed item (e.g., accessible file or application) from the viewing pane 920 may be facilitated by a user selecting the listed item in the viewing pane 902 and then selecting a delete item button 918. Depending on the embodiment, deleting an item from the viewing pane 920 may result in removing access to the item, removing the item from storage on the exemplary system (e.g., the ASP system 104 of FIG. 1), or both.

The viewing pane 920 may present a listing of items, such as applications or files, available by the exemplary system for access or selection by the user. By way of example, where the exemplary client user interface is presented through a tablet computing device operating as a client, a user may invoke one or more of the applications listed by the exemplary client user interface by utilizing the input means provided by the tablet computing device (e.g., touch screen interface, keyboard, or stylus). Depending on the embodiment, the exemplary client user interface may be configured such that the applications are listed for selection according to application availability to users utilizing the exemplary client user interface. Examples of application availability can include availability based on the privileges of the current user logged into the client user interface, availability based on resources presently available to the exemplary system (e.g., computing resources or connection bandwidth), or some combination thereof. In some embodiments, the exemplary client user interface may list both available applications and unavailable application, with each listed being presented according to their availability. For example, where icons are employed in the viewing pane 920 to list applications, icons representing applications unavailable for selection by the user may be dithered (or otherwise visually modified) in comparison to icons representing applications available for selection by the user.

The screenshot 1000 of FIG. 10 presents the exemplary client user interface with the viewing pane 920 configured in a file-view/file management mode. In particular, the screenshot 1000 shows that through the view-mode selection bar 906, a user has chosen a file management mode where all files accessible to the user are listed in the viewing pane 920. For some embodiments, access to files through the viewing pane 920 while in file management mode may comprise selecting (e.g., for opening in a virtualized application instance), adding (e.g., by creation of a new file or by upload), deleting, moving, and renaming files. As described herein, the file presented in the viewing pane 920 may be those from one or more third-party cloud-based storage services. In file management mode, the viewing pane 920 may be configured to present files in a common manner, regardless of their respective cloud-based sources. In this way, various embodiments may present the files to a user for access in a universal and agnostic manner, independent of what application is needed to open the file (e.g., version of application) or where the file is stored.

Figure 11:
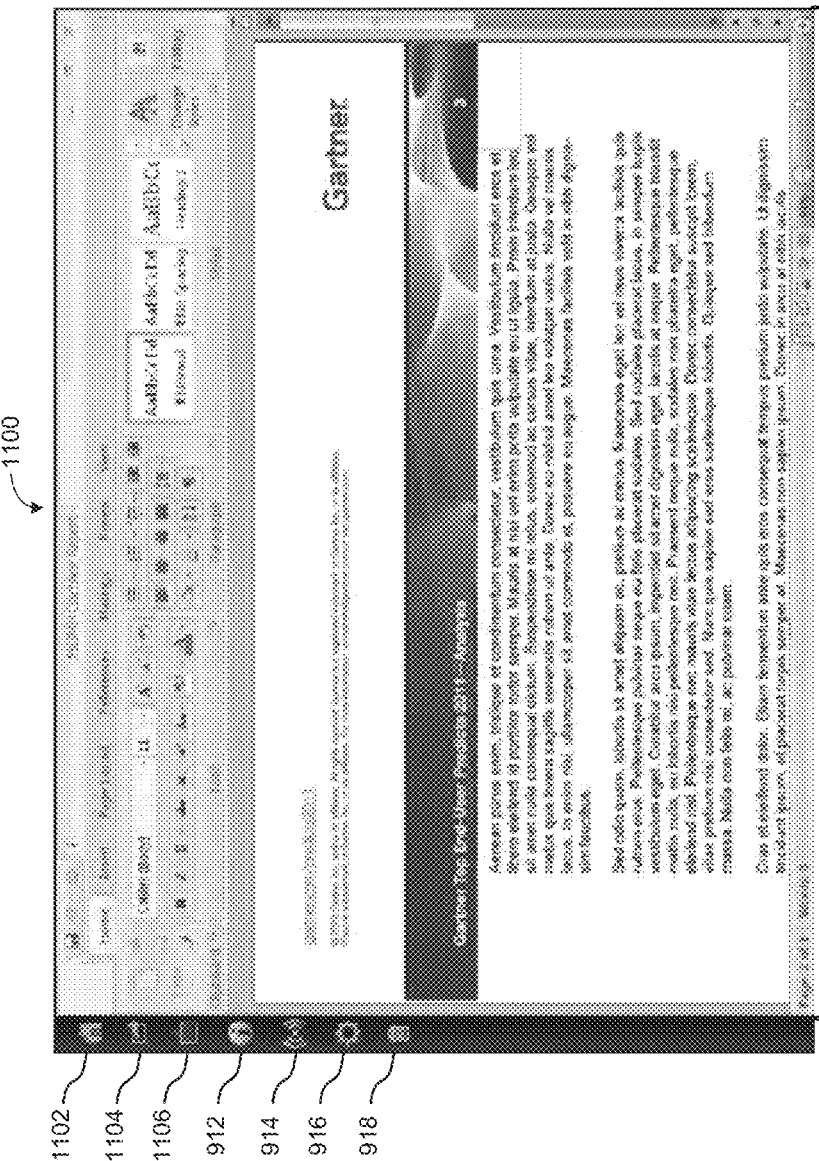

The screenshot 1100 of FIG. 11 presents the exemplary client user interface after selection of a file or an application through the exemplary client user interface. The screenshot 1100 specifically shows what the exemplary client user interface may appear as after a word processing file (e.g., Microsoft® Word® file) or an application (e.g., Microsoft® Word®) listed in the viewing pane 920 has been selected by a user through the exemplary client user interface. For some embodiments, when a user selects a file through the exemplary client user interface (e.g., via the viewing pane 920), an application compatible with file (e.g., compatible with the format of the file) and provided by the exemplary system (e.g., the ASP system 104 of FIG. 1) may be invoked to open or operate on the file.

As shown in the screenshot 1100, after a file or application has been selected, the exemplary client user interface may comprise: a home button 1102, which may be configured to return a user to the exemplary client user interface of FIG. 9 or FIG. 10 upon selection; an open button 1104, which may be configured to open one or more files (in addition to the currently shown file) using the application currently active and displayed through the exemplary client user interface or through another application (e.g. one already active in the background or newly invoked for the purpose of the other file); a maximize/minimize/window control button 1106, which may be configured to control a size of the window interface and an active application viewing pane 1108, through which the currently active application may be displayed (e.g., the display output for the application). Generally, the currently active application is the application a user has currently chosen to use through the exemplary client user interface. In some embodiments, the open button 1104 may cause the exemplary user interface to present a listing of files available for opening through the application currently active and displayed through the exemplary client user interface, or through another application available through the an APS system (e.g., the ASP system 104). The files listed may include those provided by a cloud-based service having a connection established with the APS system (e.g., the ASP system 104).

As also shown in the screenshot 1100, the exemplary client user interface may further provide the account information button 912, the share button 914, the configuration button 916, and the delete item button 918 described in FIG. 9. In the context of FIG. 11, the delete item button 918 may be configured to delete the currently active application or the current file being operated on by the currently active application). An application viewing pane 908 displays video output data from the active application currently being provided to the user through the exemplary client user interface.

Figure 12:
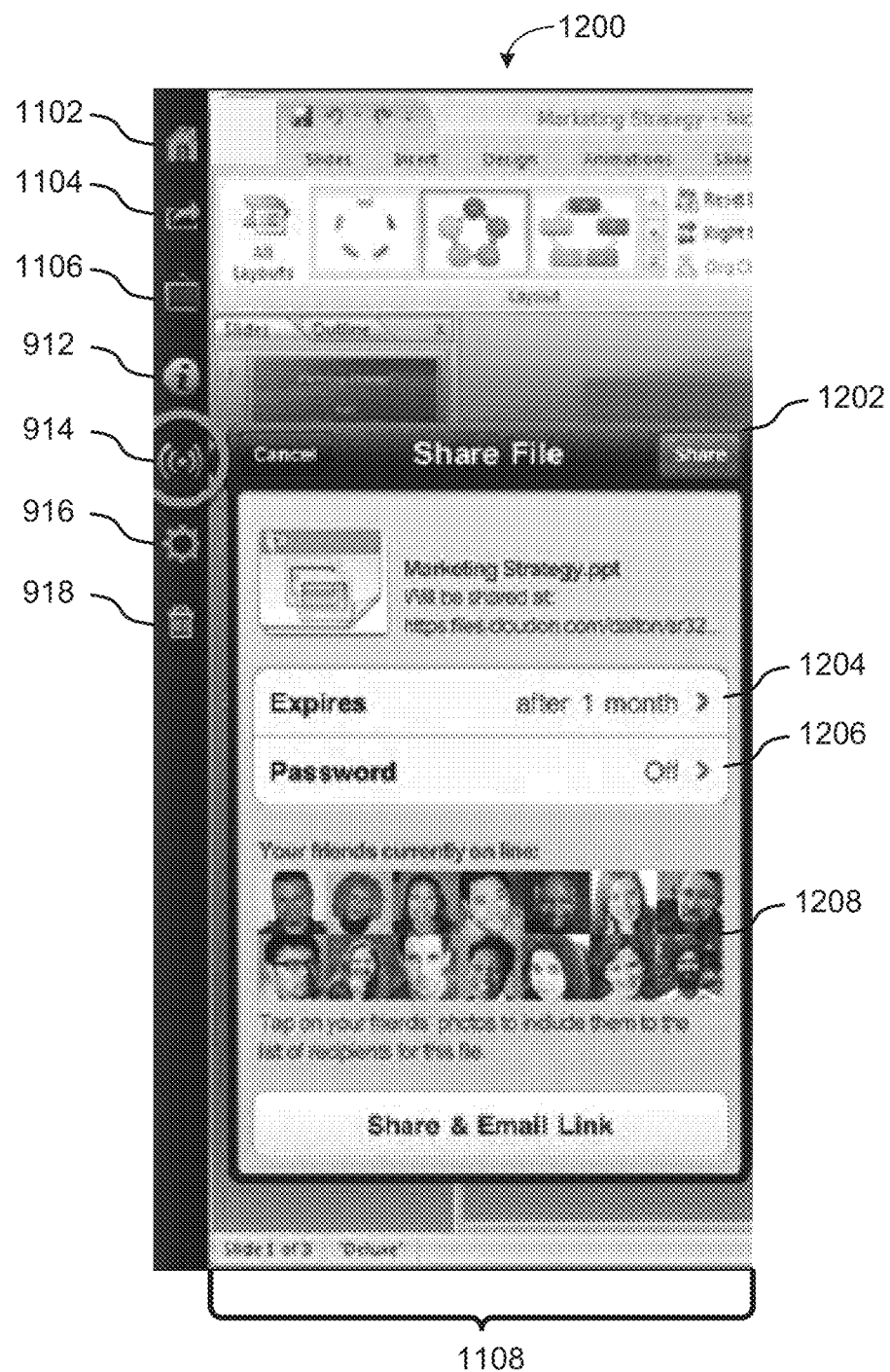

The screenshot 1200 of FIG. 12 presents a close up of the exemplary client user interface upon selection of the share button 914. As shown in the screenshot 1200, once a user selects the share button 914, a share dialog box 1202 may be presented (e.g., over the active application viewing pane 1108) to configure the share. Through an expiration field 1204, the share dialog box 1202 may permit a user to specify when a share (e.g., with one or more other user on the exemplary application service provider system 104 of FIG. 1) will expire (e.g., by hours, days, months, or a specific date). The share dialog box 1202 may also permit a user to enable or disable a password for the share (e.g., where a sharing user is prompted with a password before being granted access to the shared file or application). A share user selection menu 1208 in the share dialog box 1202 may facilitate a user's selection of one or more sharing users with which a select file or application will be shared. For some embodiments, the share may be delivered by way of electronic mail (e-mail) or text message system, possibly internal or external to the exemplary system. In the context of the screenshot 1200, the share to be created by the user may be for the current file or currently active application being presented in the active application viewing pane 1108.

Figure 13:
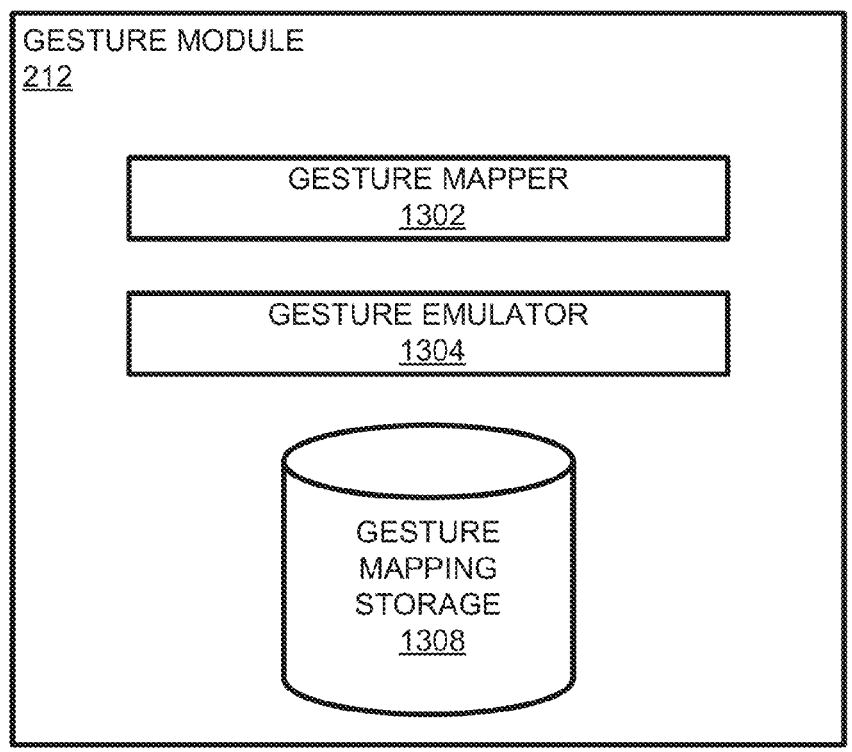
FIG. 13 is a block diagram illustrating an exemplary gesture module for providing gesture functionality in accordance with various embodiments.

FIG. 13 is a block diagram illustrating the gesture module 212 in accordance with various embodiments. The gesture module 212 may comprise a gesture mapper 1302, a gesture emulator 1304, and a gesture mapping storage 1308. The gesture module 212 may be configured to translate or map gesture user inputs to one or more alternative user inputs (e.g., set of input events) compatible with the virtualized application instance being provided or the virtual computing environment operating the virtualized application instance. With respect to the illustrated embodiments of FIGS. 2 and 3, the user input may be received at the ASP system 104 from the client module 202. The user input received from the client module 202 may be in the form of user input data (e.g., gesture data where the user input is a gesture input), which the gesture module 212 may use to identify the user input and then map the user input to one or more user inputs (e.g., the set of input events) compatible with the virtualized application instance or the virtual computing environment operating the virtualized application instance.

The gesture mapper 1302 may be configured to receive gesture data relating to the gesture received at the client 304 (e.g., through the client module 202) and mapping the user input data to a set of input events that emulate the gesture input for the virtualized application instance operating on the ASP system (e.g., the ASP system 310). In mapping the gesture data to a set of input events, the gesture mapper 1302 may consider several factors including, without limitation, a movement physics model (e.g., a flick model or a polynomial physics model), the type of application or operating system in the virtualized application instance and/or the virtual computing environment that is to receive the set of input events, and the current state of the virtualized application instance. The current state of the virtualized application instance may include the type of virtualized application instance, the current user selection(s) in the virtualized application instance, the current viewing mode of the virtualized application instance, the current position of user input cursor(s), or the current active pane in the virtualized application instance.

According to some embodiments, upon receiving gesture data from a client (e.g., the client module 202, which may include a gesture input module 510) the gesture mapper 1302 may identify a window (or some other graphic user interface) associated with the virtualized application instance and at the current position of an input cursor (e.g., mouse cursor). The gesture mapper 1302 may further analyze the state of scrollbar(s) of the virtualized application instance as the gesture mapper 1302 maps the gesture data to the set of input events.

The following Table 1 enumerates one or more exemplary mappings of particular gestures to sets of input events (e.g., actions executed in connection with the virtualized application instance or the virtual computing environment), which may be utilized by the gesture mapper 1302.

TABLE 1

| GESTURE | SET OF INPUT EVENTS |
| --- | --- |
| TWO-FINGER DRAG UP | Move screen of the virtualized application instance down when the screen is in zoomed-in mode or, alternatively, move the virtualized application instance itself upwards. |
| TWO-FINGER DRAG DOWN | Move screen of the virtualized application instance up when the screen is in zoomed-in mode, or move the virtualized application instance itself downwards. |
| DUAL FINGER DRAG RIGHT | Move screen of the virtualized application instance left when the screen is in zoomed-in mode, or move the virtualized application instance itself right. |
| DUAL FINGER DRAG LEFT | Move screen of the virtualized application instance right when the screen is in zoomed-in mode, or move the virtualized application instance itself left. |
| PINCH-IN (THUMB AND INDEX FINGER) | => zoom out of the virtualized application instance; when the virtualized application instance is fully zoomed out if virtualized application instance is in full screen change back to regular screen; perhaps zoom out in predefined % of decrements. |
| PINCH-OUT (THUMB AND INDEX FINGER) | => zoom in to the virtualized application instance; if the virtualized application instance is in full screen change back to regular screen; when the virtualized application instance has reached predefined zoom no action; zoom in predefined % increments. |
| SINGLE FINGER SWIPE UP (QUICK AND LIGHT) | Scroll the document currently open in the virtualized application instance downwards. |
| SINGLE FINGER SWIPE DOWN (QUICK AND LIGHT) | Scroll the document currently open in the virtualized application instance upwards. |
| SINGLE FINGER LEFT | Scroll the document currently open in the virtualized application instance right. |
| SINGLE FINGER RIGHT | Scroll the document currently open in the virtualized application instance left. |
| FOUR FINGERS SWIPE UP | Maximize active the virtualized application instance. |
| FOUR FINGERS SWIPE DOWN | Show all currently operating virtualized application instances as stacked windows on a desktop (e.g., cascade arrangement). |
| FIVE FINGER TAP | Toggle an on-screen keyboard on and off. For example, invoke an on-screen keyboard if it is not active, or hide the on-screen keyboard if it is active. |
| SINGLE FINGER LONG TAP OR LONG PRESS/ HOLD AND RELEASE | Perform right click. Example hold time may be between 0.3 and 0.4 s. |

TABLE 1-continued

| GESTURE | SET OF INPUT EVENTS |
| --- | --- |
| SINGLE FINGER TAP | If a text box is selected by the tap, then move cursor to the text box and invoke the on-screen keyboard. If an object is selected by the tap, then select the object and bring up a drawing toolbar. |
| SINGLE FINGER LONG TAP AND DRAG | If an object is selected by the tap and if the finger is positioned within the confines of the object, then drag/move the object according to the vector of the drag. If a word or paragraph is selected by the tap, then drag the word or paragraph. If no word or paragraph is selected, then select text according to the input cursor and the vector of the drag. |
| SINGLE FINGER LONG TAP AND DRAG | => if object and if finger positioned just outside object and if the long hold circle covers a vertex then dragging will effectively drag that vertex and resize the object or in the case of a rotate vertex will allow the object to be manipulated. |
| DOUBLE-TAP | Select word according to the tap. |
| TRIPLE-TAP | Select paragraph according to the tap. |
| DUAL FINGER LONG HOLD AND ROTATE | Rotate the current selected object if is rotatable. |
| SCROLLING OVER PANES IN A MULTI-PANE APPLICATION | Cause the relevant pane to scroll. |

As noted herein, for some embodiments, the gesture mapper 1302 and the set of input events determined by the gesture mapper 1302, may utilize movement physics model such as a flick model or a scroll model, as a gesture input is mapped to the set of input events. Evaluating the movement physics model for a gesture being mapped may comprise analyzing such gesture data (e.g., received from the client module 202) as the movement type (which may be recognized by the client 102 or the APS system 104), a vector information representing the gesture to be mapped (e.g., X/Y coordinates of the start and stop positions of the gesture, and gesture timestamps (e.g., for gesture start and stop positions). Where relevant, particular embodiments may calculate the velocity for a gesture to be mapped based on the gesture start and stop positions and the timestamps relating to those positions. Exemplary movement physics models utilized by embodiments may include a polynomial movement model and a flick model. An exemplary flick model may be selected and utilized when, for example, gesture data for a given indicates linear movements and deceleration of movement until stop. The example flick model may comprise measuring the flick in terms of in pixel/[time per frame]. To smoothen and/or refine processing of a movement physics model such as the flick model, the client 102, the APS system 104, or both may utilize a manipulation processor and/or an inertia coprocessor in applying the model to a gesture.

The gesture emulator 1304 may be configured to execute the set of input events determined by the gesture mapper 1302. For some embodiments, the gesture emulator 1304 may execute the set of input events by employing application program interfaces (APIs) or other programming constructs native to or operable with the virtualized application instance and/or the virtual computing environment containing the virtualized application instance. The APIs/programming constructs may be utilized to programmatically control and send user input event messages to the virtualized application instance and/or the virtual computing environment to effectuate the emulation of a gesture received at a client (e.g., the client 102) in the virtualized application instance and/or the virtual computing environment. For example, where the virtualized application instance is a Microsoft® Windows®-application, or the virtual computing environment is operating Microsoft® Windows®, the input events may be executed using operating system messages (e.g., those associated with WM_GESTURE, WM_TOUCH, SM_THUMBPOSITION for WM_VSCROLL, and SB_LINELEFT and SB_LINERIGHT for WM_HSCROLL). In some instances, the operating system of the virtual computing environment may provide some native support for gestures and, as such, the gesture mapper 1302 may leverage such native support in the set of input events (e.g., various versions of Microsoft® Windows® comprise some support for touch, gesture, and tablet flick).

The gesture emulator 1304 may additionally, or alternatively, utilize a "client-side," kernel-mode driver in the virtual computing environment configured to permit the gesture emulator to perform the set of input events determined by the gesture mapper 1302.

The gesture mapping storage 1308 may comprise information utilized by the gesture mapper 1302 in mapping gesture(s) received at the client module 202 to a set of input events that can be executed in the virtualized application instance or the virtual computing environment operating the virtualized application instance. For instance, the gesture mapping storage 1308 may comprise user-defined or system defined (e.g., administrator-defined) mappings of gestures to the set of input events. The mapping information provided above with respect to Table 1 are just some exemplary mappings that could be stored on the gesture mapping storage 1308 and subsequently utilized by the gesture mapper 1302.

Figure 14A:
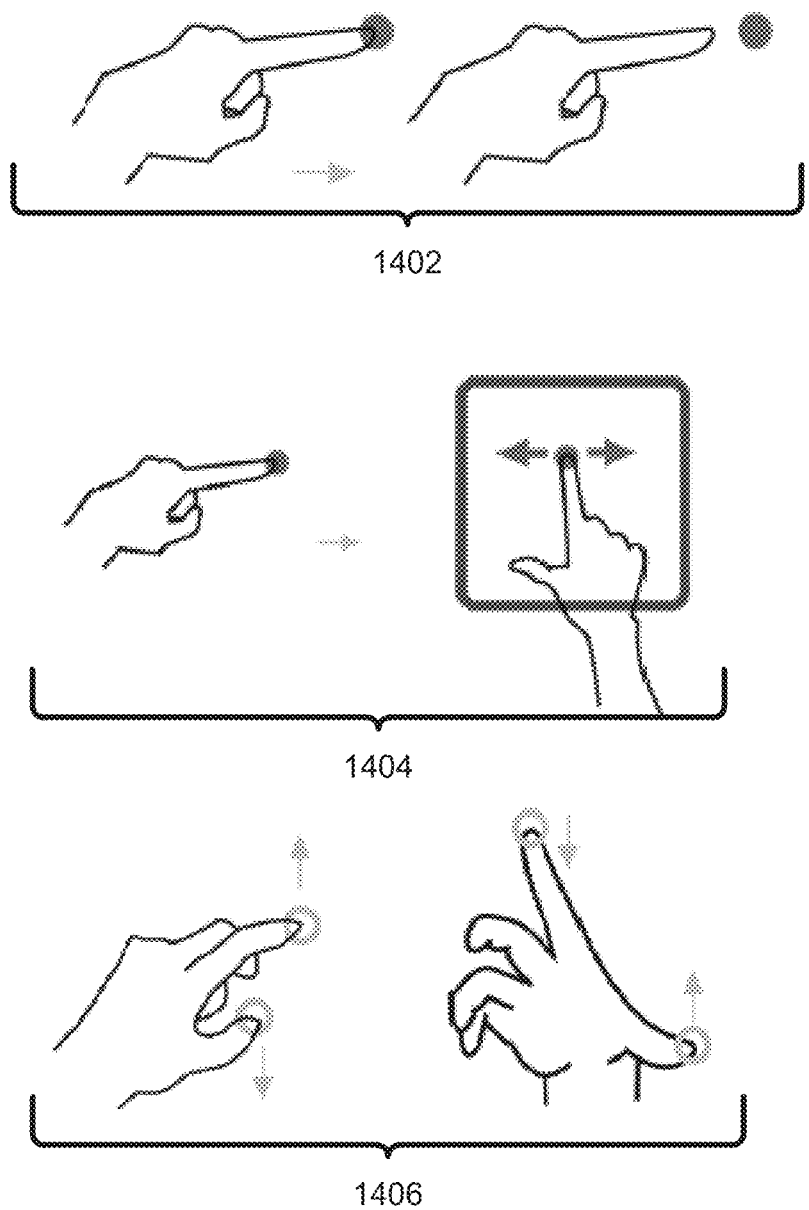
FIGS. 14A and 14B illustrate exemplary gestures operable with various embodiments.
Figure 14B:
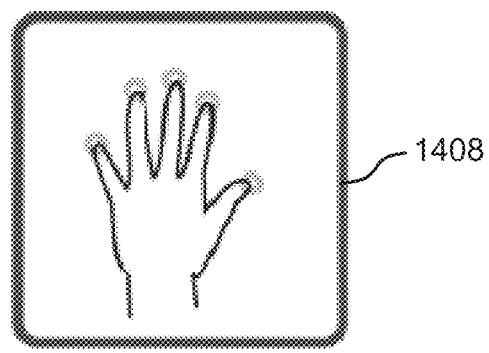
Figure 14B:
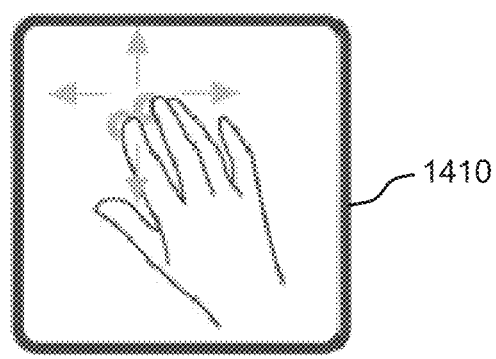
Figure 14B:
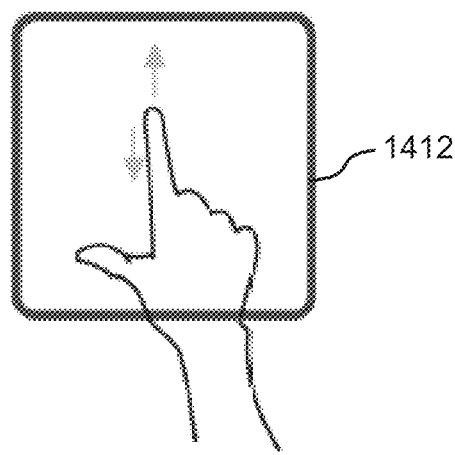

FIGS. 14A and 14B illustrate exemplary gestures 1402-1412, which are operable with various embodiments described herein. Some or all of the gestures 1402-1412 shown in FIGS. 14A and 14B may be received through a touch-screen component of the client 304 and/or through a camera communicatively coupled to the client 304 (e.g., where the gestures are captured through motion and gesture detection of a front-facing camera). Of the gestures shown, the gesture 1402 illustrates a tap gesture, the gesture 1404 illustrates finger-dragging gesture, the gesture 1406 illustrates pinching gestures, the gesture 1408 illustrates a five-finger tap, the gesture 1410 illustrates a dual-finger swipe, and the gesture 1412 illustrates a single-finger swipe up or down. For some embodiments, the tap gesture may be mapped to a right-button mouse click; the finger-dragging gesture may be mapped to dragging and dropping objects or selecting text in the virtualized application instance; the pinching gesture may be mapped to zooming-in or zooming-out in the virtualized application instance; the five-finger tap may be mapped to toggle the on-screen keyboard on the virtual computing environment; the dual-finger swipe may be mapped to scroll along the vertical axis, horizontal axis, or both; and the single-finger swipe may be mapped to scroll the virtualized application instance along a single axis (e.g., up or down).

Figure 15:
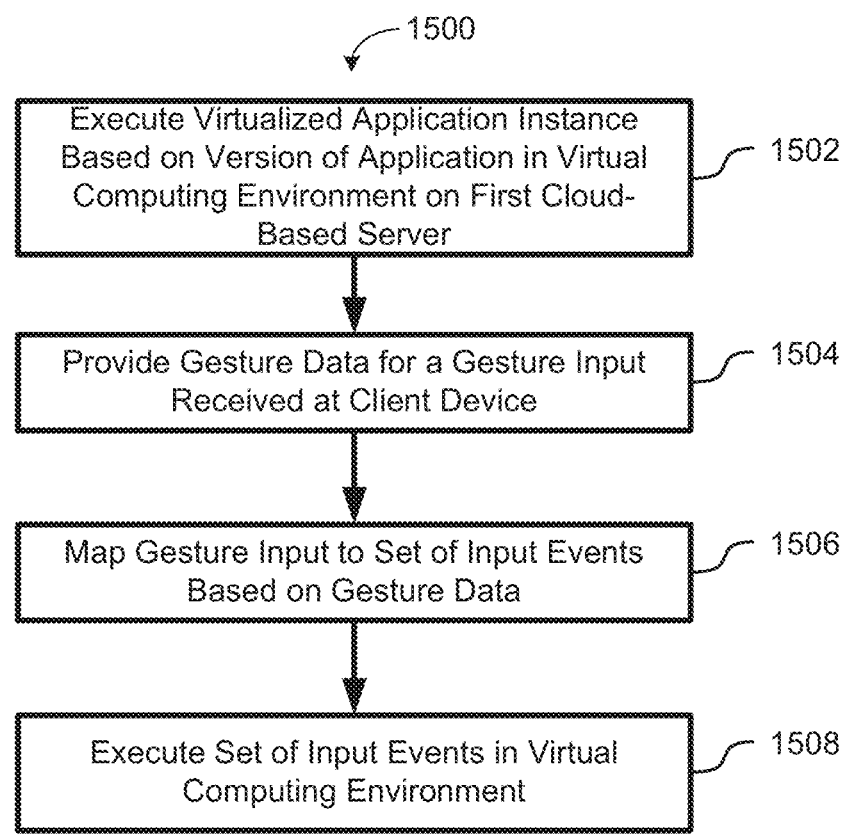
FIG. 15 is a flowchart illustrating an exemplary method for handling gestures in accordance with various embodiments.

FIG. 15 is a flowchart 1500 illustrating an exemplary method for handling gestures in accordance with various embodiments. For some embodiments, the method presented by the flowchart 1500 may be implemented using various components of the client 102 and the ASP 104 of FIG. 2A, as described below. For example, the method may begin at step 1502 the virtualization module 208 may execute a virtualized application instance based on a version of the application in a virtual computing environment (e.g., using a cloud-based service, such as SaaS, IaaS, or PaaS). In various embodiments, the virtualized application instance may be executed such that the virtualized application instance has native/direct access to data stored on/made available through the cloud-based storage with which access is established (as described herein). Each virtualization may be performed in a sandbox.

At step 1504, the client module 202, the gesture module 212, or the combination of the two may provide gesture data for a gesture input received at the client 102. For some embodiments, the client module 202 may capture gesture data or receive gesture data (from the client 102) regarding a gesture received at the client 102. In accordance with various embodiments, the gesture data captured or received may comprise a gesture type, a gesture phase (e.g., phases of gesture input as it is inputted by a user), coordinates relating to the gesture (e.g., X/Y coordinates of start and stop of gesture), velocity of gestures (e.g., X/Y components of vector data representing the gesture), pressure associated with the gesture, or a gesture timestamp (e.g., gesture start and stop timestamp).

At step 1506, the gesture module 212 may map the gesture data to a set of input events, which may be natively operable with and executed for a virtualized application instance being provided by (e.g., being operated on) the ASP system 104. As described herein, the set of input events may be executed with respect to the virtualized application instance and/or with respect to the virtual computing environment, with the executed set of input events affecting the performance or behavior of the virtualized application instance. The gesture module 212 may map the gesture data according to a user-defined or system-defined mapping of gesture(s) to sets of input events, such as those enumerated in Table 1 provided above. In mapping the gesture data to a set of input events, the gesture module 212 may consider such factors as available or applicable movement physics models (e.g., a flick model or a polynomial physics model), the version of application or operating system being utilized in the virtualized application instance and/or the virtual computing environment to receive the set of input events, and the current state of the virtualized application instance and/or the virtual computing environment. The current state of the virtualized application instance may include the type of virtualized application instance, the current user selection(s) in the virtualized application instance, the current viewing mode of the virtualized application instance, the current position of user input cursor(s), or the current active pane in the virtualized application instance.

As discussed herein, exemplary input events utilizable by the gesture module 212 may include user input actions typical of graphical user interface (GUI) computing environments (e.g., Microsoft® Windows® or Apple® OS X®), such as mouse-based input events (e.g., movement event, mouse click event, mouse wheel event, mouse button event, or click-and-drag mouse events), scroll events (e.g., a vertical scroll event or a horizontal scroll event by way of mouse or keyboard), keyboard-based input events (e.g., one or more keystrokes, keyboard shortcut buttons), a gesture-based input event (e.g., one that is natively compatible with/recognized by the virtualized application instance and/or the virtual computing environment), an audio input event (e.g., an input event that the virtualized application instance and/or the virtual computing environment recognizes as an audio input), or a video input event (e.g., motion detection or image detection event typically captured by a camera provided to the virtualized application instance and/or the virtual computing environment).

Accordingly, some embodiments may be capable of mapping a gesture input that is native to and received at the client (e.g., the client 102), to a second gesture input that is native to and received by the virtualized application instance and/or the virtual computing environment (e.g., received as the set of input events). Such functionality may be applicable, for example, where the client is based on Apple® iOS, and where the virtual computing environment that is supporting the virtualized application instance relates to Microsoft® Windows® Server 2008 R2, which is known to support gesture inputs (e.g., in gestures-mode). In such an example, a first gesture input recognized by and received at the client based on Apple® iOS, such as a left-to-right swipe gesture received on a touch screen, can be mapped to a second gesture input recognized by and received at the virtual computing environment based on Microsoft® Windows® Server 2008 R2, such as a two-finger tap gesture (e.g., GestureID value in WM_GESTURE message equals GID_TWOFINGERTAP).

Other input events may include inputs that invoke a zoom command, a pan command, or a rotate command that is compatible with the virtualized application instance and/or the virtual computing environment. Depending on the embodiment, the gesture module 212 may execute the set of input events in the virtualized application instance and/or the virtual computing environment by way of an operating system or kernel driver implemented in the virtual computing environment (e.g., human machine interface [HID] driver installed on the operating system running in the virtual computing environment).

For particular embodiments, the gesture module 212 may utilize one or more algorithms in the set of input events, which further enable the set of input events to emulate the gesture received at the client 102. For example, various scrolling algorithms may be utilized in the set of input events to effectuate the gesture emulation in the virtualized application instance and/or the virtual computing environment of the virtualized application instance.

According to one scrolling algorithm for emulating vertical scrolling, the algorithm may comprise by sending vertical mouse-wheel messages to the system and moving from a mouse-wheel start position to a mouse-wheel end position according to predetermined velocity (e.g., 20 fps). According to a scrolling algorithm for vertical scroll bar movement or horizontal scroll bar movement, the algorithm may comprise identifying a relevant scroll bar, moving a mouse cursor to the middle of the bar when gesture starts at the client (e.g., the client 102), moving the mouse cursor while dragging the relevant scroll bar, and releasing the mouse click when gesture ends. For some embodiments, the scrolling algorithm may release the relevant scroll bar every few small movements to permit the virtualized application instance and/or the virtual computing environment to refresh the view.

According to a scroll-control-click algorithm, the algorithm may comprise determining scroll controls, moving mouse cursor to scroll control as the received gesture starts, clocking the scroll control while the gesture runs, releasing the scroll control, and returning the mouse cursor to previous position as the received gesture ends. Through such an algorithm, the set of input events could emulate a gesture that allows continuous scroll clicking. According to a control and mouse wheel algorithm, the algorithm comprises invoking the control keyboard button when the gesture starts, sending wheel events as the gesture progresses, and releasing the control keyboard button when the gesture ends.

At step 1508, the gesture module 212 may execute the set of input events in the virtual computing environment supporting the virtualized application instance. In order to facilitate the execution of the set of input events, the gesture module 212 may utilize APIs and programming constructs, compatible with the virtualized application instance and/or the virtual computing environment. The APIs and programming constructs may, in some instances, employ operating system messages that permit the gesture module 212 to submit user input events directly to the operating system supporting the virtualized application instance.

Figure 16:
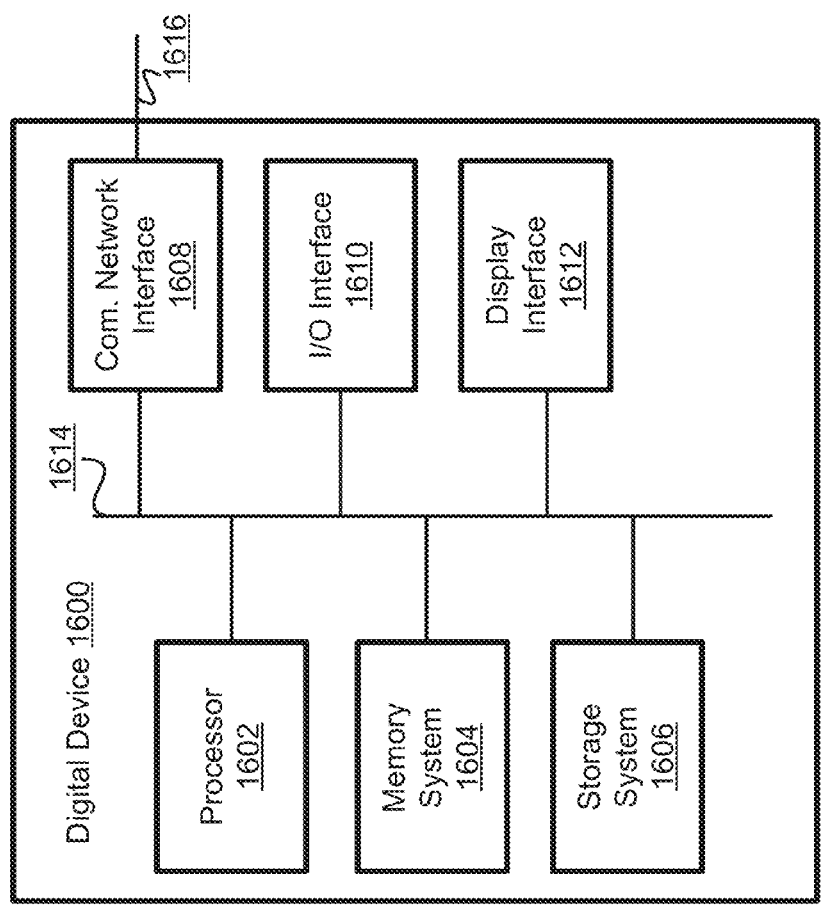
FIG. 16 is a block diagram illustrating an exemplary digital device that can be utilized in the implementation of various embodiments.

FIG. 16 is a block diagram of an exemplary digital device 1600. The digital device 1600 comprises a processor 1602, a memory system 1604, a storage system 1606, a communication network interface 1608, an I/O interface 1610, and a display interface 1612 communicatively coupled to a bus 1614. The processor 1602 is configured to execute executable instructions (e.g., programs). In some embodiments, the processor 1602 comprises circuitry or any processor capable of processing the executable instructions.

The memory system 1604 is any memory configured to store data. Some examples of the memory system 1604 are storage devices, such as RAM or ROM. The memory system 1604 can comprise the ram cache. In various embodiments, data is stored within the memory system 1604. The data within the memory system 1604 may be cleared or ultimately transferred to the storage system 1606.

The storage system 1606 is any storage configured to retrieve and store data. Some examples of the storage system 1606 are flash drives, hard drives, optical drives, and/or magnetic tape. In some embodiments, the digital device 1600 includes a memory system 1604 in the form of RAM and a storage system 1606 in the form of flash data. Both the memory system 1604 and the storage system 1606 comprise computer readable media which may store instructions or programs that are executable by a computer processor including the processor 1602.

The communication network interface (com. network interface) 1608 can be coupled to a network (e.g., network 324) via the link 1616. The communication network interface 1608 may support communication over an Ethernet connection, a serial connection, a parallel connection, or an ATA connection, for example. The communication network interface 1608 may also support wireless communication (e.g., 802.11a/b/g/n, WiMax). It will be apparent to those skilled in the art that the communication network interface 1608 can support many wired and wireless standards.

The optional input/output (I/O) interface 1610 is any device that receives input from the user and output data. The optional display interface 1612 is any device that is configured to output graphics and data to a display. In one example, the display interface 1612 is a graphics adapter.

It will be appreciated by those skilled in the art that the hardware elements of the digital device 1600 are not limited to those depicted in FIG. 16. A digital device 1600 may comprise more or less hardware elements than those depicted. Further, hardware elements may share functionality and still be within various embodiments described herein. In one example, encoding and/or decoding may be performed by the processor 1602 and/or a co-processor located on a GPU (i.e., Nvidia®).

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the invention(s) presented herein. These and other variations upon the exemplary embodiments are intended to be covered by the present invention(s).

Figure 17:
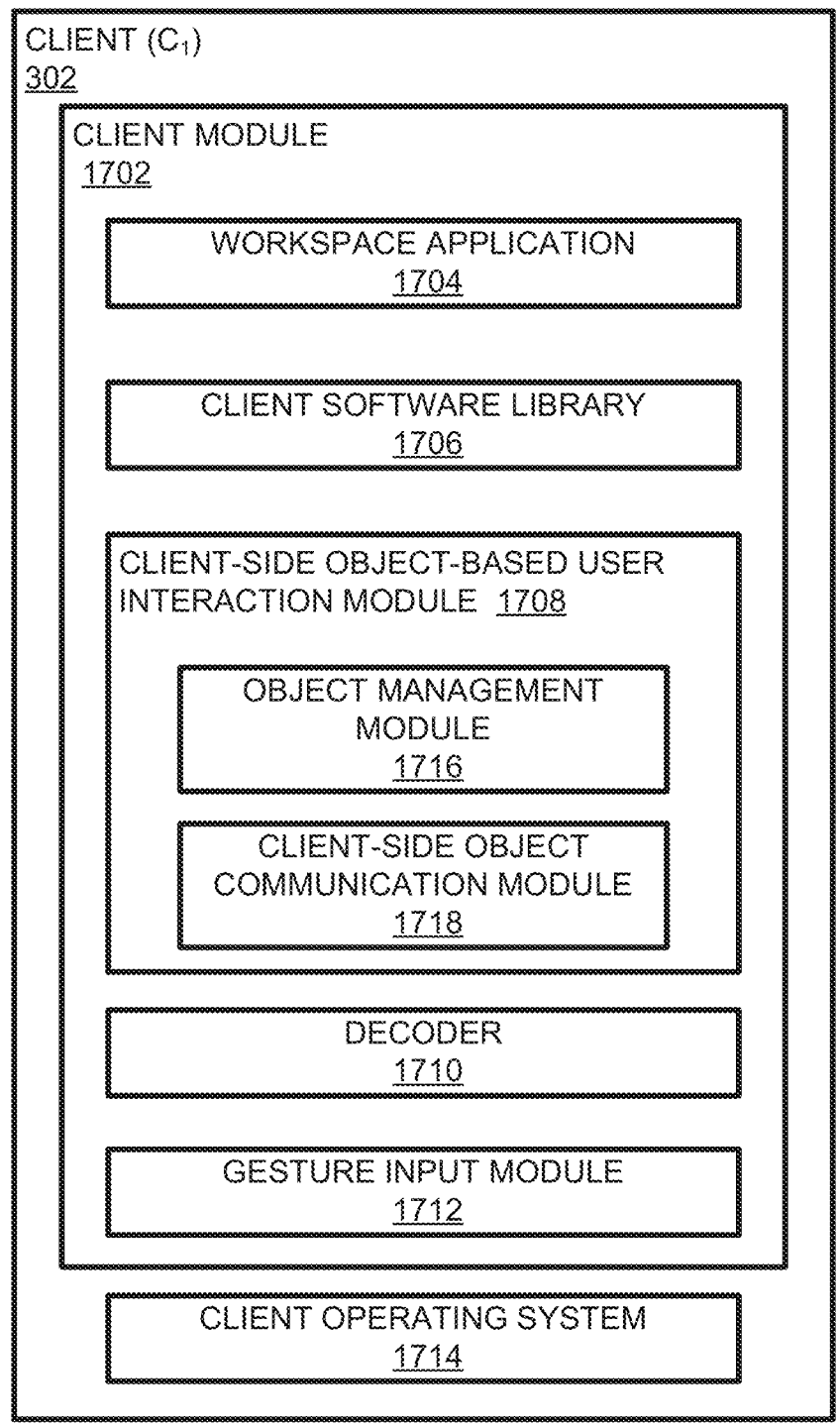
FIG. 17 is a block diagram illustrating an exemplary client configured to operate with an exemplary system for object-based user interaction in accordance with various embodiments.

FIG. 17 is a block diagram illustrating an exemplary client, specifically the client 302, configured to operate with an exemplary system for providing application access with object-based interaction in accordance with various embodiments. As shown, the client 302 comprises a client module 1702 and a client operating system 1714 operable in supporting operations by the client module 1702 on the client 302. Depending on the embodiment, the client module 1702 may be similar to the client module 202 described with respect to FIG. 2A, where the client module 1702 may facilitate communication between the client 302 and an ASP system (e.g., the ASP system 310), provide a user at the client 302 with a client user interface configured to facilitate user interaction with an ASP system (e.g., the ASP system 310), relay user input received through the client user interface from the user at the client 302 to an ASP system (e.g., the ASP system 310), relay object-related data and/or output (e.g., video, audio, or other data) from an application provided by an ASP system (e.g., the ASP system 310) to one or more components of the client 302 configured to receive and present the output through the client user interface.

To implement such functionalities (and others), the client module 1702 may comprise a workspace application 1704 configured to present the client user interface to a user through a video display coupled to the client 302 (e.g., including generating or presenting a graphical user interface associated with the client user interface and handling the presentation of application output received from an ASP system), a client software library 1706 configured to support various functionalities of the client module (e.g., support the functions of the workspace application 302 or a decoder 1710), a client-side object-based user interaction module 1708 configured to facilitate object-based interaction between the client 302 and an ASP system (e.g., the ASP system 310), and the decoder 1710 configured to decode encoded output data (e.g., video, audio, or other data) received from an ASP system (e.g., the ASP system 310) and provide the decoded output data (e.g., to the workspace application 1704) for presentation to the user of the client 302 (e.g., video output data routed to the video display of the client 302, and audio data routed to the sound processor of the client 302).

For some embodiments, where application output from the ASP system (e.g., the ASP system 310) is provided as object data from the ASP system to the client 302, the decoder 1710 may be optional. For example, object data provided from the ASP system (e.g., the ASP system 310) to the client 302 may include content from a document being accessed at the ASP system and/or one or more objects embedded in a document being accessed at the ASP system. In return, the client 302 may provide to the ASP system (e.g., the ASP system 310) object data including document content updated locally at the client 302 and/or one or more document-embedded objects embedded updated locally at the client 302. By relying on object-based data for interactions between the client 302 and the ASP system (e.g., the ASP system 310), various embodiments may avoid having to use video stream output from the ASP system to receive output from accessed applications.

In some embodiments, the workspace application 1704 may be a runtime application compatible with the operating system 1714 of the client 302. Accordingly, for some embodiments, the workspace application 1704 is a native application of the client 302. Additionally, the workspace application 1704 may be configured to provide access to applications that may be incompatible with the operation system 1714 of the client 302 or that may otherwise not be operable on the client 302 without the use of the workspace application 1704. Additionally, the workspace application 1704 may implement object-based interaction with accessed applications by way of the client-side object-based user interaction module 1708.

The workspace application 1704 may also be configured to provide universal and/or agnostic file management access to various files that are stored at separate and disparate data storage services but made available through an ASP system (e.g., the ASP system 310). Accordingly, in some embodiments, the workspace application 1704 may comprise a file management interface adapted to user requests for file management operations, such as adding (e.g., by creation of a new file or by upload), deleting, moving, and renaming files. For some embodiments, the workspace application 1704 may utilize web-based application programming interfaces (APIs), which may be associated with one or more web applications (e.g., Google® Docs), to access files stored on cloud-based services. For example, in order to list files accessible through the ASP system (e.g., the ASP system 310), the workspace application 1704 may utilize web-based APIs for a given cloud-based service (e.g., Dropbox, Box, or Google® Docs) to directly perform file management operations (e.g., listing of stored files, adding files, deleting files, or renaming files) with respect to that service. Then, when a file listed through the workspace application 1704 is selected for opening through the ASP system (e.g., using a virtualized application instance provided through the ASP system 310), the workspace application 1704 may instruct the ASP system to obtain a copy to the selected file from it respective storage source (e.g., cloud-based storage source or local storage source) or directly access the file from its respective storage source. Thereafter, the ASP system may initiate a virtualized application instance having access to the selected file, and the output data of the virtualized application instance may be transmitted to the client 302.

The client-side object-based user interaction module 1708 may be configured to perform one or more of the following: (a) receive from the ASP system (e.g., the ASP system 310) object data relating to an application object of application being provided for access by the ASP system (e.g., the virtualized application instance); (b) generate at the client 302 (e.g., graphically render or facilitate the rendering of) a client-side object representing the application object based on the object data received; (c) receive a set of user interactions (e.g., input events entered by a user into the client 302 and received by the client module 1702) with respect to the client-side object; (d) effectuate one or more modifications to the client-side object in accordance with those user interactions (e.g., resizing, repositioning, or changing properties of the client-side object); and/or (e) provide object data for the modified client-side object that results. For specific embodiments, the client-side object may be an object native to the remote client device, and the application object may be a document object (e.g., document embedded image, drawing, or graph) of a document accessed by the provided application. Subsequently, the object data for the modified client-side may be transmitted from the client 302 to the ASP system (e.g., the ASP system 310) such that the transmitted object data is used by the ASP system to synchronize the application object residing at the ASP system.

An example of this can include where the application object is an image embedded in a word processing document (e.g., Microsoft® Word® document) and the word processing document is being accessed by an instance of word processing application (e.g., Microsoft® Word®) being provided by the ASP system (e.g., the ASP system 310) to the client 302. The ASP system may transmit to the client 302 object data relating to the image object embedded in the word processing document, and the client-side object-based user interaction module 1708 may generate at the client 302 a client-side object representing the document-embedded image object. As noted herein, the client-side object representing the document-embedded image object may or may not be similar in appearance, size, and/or orientation to the document-embedded image object being presented by the provided application. Given that the application object is one that can be visually presented, the client-side object-based user interaction module 1708 may render a visual representation of the client-side object generated in representation of the document-embedded image object, with the visual representation being subsequently output to a display coupled to the client 302 (e.g., via the client module 1702). Thereafter, a user may manipulate the size, position, orientation or content of the client-side object as it is presented on the client 302, thereby resulting in a modified client-side object. When the user has ceased manipulation of the client-side object, the client-side object-based user interaction module 1708 may generate object data relating to the modified client-object that is sufficient for the ASP system (e.g., the ASP system 310) to apply similar modification to the document-embedded image object represented by the client-object in question.

For some embodiments, the client-side object-based user interaction module 1708 may determine that a user has ceased their modification of the client-side object by a number of actions taken by the user. Examples include, explicitly commanding the user-side application (e.g., the workspace application 1704) to apply the changes to the application object residing at the ASP system (e.g., explicit command via a "Save" button), by a user de-selecting the client-side object as it is presented on the client 302 (e.g., user selects another client-side object).

In certain embodiments, the visual representation of the client-side object (representing the application object) may be presented on the client 302 as an overlay over video output of the application being provided from the ASP system (e.g., the ASP system 310). In some embodiments, the video output received from the application provided by the ASP system may contain the application object as visually presented by the provided application. Subsequently, when a user at the client 302 selects the application object (e.g., by way of controlling the application provided by the ASP system through the client 302), the client-side object-based user interaction module 1708 and/or the ASP system (e.g., the ASP system 310) may detect selection of the application object selection (e.g., for modification of the application object in the provided application). For example, the client-side object-based user interaction module 1708 and/or the ASP system may detect selection of the application object when the provided application detects the general selection of the application object, or when the provided application detects selection of a corner, an edge, a body, or another element of the application object. The detection may result in the client 302 generating and presenting (e.g., via the workspace application 1704) a client-side object in representation of the selected application object, possibly in response to the ASP system (e.g., the ASP system 310) detecting the selection of the application object and sending object data to the client 302 (according to which the client 302 generates the client-side object).

Those skilled in the art will appreciate that where applicable, visual representation of the client-side object that represents the application object may or may not share visual similarities (e.g., appearance, size, orientation, color, style, etc.) to the application object of the being provided by the ASP system (e.g., the ASP system 310). Additionally, the application object of the application being provided by the ASP system can be one of many different types of objects utilized by the application, which may be graphical and non-graphical in nature. For example, application objects can include, a graphical or non-graphical user interface element of the provided application (e.g., a menu bar, a toolbar, a ribbon bar, or tabs graphically presented by the provided application), an object (e.g., annotation, image, graph, computer graphics, video, etc.) embedded in a document currently being accessed (e.g., opened and being edited) by the provided application, content of a document currently being accessed by the provided application, or some form of visual or audio output generated by the provided application (e.g., video or music). Those skilled in the art will appreciate that any number of application objects may be compatible and utilized by various embodiments.

The client-side object-based user interaction module 1708 may comprise an object management module 1716 and a client-side object communication module 1718, which facilitate the various functionalities of the client-side object-based user interaction module 1708. For some embodiments, the object management module 1716 may facilitate generation of (e.g., rendering or rendering an update to) the client-side object based on object data received from the ASP system (e.g., the ASP system 310) and relating to the application object. The object management module 1716 may also facilitate modifications to the client-side object based on the set of user interactions (e.g., received through the workspace application 1704), and providing second object data relating to the modified client-side object that results. For specific embodiments, once a client-side object in association with an application object is generated and/or presented on the client 302, the object management module 1716 may maintain storage and/or track the client-side object in connection with the application provided by the ASP system, and handle presentation of the client-side object at relevant times (e.g., when the video output from the provided application contains the associated application object). Subsequently, when an application object previously encountered/handled by the client 302 already has a corresponding client-side object created, updated, and/or maintained by the object management module 1716, the corresponding client-side object may be recalled by the object management module 1716 (e.g., from cache) when the application object is selected, and the recalled client-side object may be presented on the client 302 for manipulation/modification. Eventually, if the client-side object is modified, the modified client-side object may be saved to the cache and may cease to appear on the client 302 (e.g., once the one or more modifications to the client-side object have been transmitted to the ASP system to be applied to the application object). As noted herein, modifications to the client-side object may be transmitted to the ASP system and applied to the application object when a user at the client 302 is specifically instructed to save the modifications and/or the client-side object is de-selected by the user at the client 302 (e.g., user selects another application object).

The client-side object communication module 1718 may be configured to receive from the ASP system (e.g., the ASP system 310) object data relating to the application object, and may be configured to transmit to the ASP system the object data relating to a client-side object representing the application object. Communication of object data from the client-side object communication module 1718 to the ASP system (e.g., the ASP system 310), from the ASP system to the client-side object communication module 1718, or both may be enabled by way of a network transport layer protocol (hereinafter, "transport layer"), which may configured to define object data in a pre-defined manner understood by the intended target. The transport layer may, for example, define data in accordance with a XML file. For some embodiments, the transport layer may be utilized in conjunction with network layer protocols employed in transporting video output data from the ASP system (e.g., the ASP system 310) to the client 302.

Though not illustrated, for some embodiments, the client-side object-based user interaction module 1708 may further comprise an object translation module configured to translate object data sent from the ASP system (e.g., the ASP system 310) to the client 302, and/or object data sent from the client 302 to the ASP system. For instance, the object translation module may translate object data relating to the application object to object data compatible with client-side object. The object data compatible with the client-side object may be such that the client-side object can accurately represent the application object. In another example, the object translation module may translate the object data relating to the client-side object to object data compatible with the application object. The object data compatible with the application object may be such that the application object can be synchronized (e.g., properties, appearance, position, orientation, etc.) with the client-side object.

The object data relating to the application object may comprise contextual information regarding the application object, where the contextual information may be sufficient to generate, render, or update a rendering of the client-side object at the remote client device. The object data relating to the client-side object may comprise a set of user interactions entered at the client 302 with respect to the client-side object, or may comprise contextual information regarding the client-side object.

The hardware of the client 302 (e.g., touch screen of the client 302) may be adapted to receive gestures as user input to the client 302, which results in a gesture input being detected by the operating system 1714 (e.g., Apple® iOS) or another application operating on the operating system 1714. Gestures receivable by the client 302 generally depends on the means by which the client 302 receives gestures. For example, where the client 302 is configured with a touch-based screen (e.g., capacitive screen), the exemplary gestures may include finger-dragging gestures (e.g., dragging in the up, down, left, or right direction), pinching (e.g., pinch-in or pinch-out), swiping (e.g., quick, light, single finger, dual finger, three finger, four finger, five finger, up-to-down, down-to-up, left-to-right, or right-to-left swipe), finger tapping (e.g., single, double, triple, short, or long tap), and flicking (e.g., in one of eight movement directions).

In some embodiments, the client module 1702 may comprise a gesture input module 1712 configured to receive user input entered into the client 302, recognize the user input as a gesture input, and generate or capture data regarding the gesture data. Subsequent to generation/capture, the gesture input module 1712 may transmit the gesture data to an ASP system (e.g., the ASP system 310), possibly through an access server (e.g., the ACS 312). In some instances, the gesture input module 1712 may transmit the gesture data to the APS system (e.g., the APS system 320 via the ACS 312) concurrently with other user input data received at the client 302 (e.g., non-gesture input data received) and intended for transmission to the ASP system.

Depending on the configuration of the client 302, a user may enter user inputs by way of a touch screen of the client 302, by way of physical moving the client 302 configured such that an accelerometer of the client 302 can translate the movement as entry (e.g., shaking the client device is recognized as a gesture), or by way of hand gestures captured by a camera coupled to the client 302.

Those skilled in the art will appreciate that although the gesture input module 1712 is shown as being part of the client 302, the gesture input module 1712 for various embodiments is in no way limited to being implemented in such a manner. Those skilled in the art will appreciate that various embodiments may implement some or all of the gesture input module 1712 at an APS server (e.g., the APS server 320).

In some embodiments, the operating system 1714 may be adapted to natively support gestures and, as such, may readily recognize a set of gestures received by way of user input at the client 302 (e.g., swipe, tap, ping, or flick on a touch screen of the client 302). For example, where the client 302 is a tablet device configured with a touch-based screen for receiving gesture inputs, the client 302 may receive a gesture input through user inputs at the touch-based screen, the operating system 1714 of the tablet device may receive and natively recognize those user inputs as comprising a gesture input, and the operating system 1714 (e.g., through a API feedback or programming constructs) provide data relating to the gesture input ("gesture data") to the gesture input module 1712. For some embodiments, the operating system 1714 may disseminate gesture data by generating one or more gesture input messages in response to recognizing the gesture input. The gesture input messages may be passed amongst various components of the operating system 1714 and/or amongst applications being supported by the operating system 1714, which includes the client module 1702. Where a given gesture input is predefined in the operating system 1714 to perform a particular, native command (or invoke a certain functionality), the gesture input module 1712 may prevent the particular command from being performed when the given gesture input is received. In such cases, the particular command may be blocked while the gesture data for the gesture input may be passed along to the ASP system for execution in the virtualized application instance and/or the virtual computing environment operating the virtualized application instance. For some such embodiments, while the client module 202 is being accessed on the client 302 (e.g., client module 202 is the current, active application), the gesture input module 1712 may temporarily prevent the native command from being performed by overriding the functionality of the given gesture input on the client 302.

In regard to the data generated/captured in relation to the gesture input, the gesture data may comprise a gesture type, a gesture phase (e.g., phases of gesture input as it is inputted by a user), coordinates relating to the gesture (e.g., X/Y coordinates of start and stop of gesture), velocity of gestures (e.g., X/Y components of a vector data representing the gesture), pressure associated with the gesture, or a gesture timestamp (e.g., gesture start and stop timestamp). Based on the gesture data, various embodiments may map the gesture input, which is received at the client 302, to a set of input events compatible with the virtualized application instance and/or the virtual computing environment operating at the ASP system (e.g., the ASP system 310). The mapping eventually determined (e.g., at the ASP system 310) may depend on such factors as version of the application instantiated in the virtualized application instance that is to receive the set of input events, version of the operating system running in the virtual computing environment that supports the virtualized application instance, user-preferences or system defined preferences (e.g., user defined mappings), or some combination thereof.

Upon receiving the gesture data (e.g., data regarding a two-finger swipe) from the gesture input module 1712, the ASP system (e.g., the ASP system 310) may operate on the gesture data, map the gesture data to a set of input events, and execute the set of input events in the virtual computing environment. Take for example where a user inputs a two-finger swipe moving left to right on the touch screen of a client, based on the gesture data transmitted by the gesture input module 1712 to the ASP system, the ASP system may map the swipe to a left to right scrolling input event, which causes the horizontal scroll bar of a viewing pane in the currently active virtualized application instance (e.g., document open in Microsoft® Word®) to scroll right.

Typically, the executed set of input events may effectuate a performance change or a behavioral change with respect to the virtualized application instance currently active at an ASP system (e.g., operating on or being controlled by the ASP system 310) on behalf of the client 302. In order to achieve this, for some embodiments, the set of input events may be operable for execution in the virtualized application instance and/or the virtual computing environment supporting the virtualized application instance. In this manner, various embodiments may render/convert gesture inputs, which may be natively compatible with the operating system and/or applications of client 302, to a set of input events that are compatible with a virtualized application instance and/or its supporting virtual computing environment. This may be particularly useful where the gesture inputs received at the client 302 (and intended for execution in the virtualized application instance) are not natively compatible with, or not fully supported by, the virtualized application instance and/or the virtual computing environment of the virtualized application instance. Such would be the case where, for example, the client 302 is running a version of an Android® operating system, the virtualized application instance comprises a version of Microsoft® Windows® application, and gestures that are natively supported by the Android® operating system of the client 302 (e.g., such as pinch or flick) are not natively supported by the version of Microsoft® Windows® application and/or the Microsoft Windows® operating system supporting the virtualized application instance.

Depending on the embodiment, the mapping of the gesture data to the set of input events may depend on/take into consideration the version of the application comprised in the virtualized application instance and/or the version of the operating system running in the virtual computing environment that is to the set of input events. Those skilled in the art will appreciate that various versions of applications and various version of operating systems may support different types of input events in comparison to one another.

Figure 18:
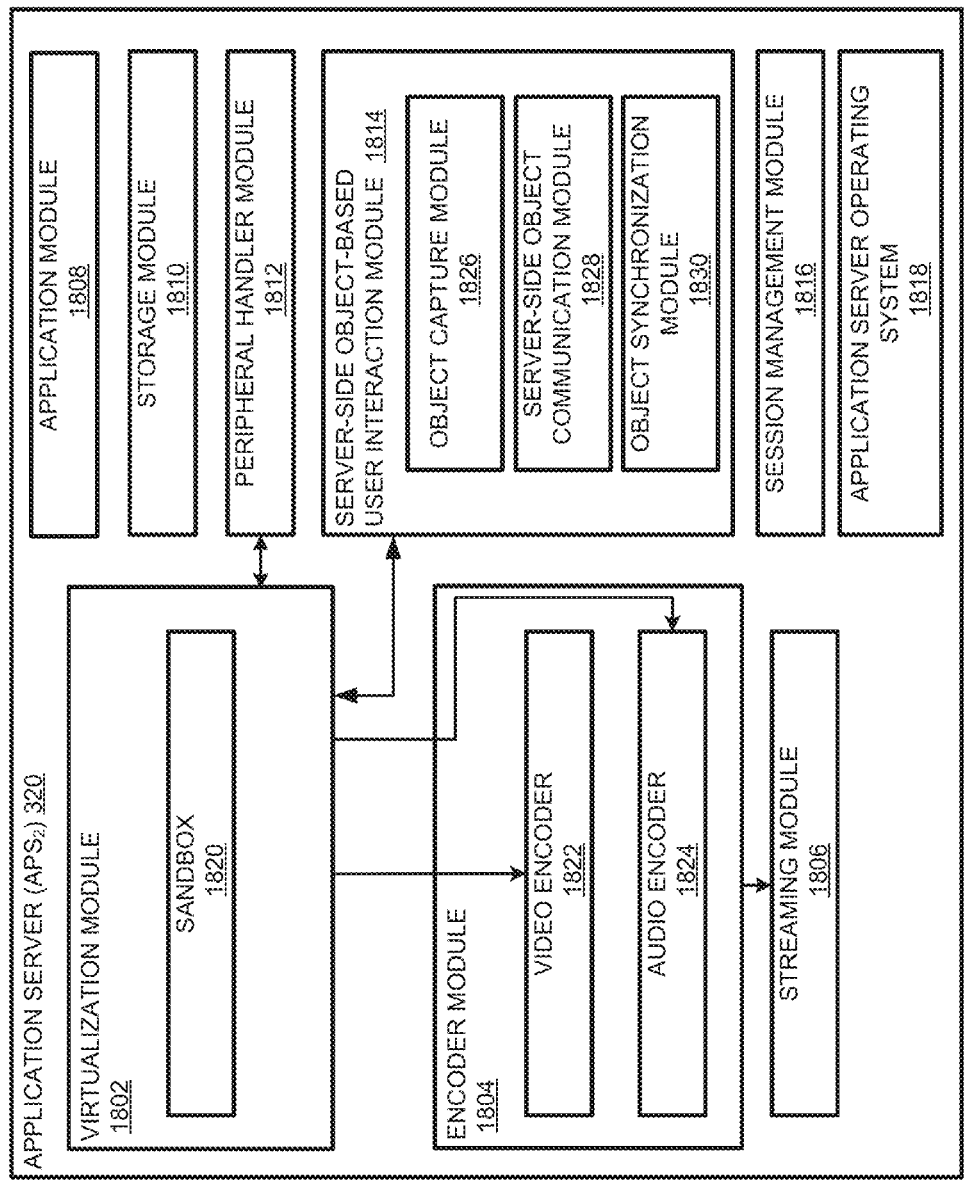
FIG. 18 is a block diagram illustrating an exemplary application server that is part of an exemplary system for object-based user interaction in accordance with various embodiments.

FIG. 18 is a block diagram illustrating an exemplary application server, specifically the application server (APS) 320, which is part of an exemplary system for providing application access with object-based interaction in accordance with various embodiments. As shown, the APS 320 comprises a virtualization module 1802, an encoder module 1804, a streaming module 1806, an application module 1808, a storage module 1810, a peripheral handler module 1812, a server-side object-based user interaction module 1814, a session management module 1816, and an application server operating system 1818 (configured to support operations of the APS 320 and its various components).

In some embodiments, the virtualization module 1802 may be similar in operation or functionality to the virtualization module 208. Accordingly, the virtualization module 1802 may be configured to establish, monitor, maintain, or otherwise manage execution of a virtualized application instance for the APS 320. As described herein, the virtualized application instance for the purpose of a user at client device accessing the virtualized application instance through the ASP system 310. As shown in FIG. 18, the virtualization module 1802 may comprise a (computer) sandbox 1804 that, in accordance with some embodiments, is configured to separate computing resources (e.g., memory, processor, input/output), of a (physical or virtual) computer system, utilized in performing virtualized application instances. In some instances, each virtualized application instance may be instantiated in a separate sandbox. In various embodiments, the sandbox 1804 may be operating within the virtualization module 1802 or, alternatively, be operating external to the virtualization module 1802, the APS 320, or the ASP 310 (e.g., in a cloud-based service, such as an IaaS or PaaS) but under the control of the virtualization module 1802 (e.g., via APIs).

In general, the computing environment implemented by the sandbox 1820 may be configured to receive input data and transmit output data. Examples of input data to the sandbox 1820 can include communications data (e.g., network data) or control information (e.g., produced by a human machine interface [HMI] device, such as a mouse or keyboard). Examples of output data from the sandbox 1820 can include video data (e.g., data generally produced and outputted to a video display) or audio data (e.g., data generally produced and outputted to audio output device, such as speakers). For some embodiments, providing a user at a client 302 with access to a virtualized application instance operating in the sandbox 1820 can comprise conveying input data or output data between the client 302 and the ASP system 310 and, more specifically, between the client module 502 operating on the client 302 and the virtualization module 1802 of the APS 320.

Before conveying the output data from the virtualization module 1802 (e.g., from the sandbox 1820) to the client 302 (e.g., to the client module 1702), some embodiments may utilize the encoder module 1804 to encode the output data in a format capable of being decoded at the client 302. For some embodiments, the encoder module 1804 may perform this encoding in accordance similar to the encoder module 214 described with respect to FIG. 2A.

In another example, the output data from the sandbox 1820 can include video data or audio data that can be converted as object data, whereby the need for video or audio data from the virtualized application instance can be overcome. For some such embodiments, providing a user at a client 302 with access to the virtualized application instance operating in the sandbox 1820 may involve conveying object data between the client 302 and the ASP system 310 and, more particularly, between the client module 1702 of the client 302 and the virtualization module 1802 of the APS 320. For certain embodiments, the object data comprising video data and/or audio data may be conveyed to the client 302 in conjunction with, or as a substitute for, the encoded video/audio output data from the encoder 1804.

As shown in FIG. 18, the encoder module 1804 may specifically comprise a video encoder 1820 configured to receive video output data from the virtualization module 1802 (e.g., generated by the virtualized application instance operating in the sandbox 1820) and encode that video output data to encoded video data. Additionally, the encoder module 1804 may specifically comprise an audio encoder 1822 configured to receive audio output data from the virtualization module 1802 (e.g., generated by the virtualized application instance operating in the sandbox 1820) and encode that video output data to encoded audio data.

As also shown in FIG. 18, the encoded (video or audio) data produced by the encoder module 1804 may be provided to the streaming module 1806 for delivery to the client 302 (e.g., to the client module 1702), possibly as one or more data streams (e.g., each carrying a different type of data). For example, the streaming module 1806 may receive encoded audio data and encoded video data from the encoder module 1804 and generate a single data stream (i.e., containing both the audio and the data) that is subsequently delivered to the client module 502 of the client 302. The client module 502, in turn, may extract the encoded audio data and the encoded video data from the received data stream, and decode the data (e.g., using the decoder 508) for presentation to a client at the client 302 (e.g., through a client user interface generated by the workspace application 1702). In some embodiments, the operation or functionality of the streaming module 1806 may be similar to of the streaming module 216 described in FIG. 2A.

As noted herein, the for certain embodiments, object data comprising video data and/or audio data may be conveyed to the client 302 as a substitute for the encoded video/audio output data from the encoder 1804. Accordingly, for some embodiments, the encoder 1804 and/or the streaming module 1806 may be optional.

The application module 1808, for some embodiments, may be similar in operation or functionality to the application module 210 described in FIG. 2A. Accordingly, the application module 1808 may be configured to obtain a version of an application (e.g., Microsoft® Excel®) from an application repository maintaining an application copy/image of that version (e.g., operating on a cloud-based server). Upon obtaining the version of the application, the application module 1808 may provide the version to the virtualization module 1802, either by reference (e.g., data path to the version) or as a copy, for instantiation as a virtualized application instance operating in the sandbox 1820.

In some embodiments, the storage module 1810, possibly in combination with the storage module 614, is similar in operation or functionality to the storage module 206 described in FIG. 2A. For example, the storage module 1810 may be configured to operate in conjunction with the storage management module 606 of the ACS 312 to add, remove, modify, or manage connections between the ASP system 310, particularly the APS 320, and various storage entities, such as databases, cloud-based storage services, and traditional file servers (e.g., a private enterprise file server). According to some embodiments, the storage module 1810 in combination with the storage management module 606 may establish a storage-related connections between a virtualized application instance operating in the virtualization module 1802 (e.g., in the sandbox 1820) and a third-party, cloud-based storage service (e.g., Dropbox, Box, or Google® Docs), which is generally external to the ASP system 310. As described herein, the establishment of a connection between the virtualized application instance and the third-party, cloud-based storage service may involve logging into the storage entity using third-party user credentials stored and provided (e.g., by the UP module 604) in association with a user accessing the virtualized application instance.

In various embodiments, the peripheral handler module 1812 may be configured to handle input data received from a user at the client 302 (e.g., from the client module 502) and convey/redirect such input data to the virtualization module 1802 (e.g., a virtualized application instance operating in the sandbox 1820). As described herein, the input data may include, for example control information generated by a human machine interface (HMI) device, such as a mouse, keyboard, joystick, or touch screen. While conveying/redirecting the received input data, the peripheral handler module may translate the input data from a first input type, native to an environment of at least one of the client devices, to a second input type, native to an environment of the virtualized application instance. For some embodiments, the system may further comprise a peripheral handler module configured to redirect an output data received from the virtualized application instance to a peripheral coupled to at least one of the client devices.

For instance, where the control information received from the client 302 is fully or partially incompatible with the version of the application (e.g., Microsoft® Excel® 2011) operating in the virtualized application instance or incompatible with the operating system of the virtual computing environment in which the virtualized application instance is operating (e.g., Microsoft® Excel® 2011), the peripheral handle module 1812 may be capable of translating, converting or remapping the control information from a first input data type that is native/compatible with the client 302 or with the operating system of the client 302 (e.g., Apple® iOS), to a second input data type that is native/compatible with the version of the application operating in the virtualized application instance or with operating system of the virtual computing environment in which the virtualized application instance is operating. Take for example where control information received from the client 302 (e.g., the client module 502) contains gestures entered on a touch screen at the client 302. Such control information, which may be native to/compatible to mobile devices (e.g., based on Android® or Apple® iOS), may be translated or remapped by the peripheral handler module 1812 to mouse movements or keyboard inputs that, in the virtual computing environment of the virtualized application instance, equate to or are a substitute for the gestures originally entered at the client 302. Accordingly, for certain embodiments, the operation or functionality of the peripheral handle module 1812 may include the operations or functionalities described with respect to the gesture module 212 of FIG. 2A.

In some embodiments, the client-side object-based user interaction module 1708 may be configured to perform one or more of the following: (a) capture object data regarding an application object of the virtualized application instance executed by the virtualization module 1802 (e.g., based on an application version supplied by the application module 1808); (b) transmit to a remote client device (e.g., the client 302) the first object data; (c) receive from the remote client device (e.g., the client 302) second object data relating to a client-side object at the remote client device, where the client-side object represents the application object; and/or (d) synchronize the application object with the client-side object based on the second object data. As noted herein, the client-side object may be an object native to the remote client device, and the application object may be a document object (e.g., document embedded image, drawing, or graph) of a document accessed by the provided application. For some embodiments, the first object data may comprise contextual information regarding the application object, where the contextual information may be sufficient to render or update a rendering of the client-side object at the remote client device (e.g., the client 302). As noted herein, the object data for the modified client-side may be transmitted from the client 302 to the ASP system (e.g., the ASP system 310) such that the transmitted object data is used by the ASP system to synchronize the application object residing at the ASP system.

The object capture module 1826 may be configured to capture object data regarding an application object of the application provided by the ASP system (e.g., the ASP system 310). For example, the object capture module 1826 may be implemented as a driver operable with (e.g., installable) an operating system in the virtual computing environment in which the virtualized application instance operates (e.g., at the control of the virtualization module 1802), a plug-in operable with (e.g., installable) with the application instance operating in the virtual computing environment, or some combination thereof.

The server-side object communication module 1828 may be configured to transmit to a the client 302 the object data relating to the application object, and may be configured to receive from the client 302 object data relating to a client-side object modified at the client 302 (e.g., by a user), where the client-side object represents the application object on the APS 320.

The object synchronization module 1830 may be configured to synchronize the application object with the client-side object based on the object data relating to a modified client-side object received from the client 302. The object synchronization module 1830 may perform the synchronization by applying modifications to the application object using a set of user interactions to be applied with respect to the application object in accordance with the object data that relates to the modified client-side object. The object data eventually received from the client 302 may comprise a set of user interaction (e.g., that were entered at the client 302 with respect to the client-side object to result in the modified client-side object), contextual information relating to the modified client-side object, or the modified client-side object. To further facilitate activity between the object synchronization module 1830, some or all of the object synchronization module 1830 may be implemented as a driver (e.g., kernel-mode driver) in the virtual computing environment configured to apply a set of user interactions to the application object, and/or to inject a modified application object (in accordance with the object data relating to a modified client-side object) into the virtualized application instance. Alternatively or additionally, some or all of the object synchronization module 1830 may be implemented as a plug-in to a virtualized application instance capable of executing a set of user interactions with respect to the application object or capable of injecting a modified application object into a document.

Though not shown in FIG. 18, the system may further comprise an object translation module configured to translate the second object data to third object data compatible with the application object, where the object communication module may transmit the second object data to the remote server by the third object data, and the third object data may comprise the application object. Additionally, the system may comprise an object translation module configured to translate the first object data to third object data compatible with the client-side object, where the object management module may be further configured to render or render an update to the client-side object by the third object data. The one or more object translation modules utilized by the APS 320 may be implemented in an existing component, such as the server-side object-based user interaction module 1814, or may be implemented as a separate component of the APS 320.

In accordance with some embodiments, the session management module 1814 may be configured to manage or monitor application sessions in association with virtualized application instances being operated by the virtualization module 1802. In accordance with embodiments described herein, an application session may be generated for one or more virtualized application instances being accessed by a given user at the client 302. As such, the application session may be utilized by the ASP system 310 to associate one or more virtualized application instances with a given user accessing those virtualization application instances through the ASP system 310. In some embodiments, an application session may be established concurrently with (e.g., at or near the time of) the instantiation of the virtualized application instance associated with the session. Alternatively, an application may be established and associated with a virtualized application instantiation already operating in the virtualization module 1802 (e.g., one that was initially started for another user during another application session, but has now been reset for the newly established application session associated with another user).

In addition to storing the association between a virtualized application instance and a given user, the application session maintained by the session management module 1814 may periodically save the current state of the virtualized application instance as operated upon by the user. In doing so, the session management module 1814 may preserve application sessions after a user at the client 302 has signed out of the ASP system 310 or the client 302 has lost network connection with the ASP system 310 (or the APS 320). For some embodiments, such a feature may permit the user at the client 302 to resume previous stared application sessions without the need to start with a new virtualized application instance in a new application session.

Figure 19A:
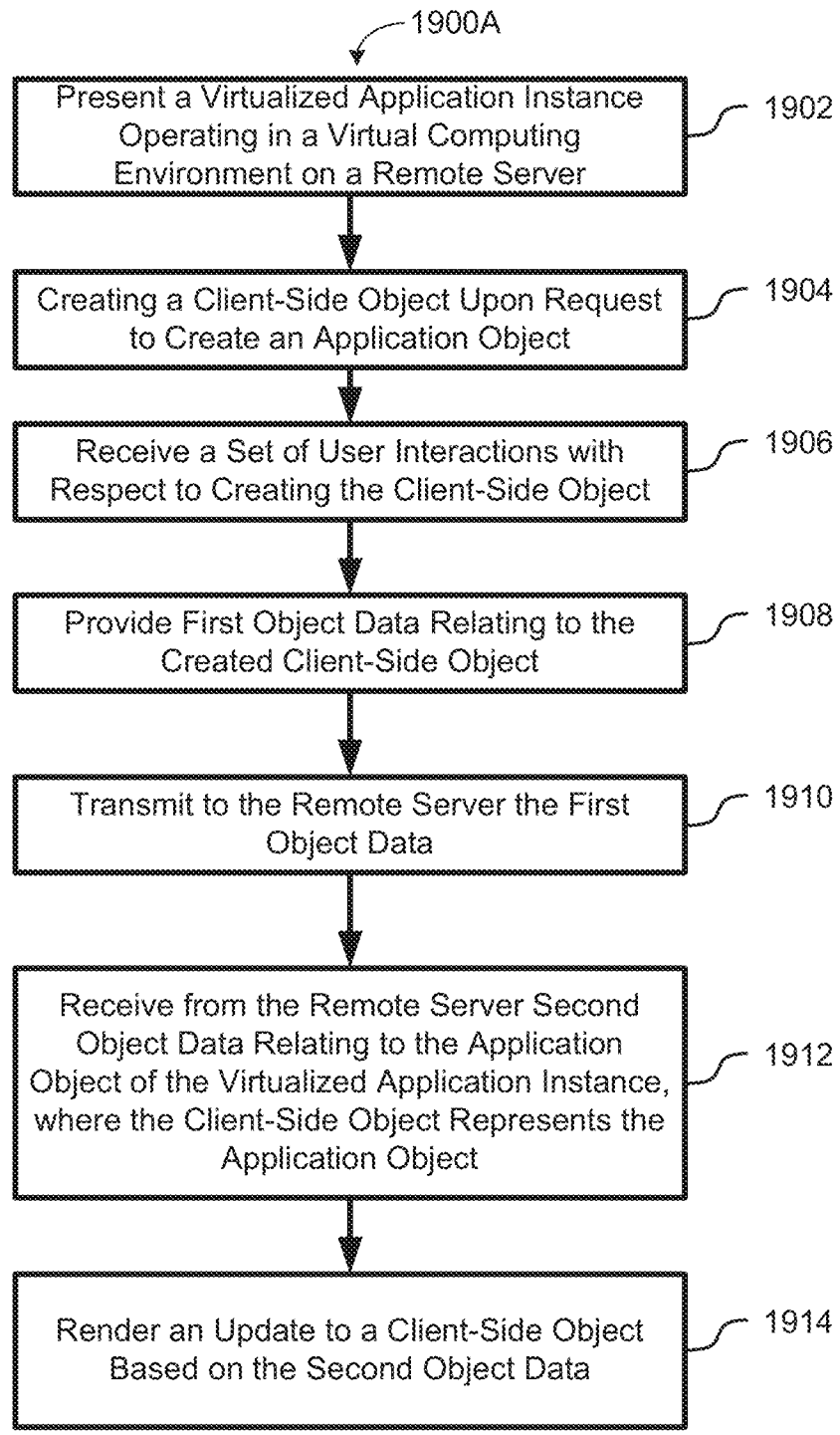
FIGS. 19A-19B are flowcharts illustrating an exemplary method for client-side object-based interaction in accordance with various embodiments.

FIG. 19A is a flowchart 1900A illustrating an exemplary method for client-side object-based interaction in accordance with various embodiments. In particular the method of flowchart 1900A illustrates creation of a new object in accordance with various embodiments. For some embodiments, the method presented by the flowchart 1900A may be implemented using various components of the client 302 of FIG. 17, as described below. For example, the method may begin at step 1902 by presenting a virtualized application instance, operating in a virtual computing environment on a remote server (e.g., the ASP system 310), through the client module 1702. The presentation of the virtualized application instance may be facilitated at the client 302 through the client module 1702 in accordance with embodiments described herein. At step 1904, a user may instruct the client 302 (e.g., through user interaction and/or input events) to create an application object of the virtualized application instance operating in the virtual computing environment on the remote server (e.g., the ASP system 310), which results in the object management module 1716 creating a client-side object that represents on the client 302 the newly created application object. Depending on the embodiment, the creation of the application object on the ASP system (e.g., the ASP system 310) may take place once the user has finished modifying the newly created client-side object, or may take place immediately upon request, with the modifications to the newly created client-side object being sent subsequently.

As noted herein, through the client-side object, various embodiments may facilitate smooth creation and/or manipulation of the application object of the virtualized application instance through the client-side object, while reducing the latency and increasing the smoothness in object handling. As also noted herein, examples of application objects utilized in various embodiments can include, a graphical or non-graphical user interface element of the provided application (e.g., a menu bar, a toolbar, a ribbon bar, or tabs graphically presented by the provided application), an object (e.g., annotation, image, graph, computer graphics, video, etc.) embedded in a document currently being accessed (e.g., opened and being edited) by the provided application, content of a document currently being accessed by the provided application, or some form of visual or audio output generated by the provided application (e.g., video or music). Those skilled in the art will appreciate that any number of application objects may be compatible and utilized by various embodiments.

At step 1906, the client-side object-based user interaction module 1708 may receive a set of user interactions (e.g., through the workspace application 1704) with respect to the newly client-side object. The set of user interactions may be received in connection with creating the new client-side object (e.g., received in conjunction with the creation of the client-side object) or may be received sometime after it is created. In general, the set of user interacts facilitate modifications/manipulations of the newly created client-side object. For example, sometime after the client-side object is created in response to the creation of a new application object, (at step 1906) a user at the client 302 may resize, reshape, reposition, reorient, or change a property of the newly created client-side object before object relating to the newly created client-side object is transmitted to the ASP system 310. Typically, the client-side object when first created has a set of default properties, and the set of user interactions received at step 1906 change one or more of these default properties.

At step 1908, the object management module 1716 may provide first object data relating to the created client-side object (e.g., resulting from step 1904 and/or step 1906). The first object data, once received by the ASP system 310, may result in the creation of an application object that is synchronized with the client-side object created at step 1904 and possibly modified at step 1906. At step 1910, the client-side object communication module 1718 may transmit to the remote server (e.g., to the ASP system 310) the first object data. In turn, the remote server (e.g., the ASP system 310) may create in the virtualized application instance the application object that corresponds to the client-side object in accordance with the first object data. Subsequent to its creation in the virtualized application instance, the application object created at the remote server (e.g., the ASP system 310) may be presented at the client 302 through the video output of the virtualized application instance provided by the remote server to the client 302. In some embodiments, the client-side object created at the client 302 and representing the application object may be utilized as the presentation of the application object at the client 302.

For some embodiments, as soon as the application object has been created (e.g., by the ASP system 310) and presented at the client 302 (e.g., through the video output of the virtualized application instance), the client-side object may be hidden from view on the client 302 and the visual representation of the corresponding application object (just created) is provided at the client 302 in its stead. Additionally, for some embodiments, the object management module 1716 may be configured to cache the client-side object created at the client 302 for subsequent usage (e.g., when the application object corresponding to the client-side object is selected for modification).

To ensure that the client-side object created at the client 302 is synchronized with the application object eventually created at the remote server (e.g., in the virtualized application instance), the method may continue to step 1912, where the client-side object communication module 1718 may receive (e.g., from the ASP system 310) second object data relating to an application object of a virtualized application instance operating in a virtual computing environment on a remote server (e.g., the ASP system 310). At step 1914, the object management module 1716 may render an update to a client-side object based on the first object data (e.g., on the ASP system 310).

Figure 19B:
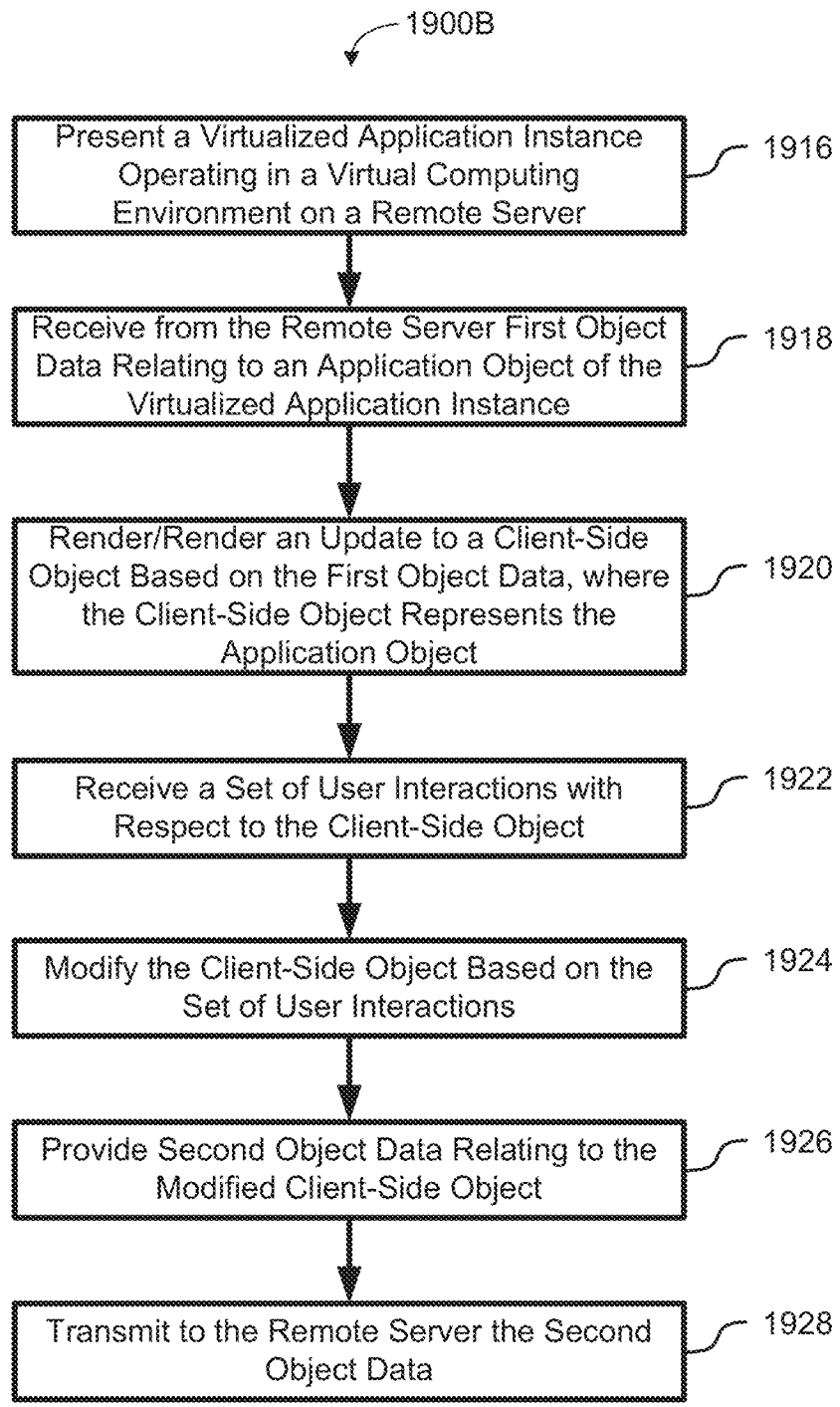

FIG. 19B is a flowchart 1900B illustrating an exemplary method for client-side object-based user interaction in accordance with various embodiments. In particular the method of flowchart 1900B illustrates modification of an object in accordance with various embodiments. For some embodiments, the method presented by the flowchart 1900B may be implemented using various components of the client 302 of FIG. 17, as described below. For example, the method may begin at step 1916 by presenting a virtualized application instance operating in a virtual computing environment on a remote server (e.g., the ASP system 310) through the client module 1702. The presentation of the virtualized application instance may be facilitated at the client 302 through the client module 1702 with embodiments described herein. At step 1918, the client-side object communication module 1718 may receive (e.g., from the ASP system 310) first object data relating to an application object of a virtualized application instance operating in a virtual computing environment on a remote server (e.g., the ASP system 310). At step 1920, the object management module 1716 may render or render an update to a client-side object based on the first object data, where the client-side object representing the application object (e.g., on the ASP system 310).

At step 1922, the client-side object-based user interaction module 1708 may receive a set of user interactions (e.g., through the workspace application 1704) with respect to the client-side object. At step 1924, the object management module 1716 may modify the client-side object based on the set of user interactions (e.g., received through the workspace application 1704). A modification to the client-side object may include, for example, changing visual property of the client-side object, such as a size, a position, an orientation, a shape, a style, and a color, and changing a non-visual property of the client-side object, such as a relationship with one or more other client-side objects (e.g., in application links).

At step 1926, the object management module 1716 may provide second object data relating to the modified client-side object (e.g., resulting from step 1924). At step 1914, the client-side object communication module 1718 may transmit to the remote server (e.g., to the ASP system 310) the second object data. Upon receiving the second object data, the remote server (e.g., the ASP system 310) may modify the application object in accordance with the second object data relating to the modified client-side object. Subsequently, the resulting modified application object at the remote server (e.g., the ASP system 310) may be presented at the client 302 through the video output of the virtualized application instance provided by the remote server to the client 302. In some embodiments, the client-side object created at the client 302 and representing the application object may be utilized as the presentation of the application object at the client 302. Additionally, like the method of flowchart 1900A, the client-side object at the client 302 may be synchronized with the now modified application object, possibly by performing steps similar to step 1912 and/or step 1914.

Figure 20A:
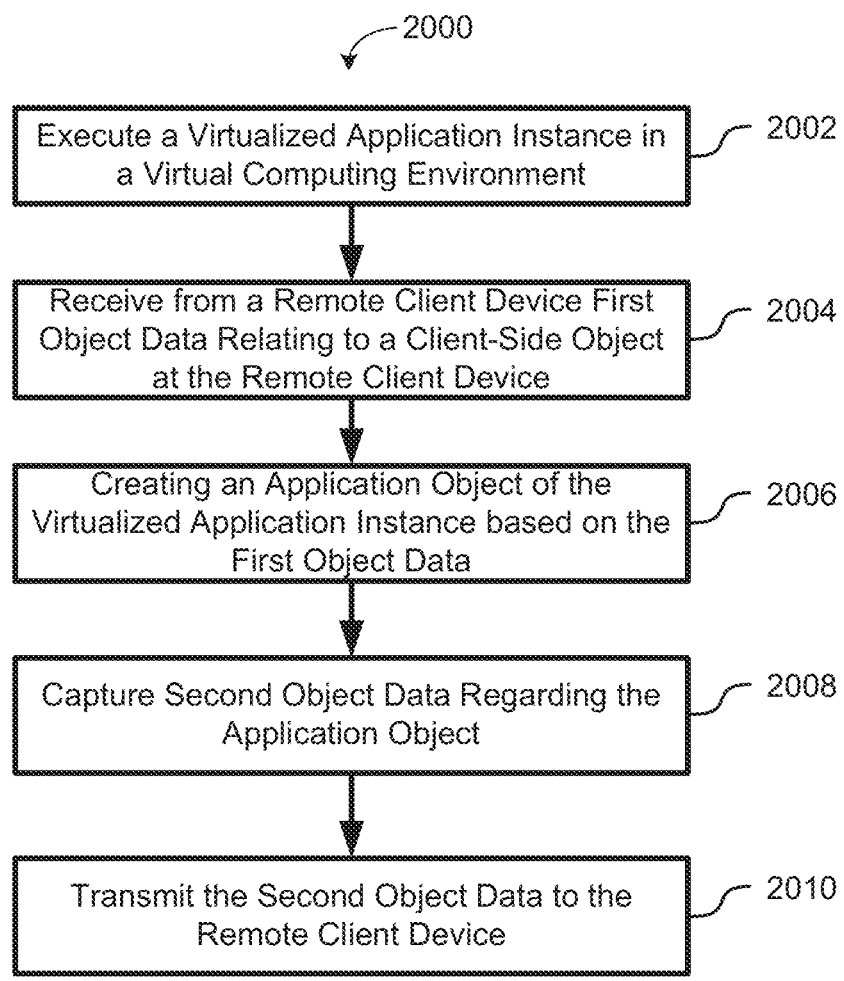
FIGS. 20A-20B are flowcharts illustrating an exemplary method for server-side object-based interaction in accordance with various embodiments.

FIG. 20A is a flowchart 2000A illustrating an exemplary method for server-side object-based user interaction in accordance with various embodiments. In particular the method of flowchart 2000A illustrates creation of an object in accordance with various embodiments. For some embodiments, the method presented by the flowchart 2000 may be implemented using various components of the APS 320 of FIG. 18, as described below. For example, the method may begin at step 2002 with the virtualization module 1802 executing a virtualized application instance (based on a version of the application) in a virtual computing environment (e.g., using a cloud-based service, such as SaaS, IaaS, or PaaS). Each virtualization may be performed in a sandbox (e.g., the sandbox 1820). At step 2004, the server-side object communication module 1828 may receive from a remote client (e.g., the client 302) first object data relating to a client-side object newly created at the remote client device (e.g., the client 302) and representing an application object of the virtualized application instance to be newly created on the remote server (e.g., the APS 320). Accordingly, at step 2006, the object synchronization module 1830 may instruct the virtualized application instance to create the application object represented by the client-side object based on the first object data received at step 2004. Thereafter, the video output from the virtualized application instance being sent from the APS 320 to the remote client device (e.g., the client 302) will reflect the newly created application object.

For some embodiments, where the application object created on the APS 320 may be similar to the client-side object but not identical, (at step 2008) the object capture module 1826 may capture second object data regarding the newly created application object and, at step 2010, the server-side object communication module 1828 may transmit the second object data to the remote client device (e.g., the client 302). In doing so, various embodiments can ensure that the client-side object representing the application object are even further synchronized (e.g., just in case the application object created does not accurately match the client-side object).

Figure 20B:
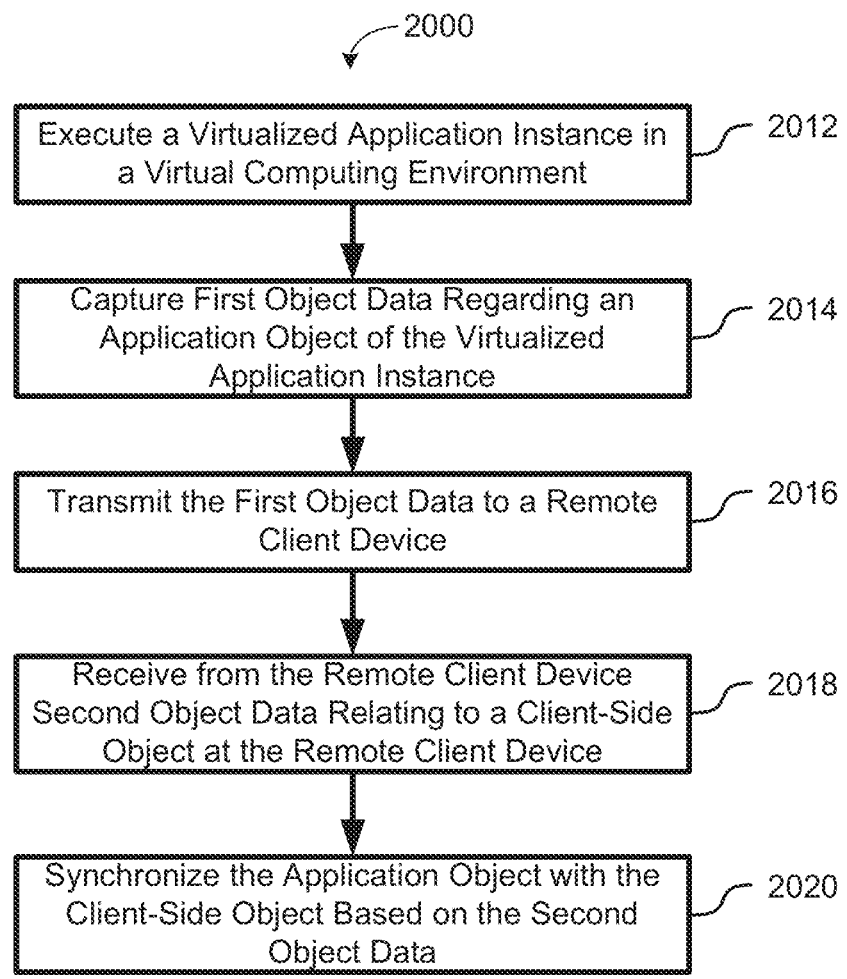

FIG. 20B is a flowchart 2000B illustrating an exemplary method for server-side object-based user interaction in accordance with various embodiments. In particular the method of flowchart 2000B illustrates modification of an object in accordance with various embodiments. For some embodiments, the method presented by the flowchart 2000 may be implemented using various components of the APS 320 of FIG. 18, as described below. For example, the method may begin at step 2012 with the virtualization module 1802 executing a virtualized application instance (based on a version of the application) in a virtual computing environment (e.g., using a cloud-based service, such as SaaS, IaaS, or PaaS). Each virtualization may be performed in a sandbox (e.g., the sandbox 1820). At step 2014, the object capture module 1826 may capture first object data regarding an application object of the virtualized application instance. At step 2016, the server-side object communication module 1828 may transmit the first object data to a remote client device (e.g., the client 302). At step 2018, the server-side object communication module 1828 may receive a second object data relating to a client-side object at the remote client device (e.g., the client 302). At step 2020, the object synchronization module 1830 may synchronize the application object with the client-side object based on the second object data.

FIGS. 21A-21D are a set of flow diagrams illustrating object-based interaction between an exemplary client, specifically the client 302, and an exemplary application server, the APS 320, in accordance with various embodiments. For FIGS. 21A-21D, the client module 1702 of the client 302 may be operating a client-native application 2106, which may be configured to provide a user at the client 302 with access to a virtualized application instance 2108 provided by the APS 320. The virtualization module 1802 of the APS 320 may be executing the virtualized application instance 2108 on behalf of/for the benefit of the client 302. While the client 302 of FIGS. 21A-21D may be similar (e.g., in form, function, and/or composition) to the client 302 of FIG. 17, the APS 320 of FIGS. 21A-21D may be similar (e.g., in form, function, and/or composition) to the APS 320 of FIG. 18. Typically, the virtualized application instance 2108 is compatible with operating on one or more application objects, where at least one application object may capable of being embedded into a document (e.g., content of a document) accessible by the virtualized application instance 2108. Examples of applications operable with application objects may include word processing applications, spreadsheet applications, presentation application, media editing applications, and the like.

While the execution of the virtualized application instance 2108 by the virtualization module 1802 may result in the virtualized application instance 2108 rendering and producing graphical output at the APS 320 (which is then streamed to the client 302 as video output), in some embodiments, the virtualized application instance 2108 may be executed to avoid the rendering and production of such output. For instance, the virtualized application instance 2108 may be executed by the virtualization module 1802 such that in place of the rendered graphical output, the virtualization module 1802 produces sufficient data that allows the client 302 to render graphical output of the virtualized module 1802 at the client 302. In such instances, the virtualization module 1802 may generate non-rendered graphical data that can be transmitted to the client 302 for subsequent rendering and display by the client 302. More in regard to execution of virtualized application instances at an APS is discussed later with respect to FIGS. 30A-30D.

Figure 21A:
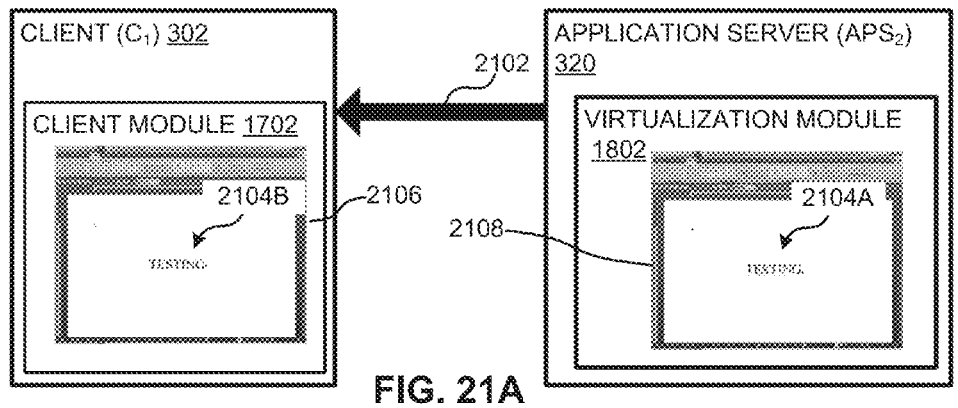
FIGS. 21A-21D are a set of flow diagrams illustrating object-based interaction between an exemplary client and an exemplary application server in accordance with various embodiments.

As illustrated in FIG. 21A, the virtualized application instance 2108 may permit textual content 2104A (hereinafter, the "server-side textual content object 2104A") to be entered into a document being presently accessed (e.g., currently open) by the virtualized application instance 2108. The virtualization module 1802 may be utilized to operate the virtualized application instance 2108. In accordance with some embodiments, the entry of the textual content object 2104A into the document content may result in the textual content object 2104A appearing in the video output 2102 of the virtualized application instance 2108 being sent from the APS 320 to the client 302. Upon receiving the video output 2102, the client 302 may present the server-side textual content object 2104A at the client 302 as a video-rendered textual content object 2104B. The video-rendered textual content object 2104B shown on the client 302 may be similar to if not identical to the server-side textual content object 2104A. Alternatively, for embodiments where the output of the virtualized application instance 2108 is provided to the client 302 as object data, the server-side textual content object 2104A shown at the client 302 as it exists on the APS 320.

Figure 21B:
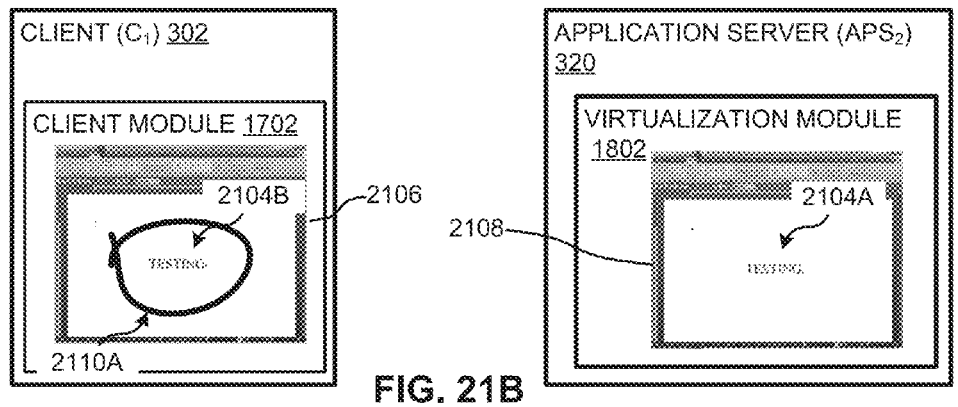
Figure 21C:
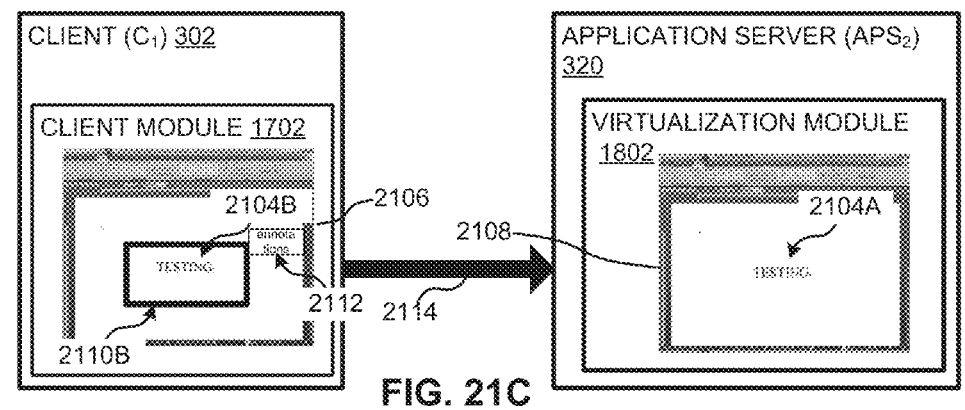

Subsequently, a user at the client 302 may mark, annotate, or draw on or around the video-rendered textual content object 2104B (e.g., with a circle, square, triangle, or the like), which can be detected by the client 302 and replaced with predefined client-side objects that correspond to application objects. For example, as shown in FIG. 21B, a user may draw a circle 2110A around the video-rendered textual content object 2104B at the client 302, which the client 302 (e.g., the client module 1702) may recognize and replace with a predefined a client-side rectangular graphic object 2110B, as shown in FIG. 21C. The circle 2110A shown in FIG. 21B may be entered, for example, through a user's gesture input (e.g., recognized by the gesture input module 1712) at a touch-enabled display coupled to the client 302. The client 302 (e.g., the client module 1702) may detect the creation of the circle 2110A, and as a result render the client-side rectangular graphic object 2110B in place of the circle 2110A. The client-side rectangular graphic 2110B may further include an associated client-side annotation 2112 that is fillable and/or viewable by the users. Those skilled in the art will appreciate that various embodiments may be configured to recognize and replace any number of markings, annotations, or drawings with a predefined client-side object.

Figure 21D:
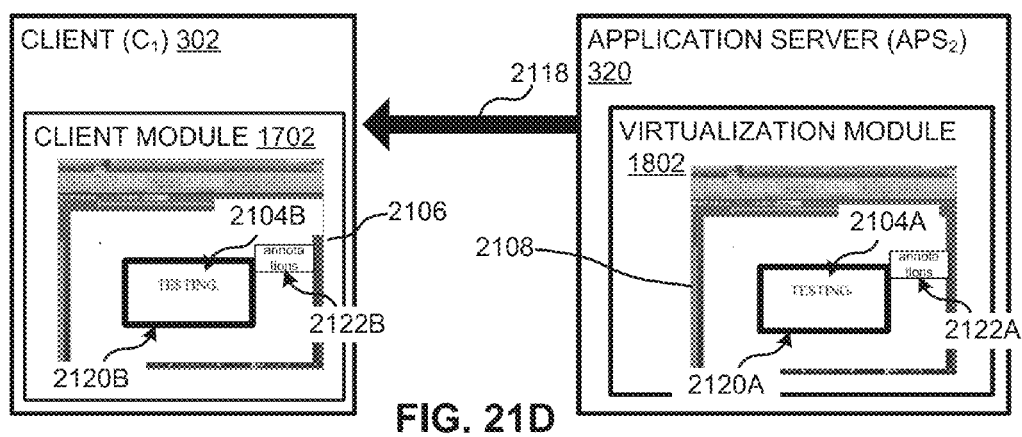

As shown in FIG. 21C, once the client-side rectangular graphic object 2110B and client-side annotation 2112 replaces the user-drawn circle 2110A, the client 302 may send to the APS 320 object data 2114 relating to the client-side rectangular graphic object 2110B and the client-side annotation 2112. FIG. 21D illustrates how a server-side rectangular graphic object 2122A and an accompanying server-side annotation 2122A are created as a result of the APS 320 receiving the object data 2114 (see, FIG. 21C). The server-side rectangular graphic object 2120A is shown to surround the server-side textual content 2104A, like the client-side rectangular graphic object 2110B surrounds the client-side textual content 2104B. Subsequent to updating the current document based on the object data 2114 from the client 302, the APS 320 may stream video output 2118 (which may include object-related data) to the client 302 that contains the addition of the server-side rectangular graphic object 2120A and accompanying server-side annotation 2122A in the virtualized application instance 2108.

As shown, once the client 302 transmits the object data 2114 to the APS 320, the client 302 may revert to using video output 2118, streamed from the APS 320, to display the server-side rectangular graphic object 2122A as a video-rendered rectangular graphic object 2120B and the accompanying server-side annotation 2122A as a video-rendered annotation 2122B. For some embodiments, the video-rendered application object 2120B and video-rendered annotation 2122B may be similar if not identical to the server-side application object 2120A and the accompany annotation 2122A.

According to some embodiments, the client-side rectangular graphic object 2110B and the client-side annotation 2112 may be recalled by the client 302 (e.g., the object management module 1716) next time the server-side rectangular graphic object 2120 and/or the accompanying annotation 2122 are selected on the virtualized application instance 2108. When this occurs, the client 302 may recommence displaying the client-side rectangular graphic object 2110B and the client-side annotation 2112 as overlays over the video output of the virtualized application instance 2108 (e.g., video rendered rectangular graphic object 2120B and video-rendered annotation 2122B).

FIGS. 22A-22G are a set of flow diagrams illustrating object-based interaction between an exemplary client, specifically the client 302, and an exemplary application server, the APS 320, in accordance with various embodiments. For FIGS. 22A-22G, the client module 1702 of the client 302 may be operating a client-native application 2206, which may be configured to provide a user at the client 302 with access to a virtualized application instance 2208 provided by the APS 320. The virtualization module 1802 of the APS 320 may be executing the virtualized application instance 2208 on behalf of/for the benefit of the client 302. The client 302 of FIGS. 22A-22G may be similar (e.g., in form, function, and/or composition) to the client 302 of FIG. 17, while the APS 320 of FIGS. 22A-22G may be similar (e.g., in form, function, and/or composition) to the client 320 of FIG. 18. Generally, the virtualized application instance 2208 is compatible with operating on one or more application objects, where at least one application object may capable of being embedded into a document (e.g., content of a document) accessible by the virtualized application instance 2208. Examples of applications operable with application objects may include word processing applications, spreadsheet applications, presentation application, media editing applications, and the like.

Figure 22A:
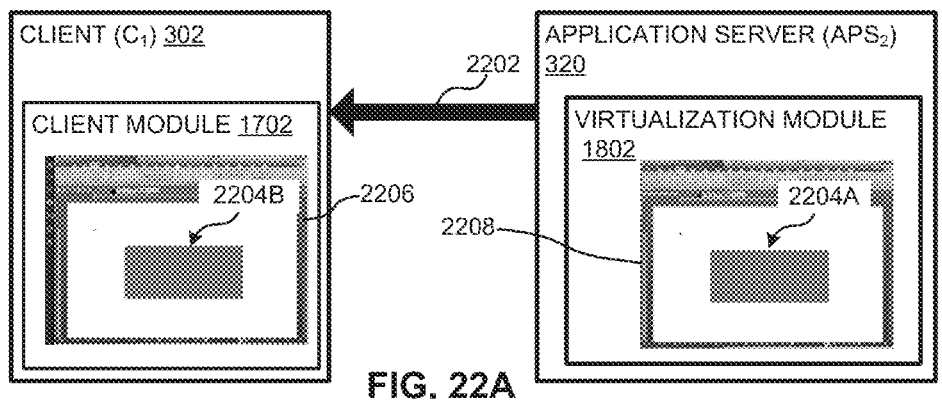
FIGS. 22A-22G are a set of flow diagrams illustrating object-based interaction between an exemplary client and an exemplary application server in accordance with various embodiments.

As shown in FIG. 22A, the virtualized application instance 2208 may enable a server-side rectangular graphic object 2204A (hereinafter, the "server-side application object 2204A") to be created in a document being presently accessed (e.g., currently open) by the virtualized application instance 2208. As noted herein, the virtualization module 1802 may be utilized to operate the virtualized application instance 2208. In accordance with some embodiments, once created, the server-side application object 2204A may appear in the video output 2202 of the virtualized application instance 2208 from the APS 320 to the client 302. Through the video output 2202, the client 302 may receive and subsequently present the server-side application object 2204A as a video-rendered application object 2204B. According to some embodiments, the video-rendered application object 2204B may be similar to if not identical to the server-side application object 2204A.

Figure 22B:
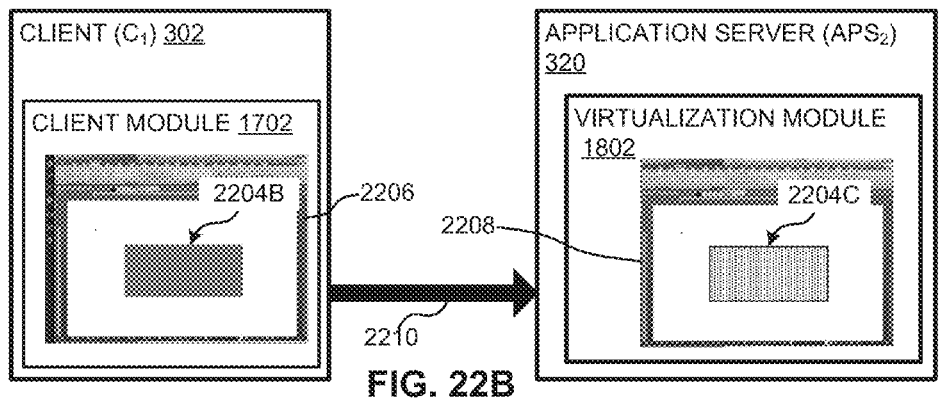

In FIG. 22B, the client 302 may instruct the virtualized application instance 2208 to select the server-side application object 2204A by way of an instruction 2210 sent from the client 302 to the APS 320. A user may instruct the virtualization application instance 2208 to select the server-side application object 2204A for modification and/or deletion of the server-side application object 2204A. The user selection of the server-side application object 2204A is shown in FIG. 22B as a selected server-side application object 2204C.

Figure 22C:
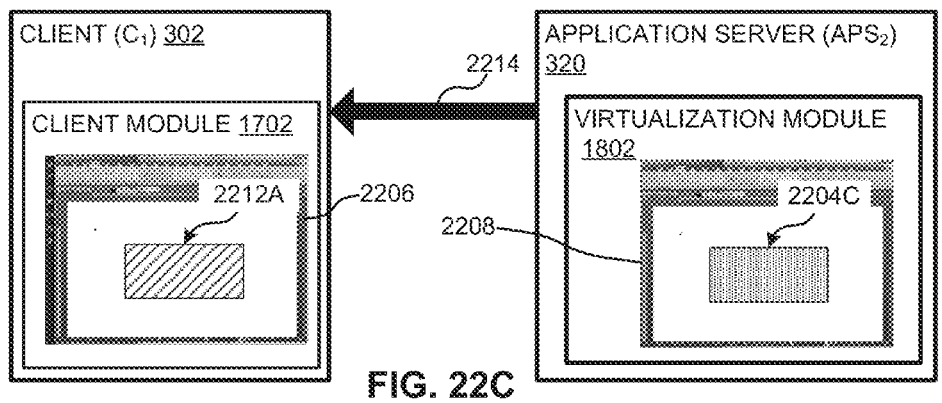

As shown in FIG. 22C, the selection of the server-side application object 2204A may result in the APS 320 transmitting to the client 302 object data 2214 relating to the selected server-side application object 2204C (e.g., contextual information regarding the object 2204C) and/or an indication of the server-side application object 2204A being selected. In response to the object data 2214, the client 302 (e.g., the client module 1702) may generate and/or render a client-side rectangular graphic object 2212A (hereinafter, the "client-side object 2212A") corresponding to and/or representing the server-side application object 2204A at the client 302. For some embodiments, until the client-side object 2212A is generated, the server-side application object 2204A may be presented on the client 302 through the video output 2202 (e.g., encoded video stream) generated by the virtualized application instance 2208 and then transmitted to the client 302 from the APS 320.

Figure 22D:
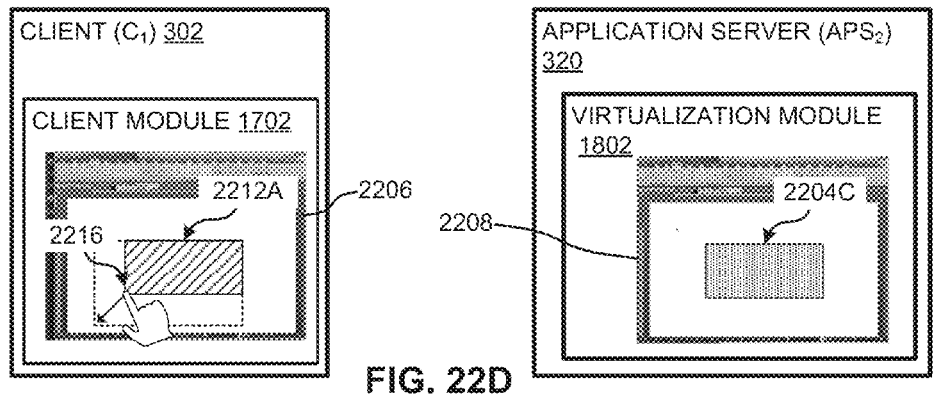

As shown by FIG. 22D, the client 302 may receive a touch-based input event 2216 (e.g., through a touch-based screen of the client 302) with respect to the client-side object 2212A, which may facilitate modifications with respect to the client-side object 2212A. For instance, through the touch-based input event 2216 (or some other input event), a user at the client 302 may resize, reposition, change color, change orientation, or change some other property of the server-side application object 2204A. In accordance with some embodiments, as the client-side object 2212A is adjusted (e.g., by the touch-based input event 2212), the client 302 may send object data relating to the modified client-side object 2212B as the modifications are implemented or may send the object data only once the user has ceased modifying the client-side object 2212B.

The trigger for sending object data relating to the modified client-side object 2212B may vary between various embodiments. For instance, the client 302 may transmit object data relating to the modified client-side object 2212B to the APS 320 based on an explicit command to the client 302 to send the object data (e.g., via a graphical user interface button, such as "Save") to the APS 320. Another example for triggering the transmission of object data relating to the modified client-side object 2212B may include the user de-selecting the client-side object 2212B and/or instructing the virtualized application instance 2208 to de-select the selected server-side application object 2204C. Yet another example for triggering the transmission of object data relating to the modified client-side object 2212B may include a predetermined time period for input event inactivity (e.g., 2 minutes of modification activity results in the object data being sent).

Figure 22E:
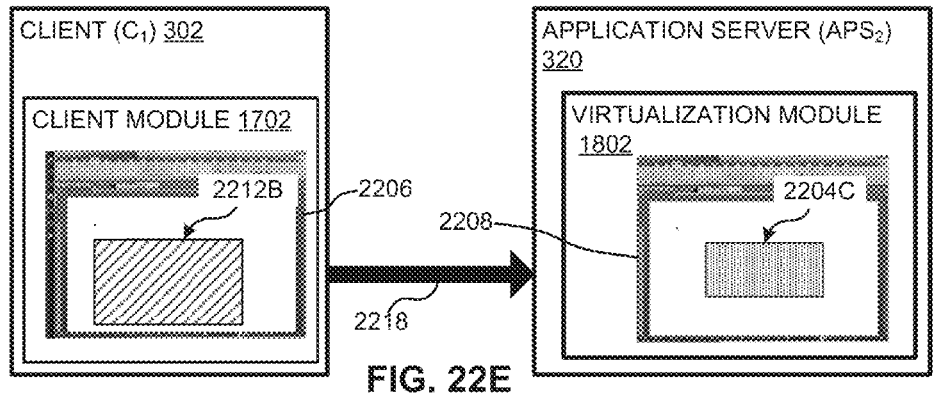
Figure 22F:
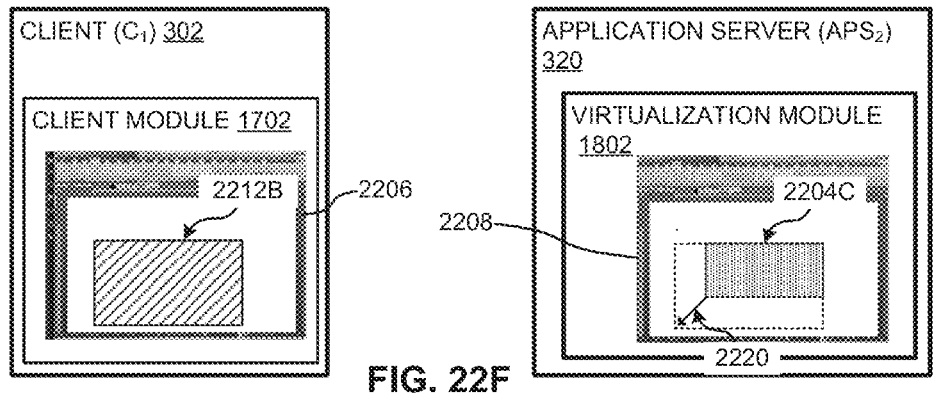

FIG. 22E illustrates object data 2218 relating to the modified client-side object 2212B being transmitted from the client 302 to the APS 320. As shown in FIG. 22F, upon receiving the object data 2218 relating to the modified client-side object 2212B, the APS 320 may apply a modification 2220 to the selected server-side application object 2204C in accordance with the object data 2218. For some embodiments, the modification 2218 may be applied to the selected server-side application object 2204C by performing a set of user interactions (e.g., set of input events) with respect to the selected server-side application object 2204C based on the object data 2218. In particular embodiments, the object data 2218 may provide the APS 320 with contextual information regarding the modified client-side object 2204B, which can then be used in applying the modification 2220 to the corresponding server-side application object 2204C. In order to utilize the object data 2218 for modifying the server-side application object 2204C, the APS 320 may utilize an object translation module configured to translate the object data 2218 to a set of user interactions to be applied to the selected server-side application object 2204C to synchronize the selected server-side application object 2204C with the modified client-side object 2212B. Alternatively, the APS 320 may utilize an object translation module to translate the object data 2218 to a modified server-side application object that is synchronized with the client-side object 2212B and that can replace the selected server-side application object 2204C.

Figure 22G:
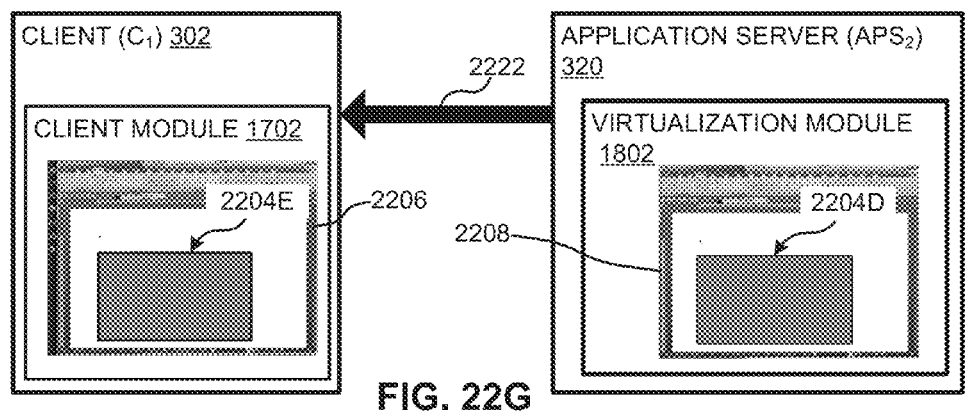

FIG. 22G illustrates a server-side modified application object 2204D that results from applying the modification 2220 to the selected server-side application module 2204C in accordance with object data 2218. Subsequent to the server-side modified application object 2204D being rendered, video output 2222 from the APS 320 (e.g., the virtualized application instance 2208) to the client 302 may comprise the rendering of the server-side modified application object 2204D, which the client 302 in turn displays as a video-rendered application object 2204E. According to some embodiments, the modified client-side object 2212B, which corresponds to the server-side modified application object 2204D, may disappear from the display of the client 302 (e.g., hidden) and the client 302 may revert to using video output 2222 to display the server-side rectangular graphic object 2204D as a video-rendered rectangular graphic object 2204E. For some embodiments, the video-rendered application object 2204E may be similar if not identical to the server-side application object 2204D.

Figure 23:
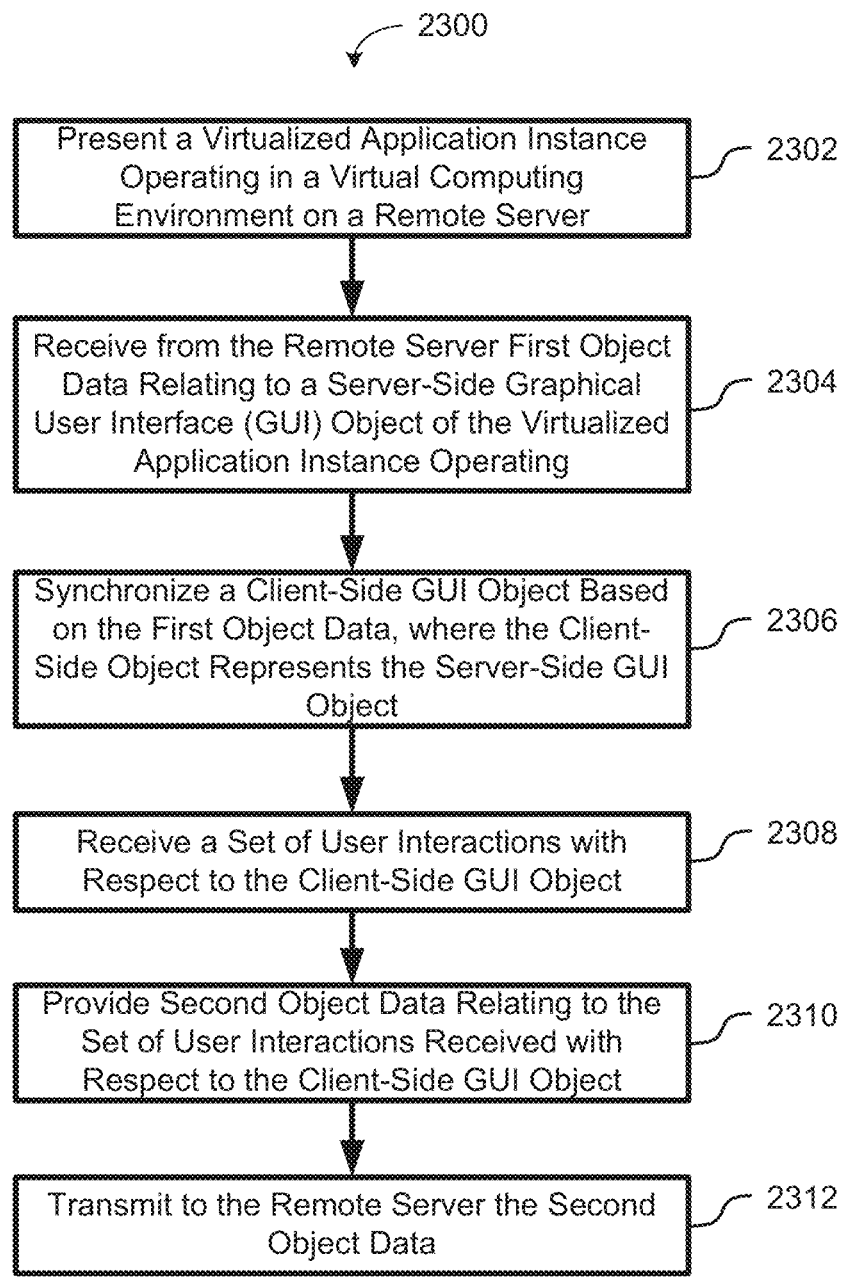
FIG. 23 is flowchart illustrating an exemplary method for client-side graphical user interface (GUI) interaction in accordance with various embodiments.

FIG. 23 is flowchart 2300 illustrating an exemplary method for client-side graphical user interface (GUI) interaction in accordance with various embodiments. For some embodiments, the method presented by the flowchart 2300 may be implemented using various components of the client 302 of FIG. 17, as described below. For example, the method may begin at step 2302 by presenting a virtualized application instance, operating in a virtual computing environment on a remote server (e.g., the ASP system 310), through the client module 1702. The presentation of the virtualized application instance may be facilitated at the client 302 through the client module 1702 in accordance with embodiments described herein. At step 2304, the client-side object communication module 1718 may receive (e.g., from the ASP system 310) first object data relating to server-side graphical user interface (GUI) object of a virtualized application instance on the remote server (e.g., the ASP system 310). Various embodiments may involve a variety of GUI objects including, for example, a text box, a dialog box, a button, a drop down box, a toolbar, a toolbar item, a menu, a menu item, a radio option, or a check box. Those skilled in the art will appreciate that other GUI objects may be utilized by some embodiments.

At step 2306, the object management module 1716 may synchronize the client-side GUI object based on the first object data, where the client-side object represents the server-side GUI object (e.g., on the ASP system 310). For example, the graphical presentation of the client-side GUI object (e.g., size, shape, location, color, or style) may be based on the first object data, and the first object data may contain information regarding the graphical presentation of the server-side GUI object (e.g., on the ASP system 310) with which the client-side GUI object is synchronizing.

At step 2308, a user interface module (e.g., of the workspace application 1704) may receive a set of user interactions with respect to the client-side GUI object. At step 2310, the object management module 1716 may provide second object data relating to the set of user interactions received with respect to the client-side GUI object. As described herein, the set of user interactions may include such input events as, for example, keyboard events, mouse events, and gesture events (e.g., through a touch-enabled display coupled to the client 302) received at the client 302 with respect to a client-side GUI object presented at the client 302 (e.g., display coupled to the client 302). For example, the client-side GUI object may be a GUI button that receives a button push and a two-finger swipe gesture. At step 2312, the client-side object communication module 1718 may transmit to the remote server (e.g., to the ASP system 310) the second object data.

Figure 24:
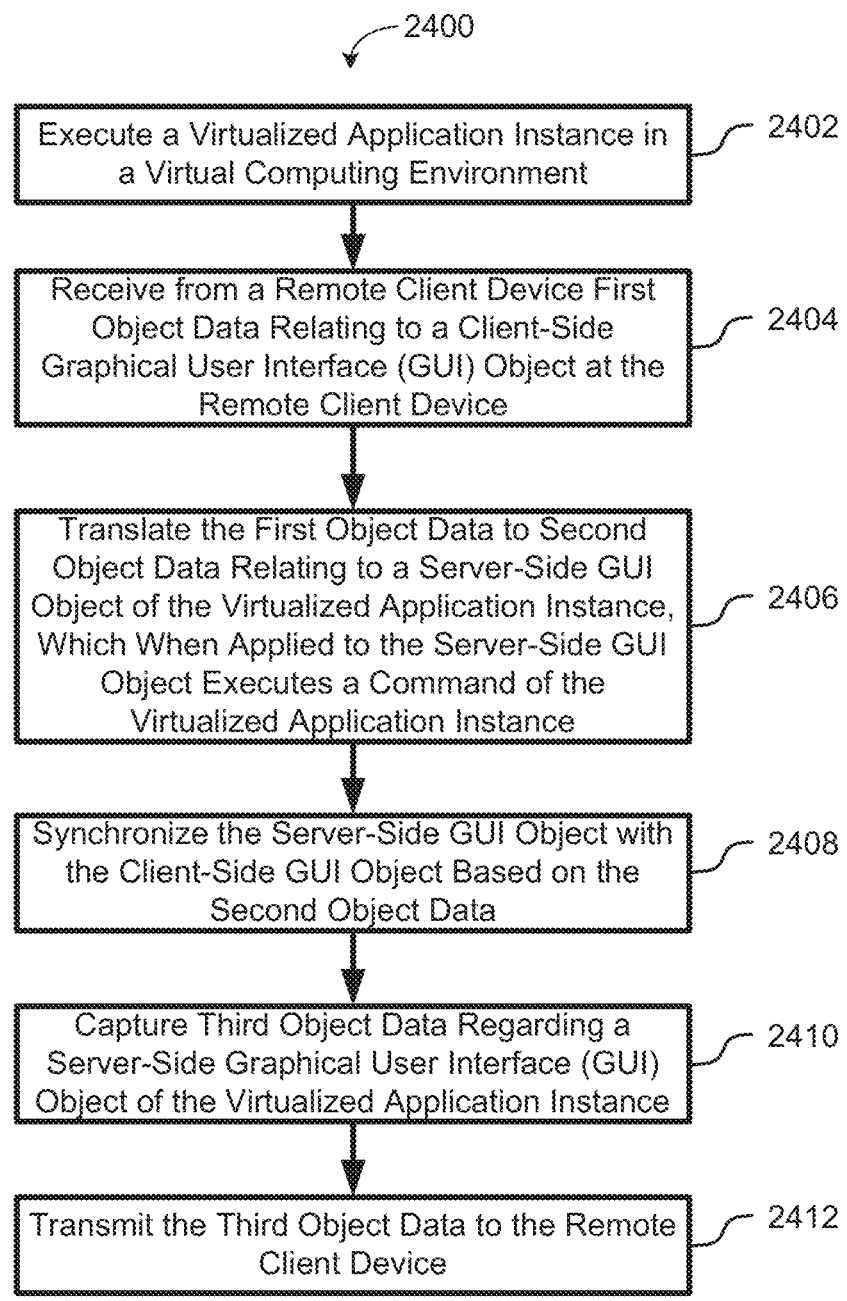
FIG. 24 is flowchart illustrating an exemplary method for server-side graphical user interface (GUI) interaction in accordance with various embodiments.

FIG. 24 is flowchart 2400 illustrating an exemplary method for server-side graphical user interface (GUI) interaction in accordance with various embodiments. For some embodiments, the method presented by the flowchart 2400 may be implemented using various components of the APS 320 of FIG. 18, as described below. For example, the method may begin at step 2402 with the virtualization module 1802 executing a virtualized application instance (based on a version of the application) in a virtual computing environment (e.g., using a cloud-based service, such as SaaS, IaaS, or PaaS). In accordance with some embodiments, each virtualization may be performed in a sandbox (e.g., the sandbox 1820). At step 2404, the server-side object communication module 1828 may receive first object data relating to a client-side graphical user interface (GUI) object at the remote client device (e.g., the client 302). Various embodiments may involve a variety of GUI objects on the client-side including, for example, a text box, a dialog box, a button, a drop down box, a toolbar, a toolbar item, a menu, a menu item, a radio option, or a check box. Those skilled in the art will appreciate that other GUI objects may be utilized by some embodiments.

For some embodiments, the first object data may comprise a set of user interactions with respect to the GUI object. As noted herein, the set of user interactions may include such input events as, for example, keyboard events, mouse events, and gesture events (e.g., through a touch-enabled display coupled to the client 302) received at the client 302 with respect to a client-side GUI object presented at the client 302 (e.g., display coupled to the client 302).

At step 2406, the APS 320 may utilize an object translation module to translate the first object data to second object data relating to a server-side GUI object of the virtualized application instance, where the second object data when applied to the server-side GUI object executes a command of the virtualized application instance. Various embodiments may involve a variety of GUI objects on the server-side including, for example, a text box, a dialog box, a button, a drop down box, a toolbar, a toolbar item, a menu, a menu item, a radio option, or a check box. Those skilled in the art will appreciate that other GUI objects may be utilized by some embodiments.

For some embodiments, the second object data may comprise a set of user interactions to be applied to the server-side GUI object. As with the first object data, the set of user interactions of the second object data may comprise such input events as, for example, keyboard events, mouse events, and gesture events (e.g., through a touch-enabled display coupled to the client 302). The set of input events of the second object data may be those to be performed with respect to the server-side GUI object when the server-side GUI object is synchronized with the client-side object. The set of user interacts of the second object data may be different from those of the first object data, and may be compatible with the server-side GUI object. For example, where the client-side GUI object is a menu bar, and the first object data comprises selecting a menu item and a menu sub-item on the menu baron the client 302, the object translation module may translate the first object data to a second object data comprising a selection on a toolbar (e.g., server-side GUI object) of the virtualized application instance.

At step 2408, the object synchronization module 1830 may synchronize the server-side GUI object with the client-side GUI object based on the second object data. As noted herein, the server-side GUI object may be synchronized with the client-side GUI object by applying the second object data to the server-side GUI object. For some embodiments, the application of the second object data to the GUI object of the virtualized application instance may comprise performing the second set of user interactions with respect to the client-side GUI object.

At step 2410, the object capture module 1826 may capture second object data regarding an application object of the virtualized application instance. For example, where the server-side GUI object is a toggle toolbar button, the object capture module 1826 may capture context data regarding that toggle toolbar button (e.g., determine its toggle state) and provide that context data as third object data. At step 2412, the server-side object communication module 1828 may transmit the third object data to the remote client device (e.g., the client 302).

Those skilled in the art will appreciate that various embodiments do not require that the client-side GUI object be similar to the server-side GUI object. The method of the flowchart 2400 may translate the first object data to the second object data even when the client-side GUI object and the server-side GUI object are different GUI types.

Though FIGS. 23 and 24 are described and illustrated in terms of synchronization of objects, various embodiments may facilitate graphical user interface (GUI) interactions between a client and server without the need for synchronization of objects. More regarding user-interaction without synchronization of objects is discussed later with respect to FIGS. 26-29.

FIGS. 25A-25D are a set of flow diagrams illustrating graphical user interface (GUI) interaction between an exemplary, specifically the client 302, and an exemplary application server, the APS 320, in accordance with various embodiments. For FIGS. 25A-25D, the client module 1702 of the client 302 may be operating a client-native application 2504, which may be configured to provide a user at the client 302 with access to a virtualized application instance 2512 provided by the APS 320. The virtualization module 1802 of the APS 320 may be executing the virtualized application instance 2512 on behalf of/for the benefit of the client 302. While the client 302 of FIGS. 25A-25D may be similar (e.g., in form, function, and/or composition) to the client 302 of FIG. 17, the APS 320 of FIGS. 25A-25D may be similar (e.g., in form, function, and/or composition) to the APS 320 of FIG. 18.

The client-native application 2504 may be configured and/or enhanced for operation on the client 302, which may be a mobile computing device (e.g., smartphone or tablet) having a smaller display than those used by desktop and laptop computing systems, and may be touch-enabled. Accordingly, the client 302 may be configured to receive gesture-based inputs with respect to objects presented on the display, and may be further configured to display GUI objects enhanced for receiving gesture-based inputs (e.g., slide button). The GUI objects presented by the client-native application 2504 may enhanced for visibility on the client device 302. Enhancements for a given GUI object may include, for example, position, orientation, size, color, shape, and mode of operation (e.g., slide button generally requires making contact with the sliding button with a finger and dragging the button across the display as the contact is maintained).

The virtualized application instance 2512 may be configured and/or enhanced for operation on desktop and/or laptop computing systems, typically using a mouse and/or keyboard input. Examples of applications operable as the virtualized application instance 2512 can include word processing applications, spreadsheet applications, presentation application, media editing applications, and the like, which tend to be configured for operation on or from a computer system having a keyboard device, a mouse device, and a display of sufficient size to view GUI objects of the virtualized application instance 2512.

Figure 25A:
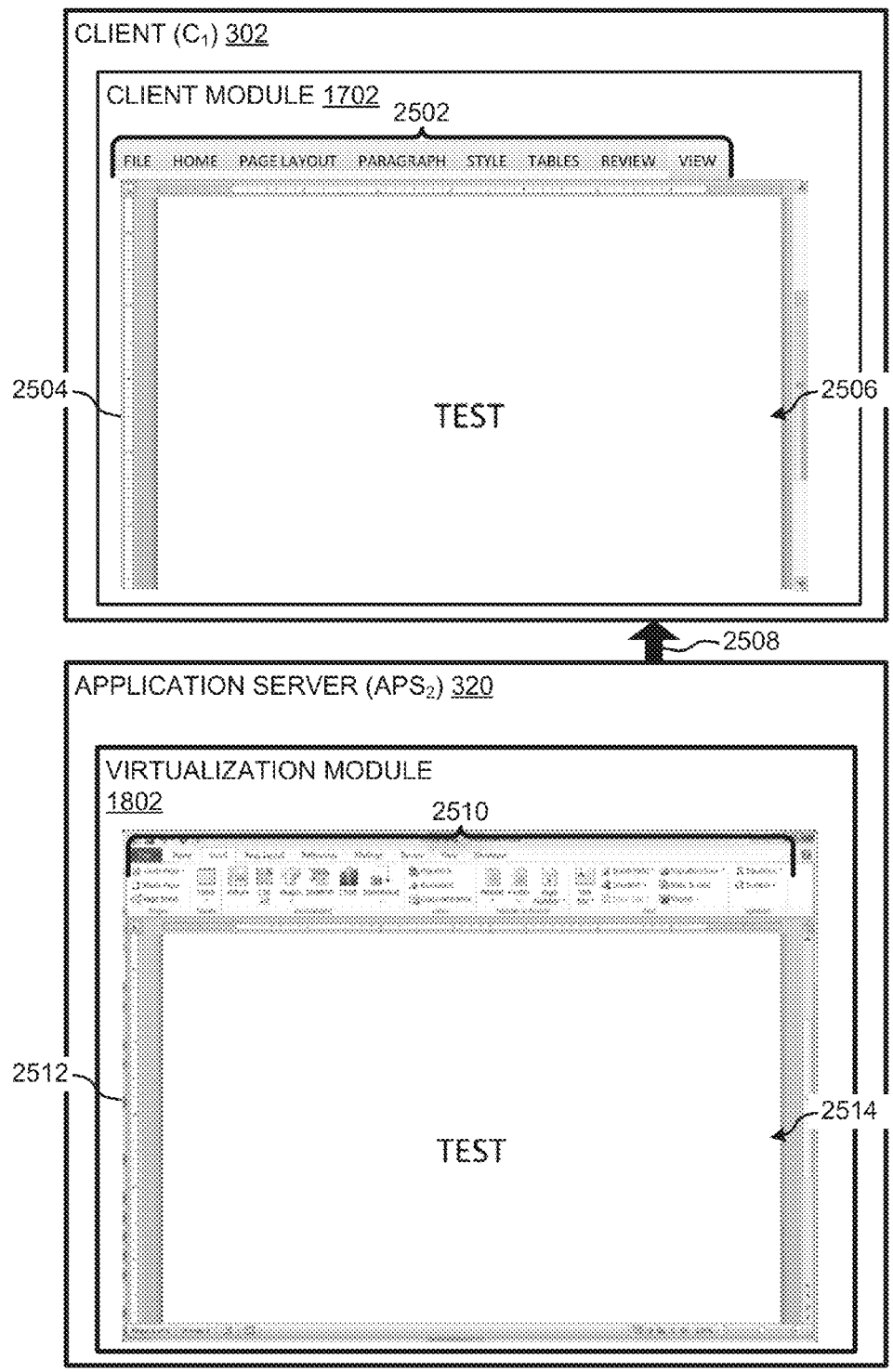
FIGS. 25A-25D are a set of flow diagrams illustrating graphical user interface (GUI) interaction between an exemplary client and an exemplary application server in accordance with various embodiments.

As shown in FIG. 25A, the virtualized application instance 2512 may comprise a GUI toolbar configured to receive input events (e.g., mouse clicks) and invoke commands of the virtualized application instance 2512 in response to those input events. As also shown, the virtualized application instance 2512 may comprise a document viewing pane 2514, which presents the document currently being access (e.g., currently open) by the virtualized application instance. For example, in the case of a spreadsheet application, the document viewing pane 2514 may present the current spreadsheet being accessed. In the case of FIG. 25A, the virtualized application instance 2512 is shown to be a word processing application presenting a word processing document in the document viewing pane 2514.

For some embodiments, the document viewing pane 2514 of the virtualized application instance 2512 may be transmitted to as video output data 2508, and displayed by the client-native application 2504 as a video-rendered document viewing pane 2506. According to some embodiments, the video-rendered document viewing pane 2506 may be similar to if not identical to the document viewing pane 2514 of the virtualized application instance 2512.

The client-native application 2504 may also display a client-native GUI toolbar 2502 in place of the GUI toolbar 2510 of the virtualized application instance 2512. In accordance with some embodiments, the client-native GUI toolbar 2502 may be enhanced for display on the client 302 and may provide a benefit over the GUI toolbar 2510 of the virtualized application instance 2512. For example, as shown in FIG. 25A, the client-native GUI toolbar 2502 may be larger in size and more visible than the GUI toolbar 2510 of the virtualized application instance 2512, thereby making the client-native GUI toolbar 2502 easier to read on the display of the client 302, especially where the client 302 is a mobile device. Depending on the embodiment, the GUI toolbar 2510 of the virtualized application instance 2512 may be replaced by overlaying the client-native GUI toolbar 2502 over the GUI toolbar 2510. Alternatively, the GUI toolbar 2510 may be filtered from the video output of the virtualized application instance 2512 (e.g., at the APS 320 or once it arrives at the client 302) such that the client-native GUI toolbar 2502 can take the place of the GUI toolbar 2510.

Figure 25B:
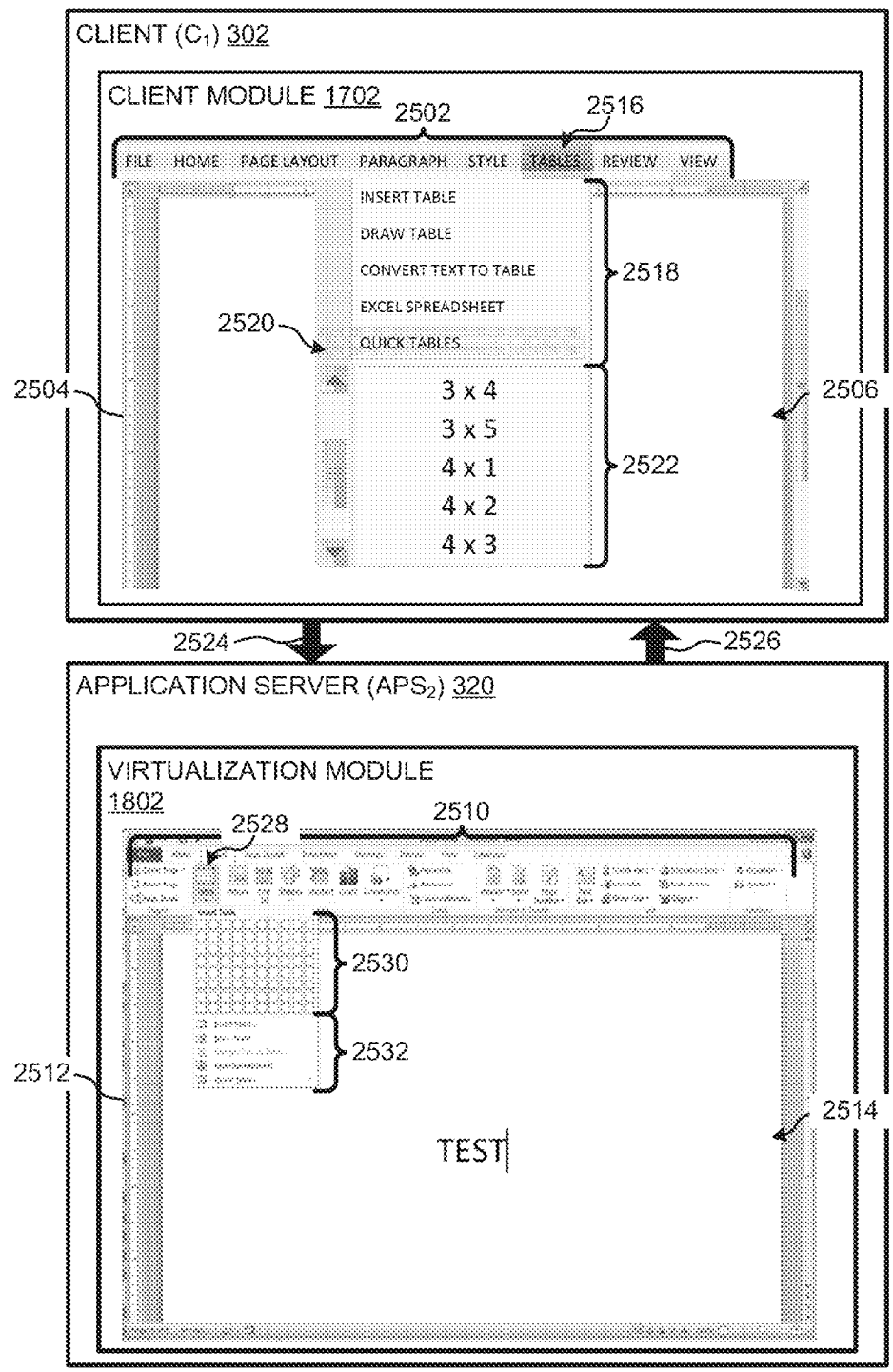

FIG. 25B illustrates the selection of a menu item 2516 on the client-native GUI toolbar 2502, and the presentation of a list of sub-menu items 2518. When a sub-menu item 2520 (e.g., "Quick Table") is selected from the list 2518, an additional list of sub-menu items 2522 (e.g., for "Quick Table" options) may be presented for user selection. The selections (e.g., input events) entered with respect to the client-native GUI toolbar 2502 may be transmitted to the APS server 320 as object data 2524. Upon receiving the data 2524, the APS server 320 may translate (e.g., map) input event in the object data 2524 to user interactions (e.g., input events) compatible, and appropriate to, with the GUI toolbar 2510 of the virtualized application instance 2512. As illustrated in FIG. 25B, applying the resulting translation to the GUI toolbar 2510 may result in the selection of a table button 2528 on the GUI toolbar 2510, which may result in the presentation of a grid 2530 for quick table creation, and a list of sub-menu items 2532. Upon the successful selection of the table button 2528, the APS 320 may provide the client 320 with confirmation 2526 of the success.

Figure 25C:
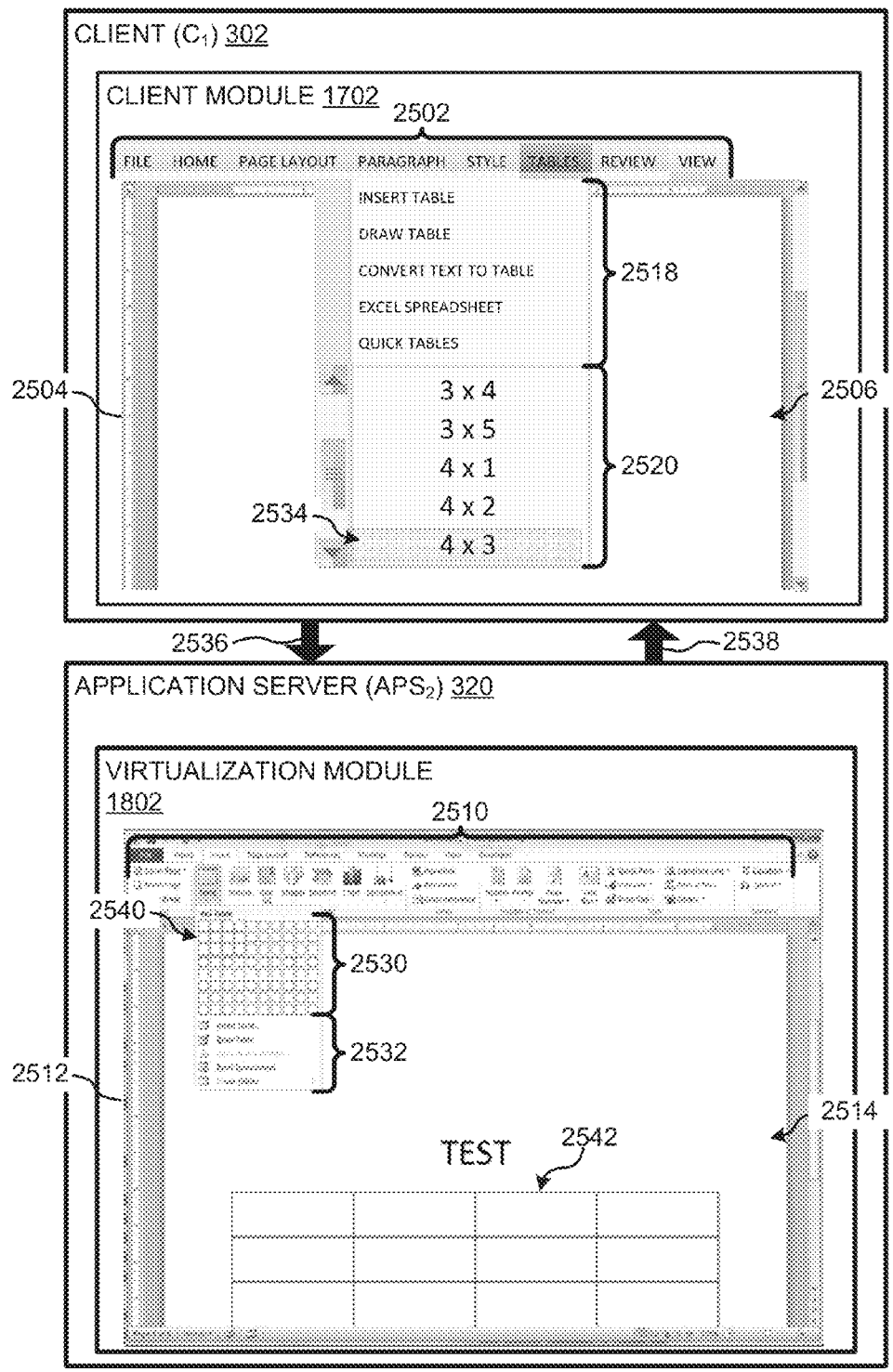
Figure 25D:
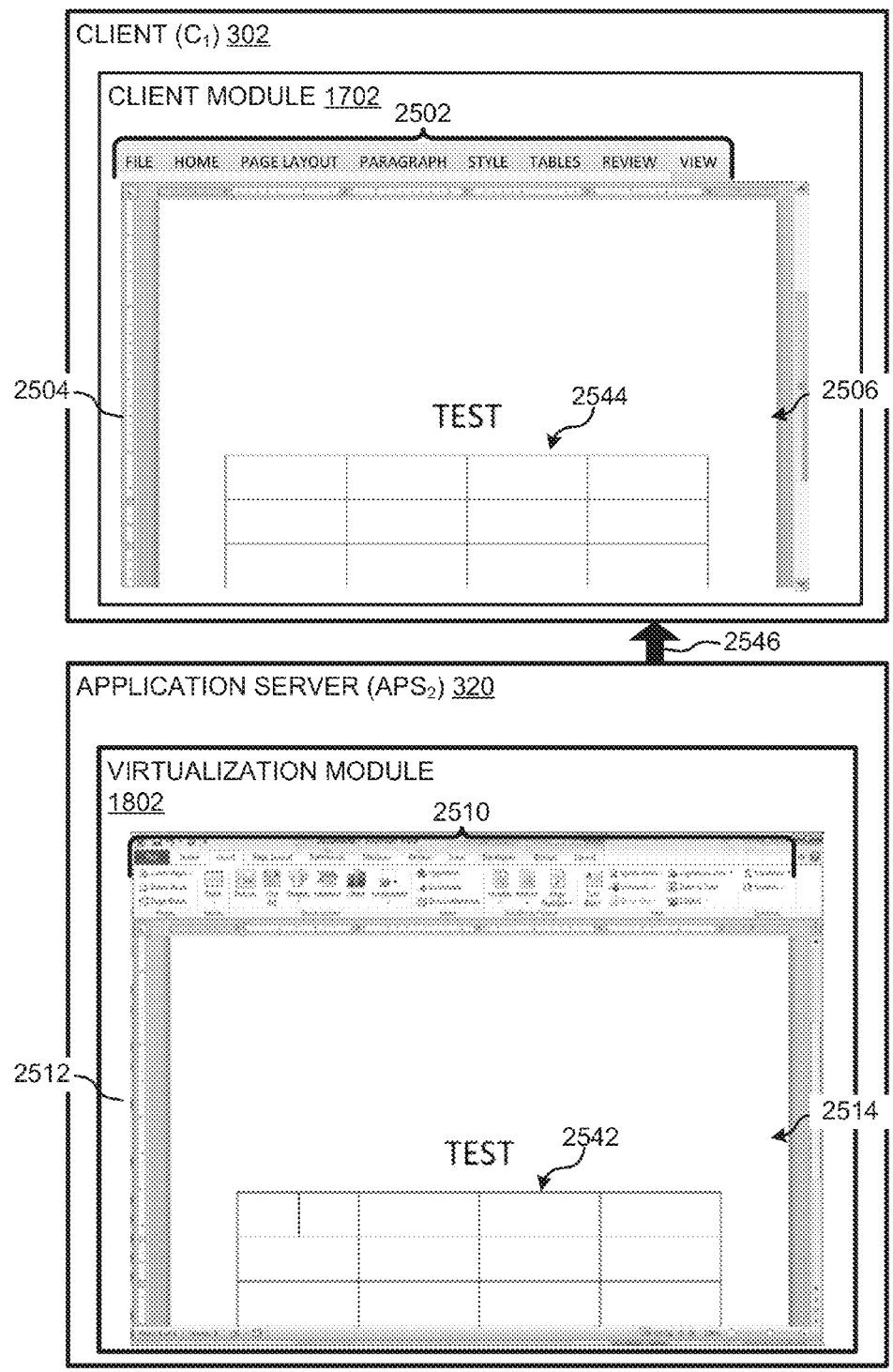

FIG. 25C illustrates the selection of a sub-menu item 2534 (i.e., insert "4×3" Table Option) from the list of sub-menu items 2522. From the selection, the client 302 may transmit object data 2536 to the APS 320 comprising data regarding the input event (e.g., the selection) with respect to the sub-menu item 2534. The APS 320, upon receiving the object data 2536, may translate (e.g., map) input event in the object data 2536 to user interactions (e.g., input events) compatible with, and appropriate to, the GUI toolbar 2510 of the virtualized application instance 2512. In the case of FIG. 25C, applying the resulting translation to the GUI toolbar 2510 may result in the selection of "4×3" table vis-à-vis the grid 2530 for quick table creation, which in turn may result in the command to insert a 4 cell by 3 cell table 2542 in the current document. Upon the successful selection with respect to the grid 2530, the APS 320 may provide the client 320 with confirmation 2538 of the success.

Where the command invoked results in a change in the document viewing pane 2514 (e.g., insertion of the table 2542), such change would reflected in through video output 2546 of the virtualization application instance 2512 from the APS 320 to the client 302. As shown in FIG. 25D, the client 302 could display the video output 2546 in the video-rendered document viewing pane 2506 of the client 302 as video rendered output (e.g., table 2542 shown as video-rendered table 2544 at the client 302).

Figure 26:
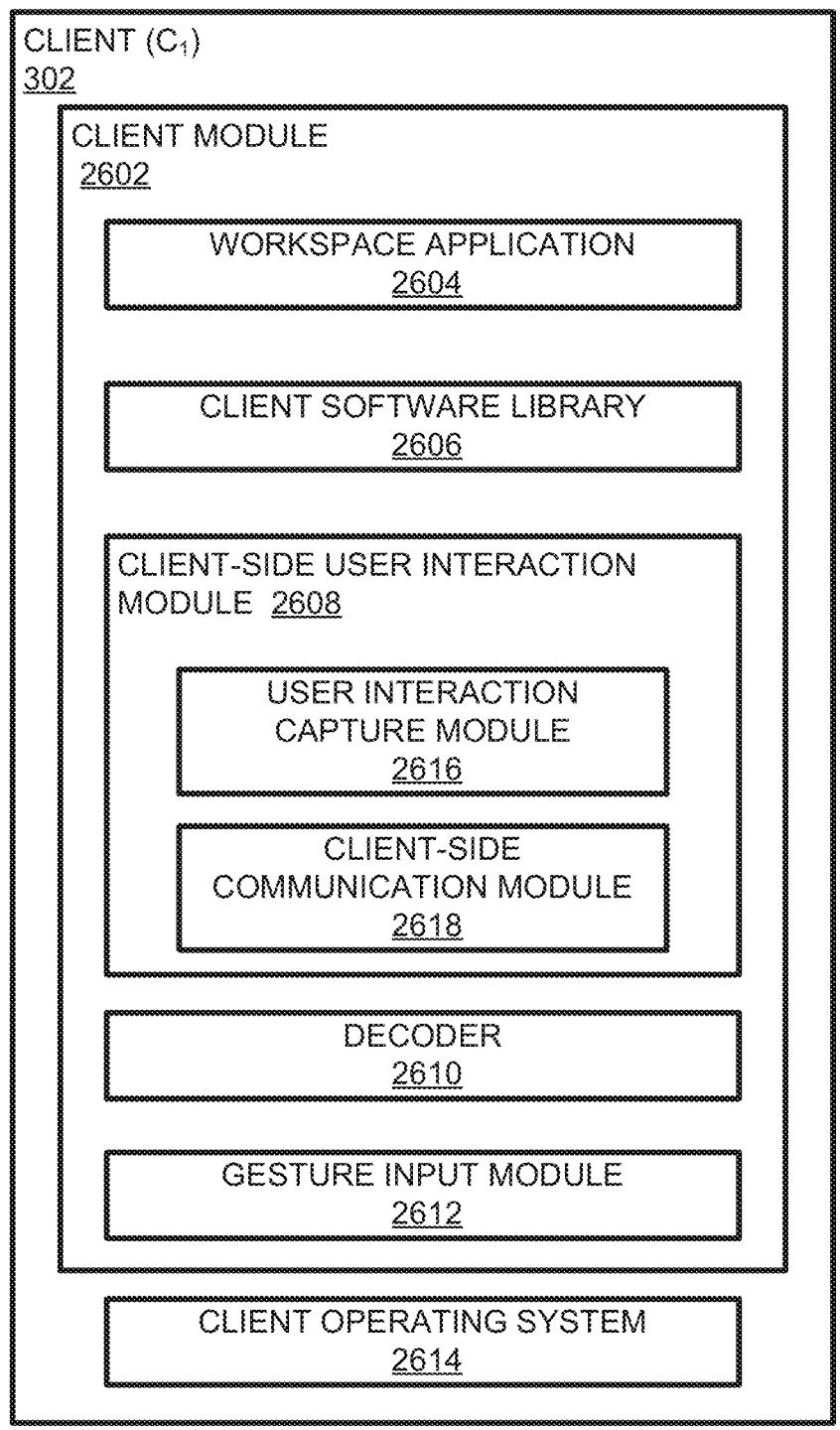
FIG. 26 is a block diagram illustrating an exemplary client configured to operate with an exemplary system for user interaction in accordance with various embodiments.

FIG. 26 is a block diagram illustrating an exemplary client, specifically the client 302, configured to operate with an exemplary system for providing application access with user interaction in accordance with various embodiments. As shown, the client 302 comprises a client module 2602 and a client operating system 2614 operable in supporting operations by the client module 2602 on the client 302. Depending on the embodiment, the client module 2602 may be similar to the client module 202 described with respect to FIG. 2A, where the client module 2602 may facilitate communication between the client 302 and an ASP system (e.g., the ASP system 310), provide a user at the client 302 with a client user interface configured to facilitate user interaction with an ASP system (e.g., the ASP system 310), relay user input received through the client user interface from the user at the client 302 to an ASP system (e.g., the ASP system 310), relay data and/or output (e.g., video, audio, or other data) from an application provided by an ASP system (e.g., the ASP system 310) to one or more components of the client 302 configured to receive and present the output through the client user interface.

To implement such functionalities (and others), the client module 2602 may comprise a workspace application 2604 configured to present the client user interface to a user through a video display coupled to the client 302 (e.g., including generating or presenting a graphical user interface associated with the client user interface and handling the presentation of application output received from an ASP system), a client software library 2606 configured to support various functionalities of the client module (e.g., support the functions of the workspace application 302 or a decoder 2610), a client-side user interaction module 2608 configured to facilitate interaction between the client 302 and an ASP system (e.g., the ASP system 310), and the decoder 2610 configured to decode encoded output data (e.g., video, audio, or other data) received from an ASP system (e.g., the ASP system 310) and provide the decoded output data (e.g., to the workspace application 2604) for presentation to the user of the client 302 (e.g., video output data routed to the video display of the client 302, and audio data routed to the sound processor of the client 302).

For some embodiments, where application output from the ASP system (e.g., the ASP system 310) is provided as data from the ASP system to the client 302, the decoder 2610 may be optional. For example, data provided from the ASP system (e.g., the ASP system 310) to the client 302 may include content from a document being accessed at the ASP system and/or one or more objects embedded in a document being accessed at the ASP system. In return, the client 302 may provide to the ASP system (e.g., the ASP system 310) data including document content updated locally at the client 302 and/or one or more document-embedded objects embedded updated locally at the client 302. By relying on data for interactions between the client 302 and the ASP system (e.g., the ASP system 310), various embodiments may avoid having to use video stream output from the ASP system to receive output from accessed applications.

In some embodiments, the workspace application 2604 may be a runtime application compatible with the operating system 2614 of the client 302. Accordingly, for some embodiments, the workspace application 2604 is a native application of the client 302. Additionally, the workspace application 2604 may be configured to provide access to applications that may be incompatible with the operation system 2614 of the client 302 or that may otherwise not be operable on the client 302 without the use of the workspace application 2604. Additionally, the workspace application 2604 may implement interaction with accessed applications by way of the client-side user interaction module 2608.

The workspace application 2604 may also be configured to provide universal and/or agnostic file management access to various files that are stored at separate and disparate data storage services but made available through an ASP system (e.g., the ASP system 310). Accordingly, in some embodiments, the workspace application 2604 may comprise a file management interface adapted to user requests for file management operations, such as adding (e.g., by creation of a new file or by upload), deleting, moving, and renaming files. For some embodiments, the workspace application 2604 may utilize web-based application programming interfaces (APIs), which may be associated with one or more web applications (e.g., Google® Docs), to access files stored on cloud-based services. For example, in order to list files accessible through the ASP system (e.g., the ASP system 310), the workspace application 2604 may utilize web-based APIs for a given cloud-based service (e.g., Dropbox, Box, or Google® Docs) to directly perform file management operations (e.g., listing of stored files, adding files, deleting files, or renaming files) with respect to that service. Then, when a file listed through the workspace application 2604 is selected for opening through the ASP system (e.g., using a virtualized application instance provided through the ASP system 310), the workspace application 2604 may instruct the ASP system to obtain a copy to the selected file from it respective storage source (e.g., cloud-based storage source or local storage source) or directly access the file from its respective storage source. Thereafter, the ASP system may initiate a virtualized application instance having access to the selected file, and the output data of the virtualized application instance may be transmitted to the client 302.

The client-side user interaction module 2608 may be configured to perform one or more of the following: (a) receive from the ASP system (e.g., the ASP system 310) data relating to an application object provided by an application being provided for access by the ASP system (e.g., the virtualized application instance); (b) generate at the client 302 (e.g., graphically render or facilitate the rendering of) a client-side object representing the application object based on the data received; (c) receive a set of user interactions (e.g., input events entered by a user into the client 302 and received by the client module 2602) with respect to the client-side object; (d) effectuate one or more modifications to the client-side object in accordance with those user interactions (e.g., resizing, repositioning, or changing properties of the client-side object); and/or (e) provide data for the modified client-side object that results. For specific embodiments, the client-side object may be an object native to the remote client device, and the application object may be a document object (e.g., document embedded image, drawing, or graph) of a document accessed by the provided application.

An example of this can include where the application object is an image embedded in a word processing document (e.g., Microsoft® Word® document) and the word processing document is being accessed by an instance of word processing application (e.g., Microsoft® Word®) being provided by the ASP system (e.g., the ASP system 310) to the client 302. The ASP system may transmit to the client 302 data relating to the image object embedded in the word processing document, and the client-side user interaction module 2608 may generate at the client 302 a client-side object representing the document-embedded image object. As noted herein, the client-side object representing the document-embedded image object may or may not be similar in appearance, size, and/or orientation to the document-embedded image object being presented by the provided application. Given that the application object is one that can be visually presented, the client-side user interaction module 2608 may render a visual representation of the client-side object generated in representation of the document-embedded image object, with the visual representation being subsequently output to a display coupled to the client 302 (e.g., via the client module 2602). Thereafter, a user may manipulate the size, position, orientation or content of the client-side object as it is presented on the client 302, thereby resulting in a modified client-side object. When the user has ceased manipulation of the client-side object, the client-side user interaction module 2608 may generate data relating to the modified client-object that is sufficient for the ASP system (e.g., the ASP system 310) to apply similar modification to the document-embedded image object represented by the client-object in question.

For some embodiments, the client-side user interaction module 2608 may determine that a user has ceased their modification of the client-side object by a number of actions taken by the user. Examples include, explicitly commanding the user-side application (e.g., the workspace application 2604) to apply the changes to the application object residing at the ASP system (e.g., explicit command via a "Save" button), by a user de-selecting the client-side object as it is presented on the client 302 (e.g., user selects another client-side object).

In certain embodiments, the visual representation of the client-side object (representing the application object) may be presented on the client 302 as an overlay over video output of the application being provided from the ASP system (e.g., the ASP system 310). In some embodiments, the video output received from the application provided by the ASP system may contain the application object as visually presented by the provided application. In particular embodiments, the client-side object may be rendered as part of the application as the application is rendered at the client 302 for presentation. Accordingly, the non-rendered graphical data received from the application provided by the ASP system may contain information sufficient for the client 302 to render the application object as intended by the provided application.

Subsequently, when a user at the client 302 selects the application object (e.g., by way of controlling the application provided by the ASP system through the client 302), the client-side user interaction module 2608 and/or the ASP system (e.g., the ASP system 310) may detect selection of the application object selection (e.g., for modification of the application object in the provided application). For example, the client-side user interaction module 2608 and/or the ASP system may detect selection of the application object when the provided application detects the general selection of the application object, or when the provided application detects selection of a corner, an edge, a body, or another element of the application object. The detection may result in the client 302 generating and presenting (e.g., via the workspace application 2604) a client-side object in representation of the selected application object, possibly in response to the ASP system (e.g., the ASP system 310) detecting the selection of the application object and sending object data to the client 302 (according to which the client 302 generates the client-side object).

As noted herein, those skilled in the art will appreciate that where applicable, visual representation of the client-side object that represents the application object may or may not share visual similarities (e.g., appearance, size, orientation, color, style, etc.) to the application object of the being provided by the ASP system (e.g., the ASP system 310). Additionally, the application object of the application being provided by the ASP system can be one of many different types of objects utilized by the application, which may be graphical and non-graphical in nature. For example, application objects can include, a graphical or non-graphical user interface element of the provided application (e.g., a menu bar, a toolbar, a ribbon bar, or tabs graphically presented by the provided application), an object (e.g., annotation, image, graph, computer graphics, video, etc.) embedded in a document currently being accessed (e.g., opened and being edited) by the provided application, content of a document currently being accessed by the provided application, or some form of visual or audio output generated by the provided application (e.g., video or music). Those skilled in the art will appreciate that any number of application objects may be compatible and utilized by various embodiments.

The client-side user interaction module 2608 may comprise a user interaction capture module 2616 and a client-side communication module 2618, which facilitate the various functionalities of the client-side user interaction module 2608. The user interaction capture module 2616 may facilitate capturing user interactions with respect to the client-side object, such as modifications to the client-side object based on the set of user interactions (e.g., received through the workspace application 2604), and providing second data relating to the modified client-side object that results. For some embodiments, the user interaction capture module 2616 may also facilitate generation of (e.g., rendering or rendering an update to) the client-side object based on data received from the ASP system (e.g., the ASP system 310) and relating to the application object. For specific embodiments, once a client-side object in association with an application object is generated and/or presented on the client 302, the user interaction capture module 2616 may maintain storage and/or track the client-side object in connection with the application provided by the ASP system, and handle presentation of the client-side object at relevant times (e.g., when the video output from the provided application contains the associated application object). Subsequently, when an application object previously encountered/handled by the client 302 already has a corresponding client-side object created, updated, and/or maintained by the user interaction capture module 2616, the corresponding client-side object may be recalled by user interaction capture module 2616 (e.g., from cache) when the application object is selected, and the recalled client-side object may be presented on the client 302 for manipulation/modification. Eventually, if the client-side object is modified, the modified client-side object may be saved to the cache and may cease to appear on the client 302 (e.g., once the one or more modifications to the client-side object have been transmitted to the ASP system to be applied to the application object). As noted herein, modifications to the client-side object, facilitated through user interactions at the client 302, may be transmitted to the ASP system and applied to the application object when a user at the client 302 is specifically instructed to save the modifications and/or the client-side object is de-selected by the user at the client 302 (e.g., user selects another application object).

The client-side communication module 2618 may be configured to receive from the ASP system (e.g., the ASP system 310) data relating to the application object, and may be configured to transmit to the ASP system the data relating to a client-side object representing the application object. Communication of data from the client-side communication module 2618 to the ASP system (e.g., the ASP system 310), from the ASP system to the client-side communication module 2618, or both may be enabled by way of a network transport layer protocol (hereinafter, "transport layer"), which may configured to define data in a pre-defined manner understood by the intended target. The transport layer may, for example, define object data in accordance with a XML file. For some embodiments, the transport layer may be utilized in conjunction with network layer protocols employed in transporting video output data from the ASP system (e.g., the ASP system 310) to the client 302.

Though not illustrated, for some embodiments, the client-side user interaction module 2608 may further comprise a translation module configured to translate data sent from the ASP system (e.g., the ASP system 310) to the client 302, and/or data sent from the client 302 to the ASP system. For instance, the translation module may translate data relating to the application object to data compatible with client-side object. The data compatible with the client-side object may be such that the client-side object can accurately represent the application object. In another example, the translation module may translate the data relating to the client-side object to data compatible with the application object.

The data relating to the application object may comprise contextual information regarding the application object, where the contextual information may be sufficient to generate, render, or update a rendering of the client-side object at the remote client device. The data relating to the client-side object may comprise a set of user interactions entered at the client 302 with respect to the client-side object, or may comprise contextual information regarding the client-side object.

As noted herein, the hardware of the client 302 (e.g., touch screen of the client 302) may be adapted to receive gestures as user input to the client 302, which results in a gesture input being detected by the operating system 2614 (e.g., Apple® iOS) or another application operating on the operating system 2614. Gestures receivable by the client 302 generally depends on the means by which the client 302 receives gestures. For example, where the client 302 is configured with a touch-based screen (e.g., capacitive screen), the exemplary gestures may include finger-dragging gestures (e.g., dragging in the up, down, left, or right direction), pinching (e.g., pinch-in or pinch-out), swiping (e.g., quick, light, single finger, dual finger, three finger, four finger, five finger, up-to-down, down-to-up, left-to-right, or right-to-left swipe), finger tapping (e.g., single, double, triple, short, or long tap), and flicking (e.g., in one of eight movement directions).

In some embodiments, the client module 2602 may comprise a gesture input module 2612 configured to receive user input entered into the client 302, recognize the user input as a gesture input, and generate or capture data regarding the gesture data. Subsequent to generation/capture, the gesture input module 2612 may transmit the gesture data to an ASP system (e.g., the ASP system 310), possibly through an access server (e.g., the ACS 312). In some instances, the gesture input module 2612 may transmit the gesture data to the APS system (e.g., the APS system 320 via the ACS 312) concurrently with other user input data received at the client 302 (e.g., non-gesture input data received) and intended for transmission to the ASP system.

Depending on the configuration of the client 302, a user may enter user inputs by way of a touch screen of the client 302, by way of physical moving the client 302 configured such that an accelerometer of the client 302 can translate the movement as entry (e.g., shaking the client device is recognized as a gesture), or by way of hand gestures captured by a camera coupled to the client 302.

Those skilled in the art will appreciate that although the gesture input module 2612 is shown as being part of the client 302, the gesture input module 2612 for various embodiments is in no way limited to being implemented in such a manner. Those skilled in the art will appreciate that various embodiments may implement some or all of the gesture input module 2612 at an APS server (e.g., the APS server 320).

In some embodiments, the operating system 2614 may be adapted to natively support gestures and, as such, may readily recognize a set of gestures received by way of user input at the client 302 (e.g., swipe, tap, ping, or flick on a touch screen of the client 302). For example, where the client 302 is a tablet device configured with a touch-based screen for receiving gesture inputs, the client 302 may receive a gesture input through user inputs at the touch-based screen, the operating system 2614 of the tablet device may receive and natively recognize those user inputs as comprising a gesture input, and the operating system 2614 (e.g., through a API feedback or programming constructs) provide data relating to the gesture input ("gesture data") to the gesture input module 2612. For some embodiments, the operating system 2614 may disseminate gesture data by generating one or more gesture input messages in response to recognizing the gesture input. The gesture input messages may be passed amongst various components of the operating system 2614 and/or amongst applications being supported by the operating system 2614, which includes the client module 2602. Where a given gesture input is predefined in the operating system 2614 to perform a particular, native command (or invoke a certain functionality), the gesture input module 2612 may prevent the particular command from being performed when the given gesture input is received. In such cases, the particular command may be blocked while the gesture data for the gesture input may be passed along to the ASP system for execution in the virtualized application instance and/or the virtual computing environment operating the virtualized application instance. For some such embodiments, while the client module 202 is being accessed on the client 302 (e.g., client module 202 is the current, active application), the gesture input module 2612 may temporarily prevent the native command from being performed by overriding the functionality of the given gesture input on the client 302.

In regard to the data generated/captured in relation to the gesture input, the gesture data may comprise a gesture type, a gesture phase (e.g., phases of gesture input as it is inputted by a user), coordinates relating to the gesture (e.g., X/Y coordinates of start and stop of gesture), velocity of gestures (e.g., X/Y components of a vector data representing the gesture), pressure associated with the gesture, or a gesture timestamp (e.g., gesture start and stop timestamp). Based on the gesture data, various embodiments may map the gesture input, which is received at the client 302, to a set of input events compatible with the virtualized application instance and/or the virtual computing environment operating at the ASP system (e.g., the ASP system 310). The mapping eventually determined (e.g., at the ASP system 310) may depend on such factors as version of the application instantiated in the virtualized application instance that is to receive the set of input events, version of the operating system running in the virtual computing environment that supports the virtualized application instance, user-preferences or system defined preferences (e.g., user defined mappings), or some combination thereof.

Upon receiving the gesture data (e.g., data regarding a two-finger swipe) from the gesture input module 2612, the ASP system (e.g., the ASP system 310) may operate on the gesture data, map the gesture data to a set of input events, and execute the set of input events in the virtual computing environment. Take for example where a user inputs a two-finger swipe moving left to right on the touch screen of a client, based on the gesture data transmitted by the gesture input module 2612 to the ASP system, the ASP system may map the swipe to a left to right scrolling input event, which causes the horizontal scroll bar of a viewing pane in the currently active virtualized application instance (e.g., document open in Microsoft® Word®) to scroll right.

Typically, the executed set of input events may effectuate a performance change or a behavioral change with respect to the virtualized application instance currently active at an ASP system (e.g., operating on or being controlled by the ASP system 310) on behalf of the client 302. In order to achieve this, for some embodiments, the set of input events may be operable for execution in the virtualized application instance and/or the virtual computing environment supporting the virtualized application instance. In this manner, various embodiments may render/convert gesture inputs, which may be natively compatible with the operating system and/or applications of client 302, to a set of input events that are compatible with a virtualized application instance and/or its supporting virtual computing environment. This may be particularly useful where the gesture inputs received at the client 302 (and intended for execution in the virtualized application instance) are not natively compatible with, or not fully supported by, the virtualized application instance and/or the virtual computing environment of the virtualized application instance. Such would be the case where, for example, the client 302 is running a version of an Android® operating system, the virtualized application instance comprises a version of Microsoft® Windows® application, and gestures that are natively supported by the Android® operating system of the client 302 (e.g., such as pinch or flick) are not natively supported by the version of Microsoft® Windows® application and/or the Microsoft Windows® operating system supporting the virtualized application instance.

Depending on the embodiment, the mapping of the gesture data to the set of input events may depend on/take into consideration the version of the application comprised in the virtualized application instance and/or the version of the operating system running in the virtual computing environment that is to the set of input events. Those skilled in the art will appreciate that various versions of applications and various version of operating systems may support different types of input events in comparison to one another.

Figure 27:
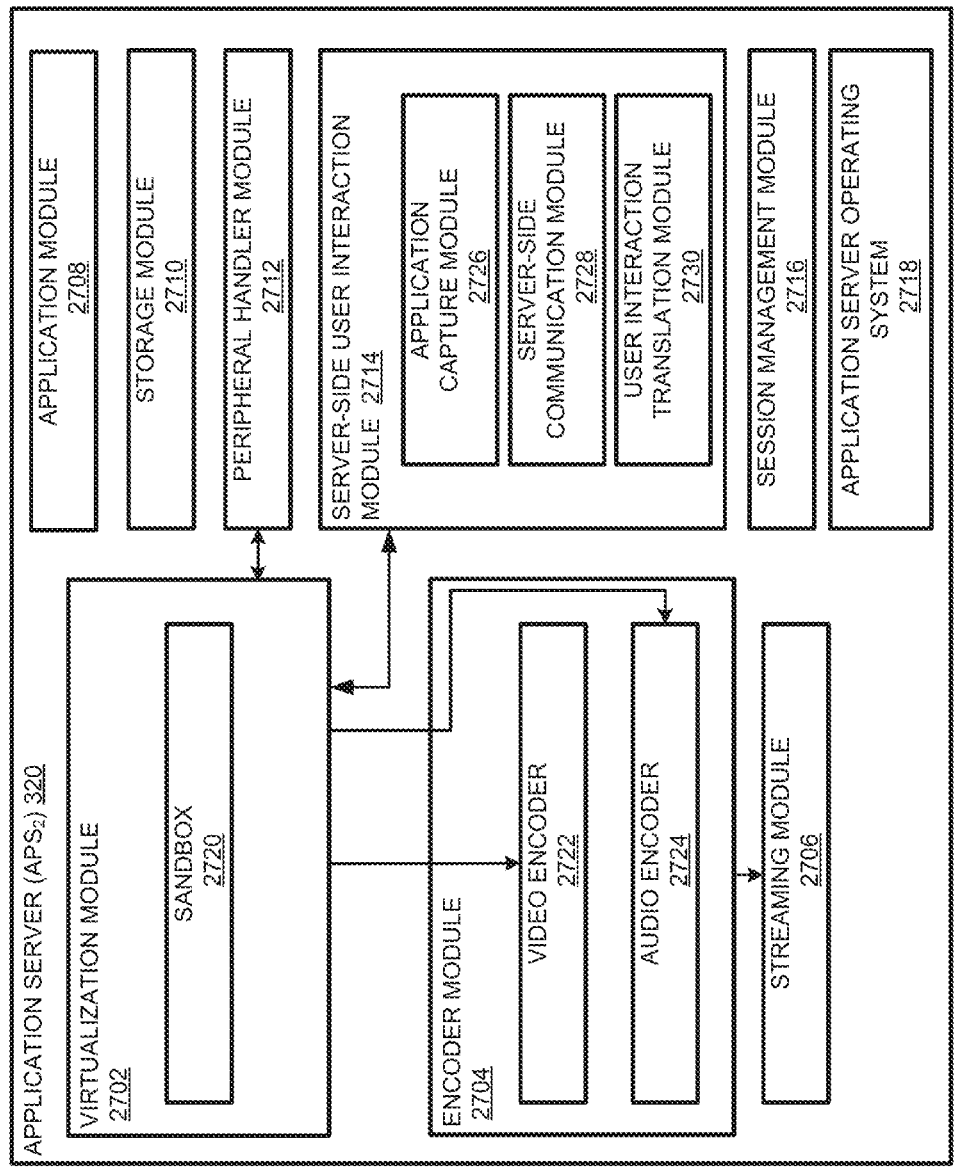
FIG. 27 is a block diagram illustrating an exemplary application server that is part of an exemplary system for user interaction in accordance with various embodiments.

FIG. 27 is a block diagram illustrating an exemplary application server, specifically the application server (APS) 320, which is part of an exemplary system for providing application access with user interaction in accordance with various embodiments. As shown, the APS 320 comprises a virtualization module 2702, an encoder module 2704, a streaming module 2706, an application module 2708, a storage module 2710, a peripheral handler module 2712, a server-side user interaction module 2714, a session management module 2716, and an application server operating system 2718 (configured to support operations of the APS 320 and its various components).

In some embodiments, the virtualization module 2702 may be similar in operation or functionality to the virtualization module 208. Accordingly, the virtualization module 2702 may be configured to establish, monitor, maintain, or otherwise manage execution of a virtualized application instance for the APS 320. As described herein, the virtualized application instance for the purpose of a user at client device accessing the virtualized application instance through the ASP system 310. As shown in FIG. 27, the virtualization module 2702 may comprise a (computer) sandbox 2704 that, in accordance with some embodiments, is configured to separate computing resources (e.g., memory, processor, input/output), of a (physical or virtual) computer system, utilized in performing virtualized application instances. In some instances, each virtualized application instance may be instantiated in a separate sandbox. In various embodiments, the sandbox 2704 may be operating within the virtualization module 2702 or, alternatively, be operating external to the virtualization module 2702, the APS 320, or the ASP 310 (e.g., in a cloud-based service, such as an IaaS or PaaS) but under the control of the virtualization module 2702 (e.g., via APIs).

In general, the computing environment implemented by the sandbox 2720 may be configured to receive input data and transmit output data. Examples of input data to the sandbox 2720 can include communications data (e.g., network data) or control information (e.g., produced by a human machine interface [HMI] device, such as a mouse or keyboard). Examples of output data from the sandbox 2720 can include video data (e.g., data generally produced and outputted to a video display) or audio data (e.g., data generally produced and outputted to audio output device, such as speakers). For some embodiments, providing a user at a client 302 with access to a virtualized application instance operating in the sandbox 2720 can comprise conveying input data or output data between the client 302 and the ASP system 310 and, more specifically, between the client module 502 operating on the client 302 and the virtualization module 2702 of the APS 320.

Before conveying the output data from the virtualization module 2702 (e.g., from the sandbox 2720) to the client 302 (e.g., to the client module 2602), some embodiments may utilize the encoder module 2704 to encode the output data in a format capable of being decoded at the client 302. For some embodiments, the encoder module 2704 may perform this encoding in accordance similar to the encoder module 214 described with respect to FIG. 2A.

In another example, the output data from the sandbox 2720 can include video data or audio data that can be converted as object data, whereby the need for video or audio data from the virtualized application instance can be overcome. For some such embodiments, providing a user at a client 302 with access to the virtualized application instance operating in the sandbox 2720 may involve conveying data between the client 302 and the ASP system 310 and, more particularly, between the client module 2602 of the client 302 and the virtualization module 2702 of the APS 320. For certain embodiments, the data comprising video data and/or audio data may be conveyed to the client 302 in conjunction with, or as a substitute for, the encoded video/audio output data from the encoder 2704.

As shown in FIG. 27, the encoder module 2704 may specifically comprise a video encoder 2720 configured to receive video output data from the virtualization module 2702 (e.g., generated by the virtualized application instance operating in the sandbox 2720) and encode that video output data to encoded video data. Additionally, the encoder module 2704 may specifically comprise an audio encoder 2722 configured to receive audio output data from the virtualization module 2702 (e.g., generated by the virtualized application instance operating in the sandbox 2720) and encode that video output data to encoded audio data.

As also shown in FIG. 27, the encoded (video or audio) data produced by the encoder module 2704 may be provided to the streaming module 2706 for delivery to the client 302 (e.g., to the client module 2602), possibly as one or more data streams (e.g., each carrying a different type of data). For example, the streaming module 2706 may receive encoded audio data and encoded video data from the encoder module 2704 and generate a single data stream (i.e., containing both the audio and the data) that is subsequently delivered to the client module 502 of the client 302. The client module 502, in turn, may extract the encoded audio data and the encoded video data from the received data stream, and decode the data (e.g., using the decoder 508) for presentation to a client at the client 302 (e.g., through a client user interface generated by the workspace application 2602). In some embodiments, the operation or functionality of the streaming module 2706 may be similar to of the streaming module 216 described in FIG. 2A.

As noted herein, the for certain embodiments, data comprising video data and/or audio data may be conveyed to the client 302 as a substitute for the encoded video/audio output data from the encoder 2704. Accordingly, for some embodiments, the encoder 2704 and/or the streaming module 2706 may be optional.

The application module 2708, for some embodiments, may be similar in operation or functionality to the application module 210 described in FIG. 2A. Accordingly, the application module 2708 may be configured to obtain a version of an application (e.g., Microsoft® Excel®) from an application repository maintaining an application copy/image of that version (e.g., operating on a cloud-based server). Upon obtaining the version of the application, the application module 2708 may provide the version to the virtualization module 2702, either by reference (e.g., data path to the version) or as a copy, for instantiation as a virtualized application instance operating in the sandbox 2720.

In some embodiments, the storage module 2710, possibly in combination with the storage module 614, is similar in operation or functionality to the storage module 206 described in FIG. 2A. For example, the storage module 2710 may be configured to operate in conjunction with the storage management module 606 of the ACS 312 to add, remove, modify, or manage connections between the ASP system 310, particularly the APS 320, and various storage entities, such as databases, cloud-based storage services, and traditional file servers (e.g., a private enterprise file server). According to some embodiments, the storage module 2710 in combination with the storage management module 606 may establish a storage-related connections between a virtualized application instance operating in the virtualization module 2702 (e.g., in the sandbox 2720) and a third-party, cloud-based storage service (e.g., Dropbox, Box, or Google® Docs), which is generally external to the ASP system 310. As described herein, the establishment of a connection between the virtualized application instance and the third-party, cloud-based storage service may involve logging into the storage entity using third-party user credentials stored and provided (e.g., by the UP module 604) in association with a user accessing the virtualized application instance.

In various embodiments, the peripheral handler module 2712 may be configured to handle input data received from a user at the client 302 (e.g., from the client module 502) and convey/redirect such input data to the virtualization module 2702 (e.g., a virtualized application instance operating in the sandbox 2720). As described herein, the input data may include, for example control information generated by a human machine interface (HMI) device, such as a mouse, keyboard, joystick, or touch screen. While conveying/redirecting the received input data, the peripheral handler module may translate the input data from a first input type, native to an environment of at least one of the client devices, to a second input type, native to an environment of the virtualized application instance. For some embodiments, the system may further comprise a peripheral handler module configured to redirect an output data received from the virtualized application instance to a peripheral coupled to at least one of the client devices.

For instance, where the control information received from the client 302 is fully or partially incompatible with the version of the application (e.g., Microsoft® Excel® 2011) operating in the virtualized application instance or incompatible with the operating system of the virtual computing environment in which the virtualized application instance is operating (e.g., Microsoft® Excel® 2011), the peripheral handle module 2712 may be capable of translating, converting or remapping the control information from a first input data type that is native/compatible with the client 302 or with the operating system of the client 302 (e.g., Apple® iOS), to a second input data type that is native/compatible with the version of the application operating in the virtualized application instance or with operating system of the virtual computing environment in which the virtualized application instance is operating. Take for example where control information received from the client 302 (e.g., the client module 502) contains gestures entered on a touch screen at the client 302. Such control information, which may be native to/compatible to mobile devices (e.g., based on Android® or Apple® iOS), may be translated or remapped by the peripheral handler module 2712 to mouse movements or keyboard inputs that, in the virtual computing environment of the virtualized application instance, equate to or are a substitute for the gestures originally entered at the client 302. Accordingly, for certain embodiments, the operation or functionality of the peripheral handle module 2712 may include the operations or functionalities described with respect to the gesture module 212 of FIG. 2A.

In some embodiments, the client-side user interaction module 2608 may be configured to perform one or more of the following: (a) capture data regarding an application object of the virtualized application instance executed by the virtualization module 2702 (e.g., based on an application version supplied by the application module 2708); (b) transmit to a remote client device (e.g., the client 302) the first data; (c) receive from the remote client device (e.g., the client 302) second data relating to a client-side object at the remote client device, where the client-side object represents the application object; and/or (d) synchronize the application object with the client-side object based on the second data. As noted herein, the client-side object may be an object native to the remote client device, and the application object may be a document object (e.g., document embedded image, drawing, or graph) of a document accessed by the provided application. For some embodiments, the first data may comprise contextual information regarding the application object, where the contextual information may be sufficient to render or update a rendering of the client-side object at the remote client device (e.g., the client 302). As noted herein, the data for the modified client-side may be transmitted from the client 302 to the ASP system (e.g., the ASP system 310) such that the transmitted data is used by the ASP system to synchronize the application object residing at the ASP system.

The server-side user interaction module 2608 may comprise an application capture module 2726, a server-side communication module 2728, and a user interaction translation module 2730, which facilitate the various functionalities of the server-side user interaction module 2608. For some embodiments, the application capture module 2726 may be configured to capture data regarding an application object of the application provided by the ASP system (e.g., the ASP system 310). For example, the application capture module 2726 may be implemented as a driver operable with (e.g., installable) an operating system in the virtual computing environment in which the virtualized application instance operates (e.g., at the control of the virtualization module 2702), a plug-in operable with (e.g., installable) with the application instance operating in the virtual computing environment, or some combination thereof.

The server-side communication module 2728 may be configured to transmit to a the client 302 the data relating to the application object, and may be configured to receive from the client 302 data relating to a client-side object modified at the client 302 (e.g., by a user), where the client-side object represents the application object on the APS 320.

The user interactions translation module 2730 may be configured to translate the data received from the client 302, which may include information regarding one or more client-side user interactions, to user interaction data compatible with the application object. For example, the user interactions translation module 2730 may map a set of client-side user interactions received to a set of user interactions corresponding to the virtualized application instance, thereby allowing the client-side user interactions to be performed with respect to an application object of the virtualized application instance.

Figure 28:
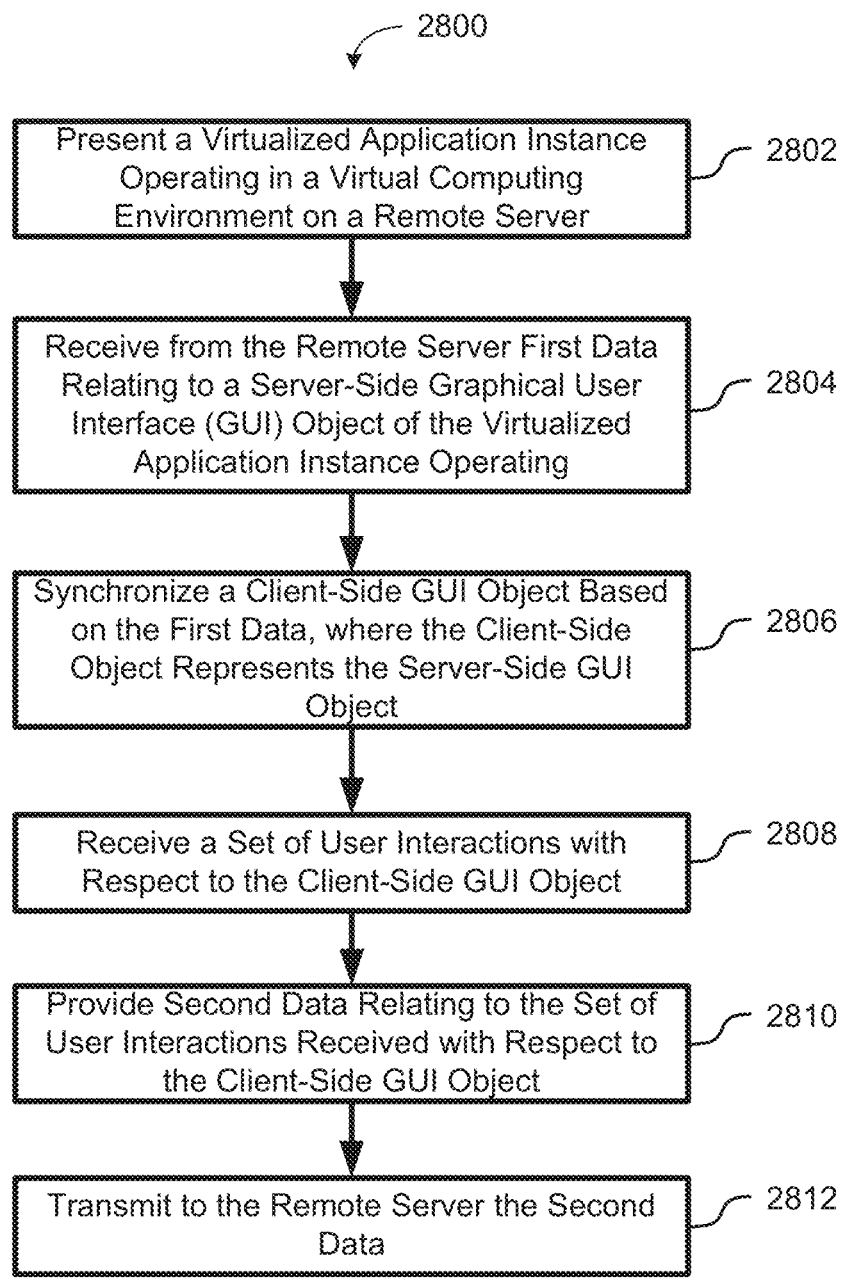
FIG. 28 is flowchart illustrating an exemplary method for client-side graphical user interface (GUI) interaction in accordance with various embodiments.

FIG. 28 is flowchart 2800 illustrating an exemplary method for client-side graphical user interface (GUI) interaction in accordance with various embodiments. For some embodiments, the method presented by the flowchart 2800 may be implemented using various components of the client 302 of FIG. 26, as described below. For example, the method may begin at step 2802 by presenting a virtualized application instance, operating in a virtual computing environment on a remote server (e.g., the ASP system 310), through the client module 2602. The presentation of the virtualized application instance may be facilitated at the client 302 through the client module 2602 in accordance with embodiments described herein. At step 2804, the client-side communication module 2618 may receive (e.g., from the ASP system 310) first data relating to server-side graphical user interface (GUI) object of a virtualized application instance on the remote server (e.g., the ASP system 310). Various embodiments may involve a variety of GUI objects including, for example, a text box, a dialog box, a button, a drop down box, a toolbar, a toolbar item, a menu, a menu item, a radio option, or a check box. Those skilled in the art will appreciate that other GUI objects may be utilized by some embodiments.

At step 2806, the user interaction capture module 2616 may synchronize the client-side GUI object based on the first data, where the client-side object represents the server-side GUI object (e.g., on the ASP system 310). For example, the graphical presentation of the client-side GUI object (e.g., size, shape, location, color, or style) may be based on the first data, and the first data may contain information regarding the graphical presentation of the server-side GUI object (e.g., on the ASP system 310) with which the client-side GUI object is synchronizing.

At step 2808, a user interface module (e.g., of the workspace application 2604) may receive a set of user interactions with respect to the client-side GUI object and the user interaction capture module 2616 may capture that set of user interactions. At step 2810, the user interaction capture module 2616 may provide second data relating to the set of user interactions received with respect to the client-side GUI object. As described herein, the set of user interactions may include such input events as, for example, keyboard events, mouse events, and gesture events (e.g., through a touch-enabled display coupled to the client 302) received at the client 302 with respect to a client-side GUI object presented at the client 302 (e.g., display coupled to the client 302). For example, the client-side GUI object may be a GUI button that receives a button push and a two-finger swipe gesture. At step 2812, the client-side communication module 2618 may transmit to the remote server (e.g., to the ASP system 310) the second object data.

Figure 29:
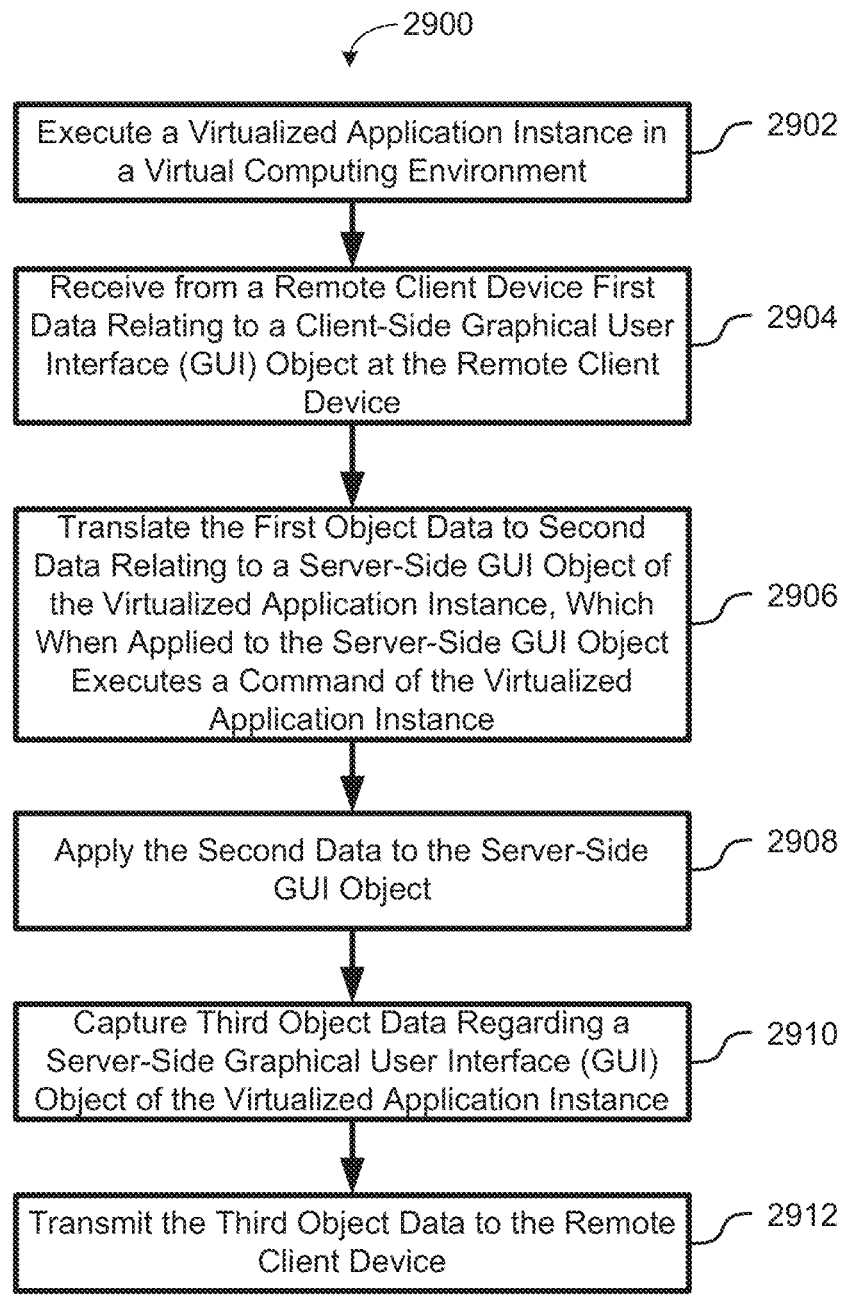
FIG. 29 is flowchart illustrating an exemplary method for server-side graphical user interface (GUI) interaction in accordance with various embodiments.

FIG. 29 is flowchart 2900 illustrating an exemplary method for server-side graphical user interface (GUI) interaction in accordance with various embodiments. For some embodiments, the method presented by the flowchart 2900 may be implemented using various components of the APS 320 of FIG. 27, as described below. For example, the method may begin at step 2902 with the virtualization module 2702 executing a virtualized application instance (based on a version of the application) in a virtual computing environment (e.g., using a cloud-based service, such as SaaS, IaaS, or PaaS). In accordance with some embodiments, each virtualization may be performed in a sandbox (e.g., the sandbox 2720). At step 2904, the server-side object communication module 2728 may receive first data relating to a client-side graphical user interface (GUI) object at the remote client device (e.g., the client 302). Various embodiments may involve a variety of GUI objects on the client-side including, for example, a text box, a dialog box, a button, a drop down box, a toolbar, a toolbar item, a menu, a menu item, a radio option, or a check box. Those skilled in the art will appreciate that other GUI objects may be utilized by some embodiments.

For some embodiments, the first data may comprise a set of user interactions with respect to the GUI object. As noted herein, the set of user interactions may include such input events as, for example, keyboard events, mouse events, and gesture events (e.g., through a touch-enabled display coupled to the client 302) received at the client 302 with respect to a client-side GUI object presented at the client 302 (e.g., display coupled to the client 302).

At step 2906, the APS 320 may utilize a translation module to translate the first object data to second data relating to a server-side GUI object of the virtualized application instance, where the second data when applied to the server-side GUI object executes a command of the virtualized application instance. Various embodiments may involve a variety of GUI objects on the server-side including, for example, a text box, a dialog box, a button, a drop down box, a toolbar, a toolbar item, a menu, a menu item, a radio option, or a check box. Those skilled in the art will appreciate that other GUI objects may be utilized by some embodiments.

For some embodiments, the second data may comprise a set of user interactions to be applied to the server-side GUI object. As with the first object data, the set of user interactions of the second data may comprise such input events as, for example, keyboard events, mouse events, and gesture events (e.g., through a touch-enabled display coupled to the client 302). The set of input events of the second object data may be those to be performed with respect to the server-side GUI object when the server-side GUI object is synchronized with the client-side object. The set of user interacts of the second data may be different from those of the first data, and may be compatible with the server-side GUI object. For example, where the client-side GUI object is a menu bar, and the first data comprises selecting a menu item and a menu sub-item on the menu baron the client 302, the translation module may translate the first data to a second data comprising a selection on a toolbar (e.g., server-side GUI object) of the virtualized application instance.

At step 2908, the user interaction translation module 2730 may apply the second data to the server-side GUI object. As noted herein, the second data may be such that the application of the second data to the server-side GUI object executes a command of the virtualized application instance. For some embodiments, the application of the second data to the GUI object of the virtualized application instance may comprise performing the second set of user interactions with respect to the client-side GUI object.

At step 2910, the application capture module 2726 may capture second data regarding an application object of the virtualized application instance. For example, where the server-side GUI object is a toggle toolbar button, the application capture module 2726 may capture context data regarding that toggle toolbar button (e.g., determine its toggle state) and provide that context data as third data. At step 2912, the server-side communication module 2728 may transmit the third data to the remote client device (e.g., the client 302).

Those skilled in the art will appreciate that various embodiments do not require that the client-side GUI object be similar to the server-side GUI object. The method of the flowchart 2900 may translate the first data to the second data even when the client-side GUI object and the server-side GUI object are different GUI types.

FIGS. 30A-30D are a set of flow diagrams illustrating object-based interaction between an exemplary client, specifically the client 302, and an exemplary application server, the APS 320, in accordance with various embodiments. For FIGS. 30A-30D, the client module 1702 of the client 302 may be operating a client-native application 3006, which may be configured to provide a user at the client 302 with access to a virtualized application instance provided by the APS 320. The virtualization module 1802 of the APS 320 may be executing the virtualized application instance on behalf of/for the benefit of the client 302. While the client 302 of FIGS. 30A-30D may be similar (e.g., in form, function, and/or composition) to the client 302 of FIG. 17, the APS 320 of FIGS. 30A-30D may be similar (e.g., in form, function, and/or composition) to the APS 320 of FIG. 18. Typically, the virtualized application instance is compatible with operating on one or more application objects, where at least one application object may capable of being embedded into a document (e.g., content of a document) accessible by the virtualized application instance. Examples of applications operable with application objects may include word processing applications, spreadsheet applications, presentation application, media editing applications, and the like.

As noted herein, in some embodiments, a virtualized application instance may be executed to avoid the rendering and production of such output. For example, a virtualized application instance may be executed by the virtualization module 1802 such that in place of the rendered graphical output, the virtualization module 1802 produces sufficient data that allows the client 302 to render graphical output of the virtualized module 1802 at the client 302. In such instances, the virtualization module 1802 may generate non-rendered graphical data that can be transmitted to the client 302 for subsequent rendering and display by the client 302.

Figure 30A:
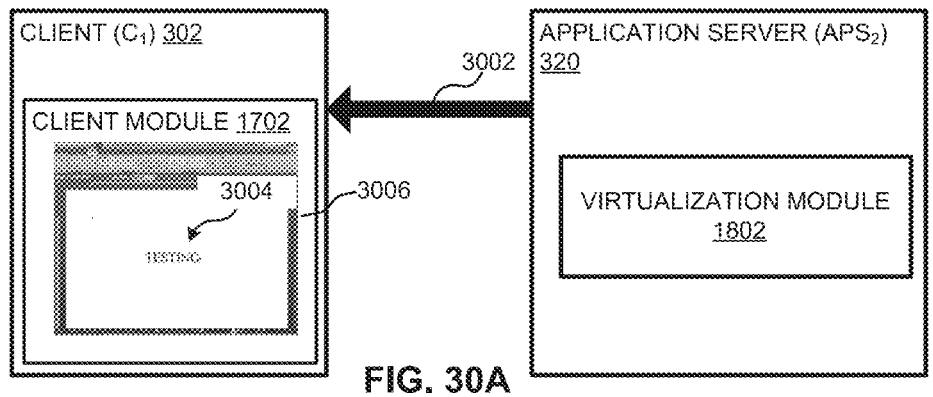
FIGS. 30A-30D are a set of flow diagrams illustrating object-based interaction between an exemplary client and an exemplary application server in accordance with various embodiments.

As illustrated in FIG. 30A, the virtualized application instance may be executing at the APS 320 (e.g., under the operation of the virtualized module 1802) but may not be graphically rendered at the APS 320 as it executes. The virtualized application instance may be executing at permit textual content (hereinafter, the "server-side textual content object") to be entered into a document being presently accessed (e.g., currently open) by the virtualized application instance. The virtualization module 1802 may be utilized to operate the virtualized application instance. In accordance with some embodiments, the entry of the textual content object into the document content (e.g., according to instructions received from the client 302) may result in the APS 320 generating data 3002 that is sent to the client 302 and would allow the client 302 to graphically render and present the as a rendered textual content object 3004.

Figure 30B:
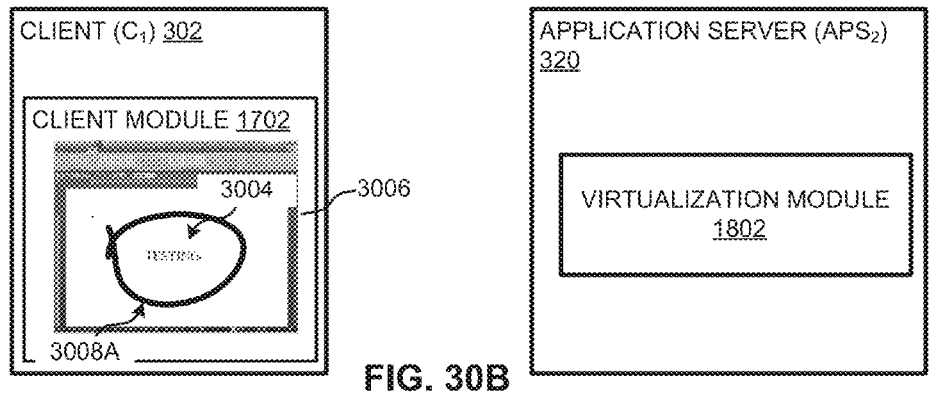
Figure 30C:
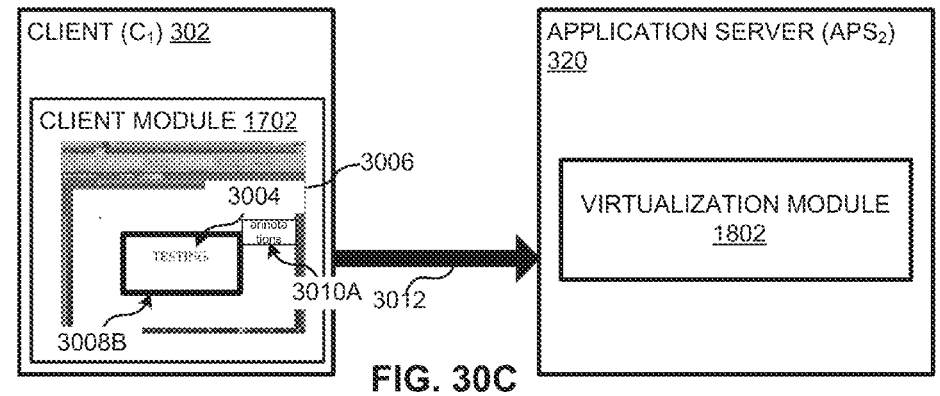
Figure 30D:
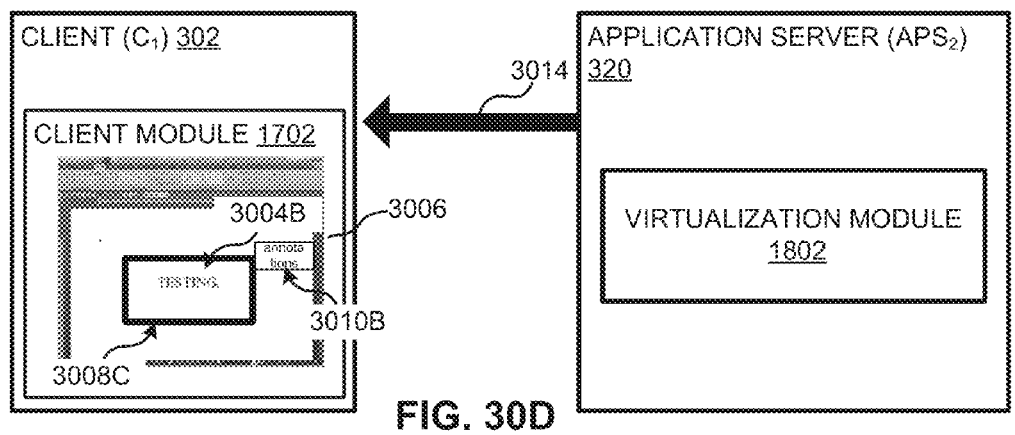

Subsequently, a user at the client 302 may mark, annotate, or draw on or around the rendered textual content object 3004 (e.g., with a circle, square, triangle, or the like), which can be detected by the client 302 and replaced with pre-defined client-side objects that correspond to application objects. For example, as shown in FIG. 30B, a user may draw a circle 3008A around the rendered textual content object 3004 at the client 302, which the client 302 (e.g., the client module 1702) may recognize and replace with a predefined a client-side rectangular graphic object 3008B, as shown in FIG. 30C. The circle 3008A shown in FIG. 30B may be entered, for example, through a user's gesture input (e.g., recognized by the gesture input module 1712) at a touch-enabled display coupled to the client 302. The client 302 (e.g., the client module 1702) may detect the creation of the circle 3008A, and as a result render the client-side rectangular graphic object 3008B in place of the circle 3008A. The client-side rectangular graphic 3008B may further include an associated client-side annotation 3010 that is fillable and/or viewable by the users. Those skilled in the art will appreciate that various embodiments may be configured to recognize and replace any number of markings, annotations, or drawings with a predefined client-side object.

As shown in FIG. 30C, once the client-side rectangular graphic object 3008B and replaces the user-drawn circle 3008A and the client-side annotation 3010 is presented, the client 302 may send to the APS 320 object data 3012 relating to the client-side rectangular graphic object 3008B and the client-side annotation 3010. Upon receiving the object data 3012, the APS 320 may create similar objects, in the virtualize application, a server-side rectangular graphic object and a server-side annotation that respectively correspond to the client-side rectangular graphic object 3008B and the client-side annotation 3010.

As shown, once the client 302 transmits the object data 3014 to the APS 320, the client 302 may generate data 3014 that is sent to the client 302 and would allow the client 302 to graphically render and present the server-side rectangular graphic object and the server-side annotation, created at the APS 320, as a client-side rendered rectangular graphic object 3008C and a client-side rendered annotation 3010B.

The invention claimed is:

1. A system comprising:
one or more processors; and
a memory accessible to the one or more processors, the memory storing instructions executable by the one or more processors to:
execute a virtualized application instance in a virtual computing environment, the virtualized application instance comprising a server-side graphical user interface (GUI) object;
receive from a remote client device first object data relating to a first set of user interactions received at a client-side GUI object at the remote client device, the client-side GUI object corresponding to the server-side GUI object of the virtualized application instance, and the first set of user interactions comprising a gesture input compatible with the client-side GUI object, wherein the gesture input is not natively compatible with the virtualized application instance;
convert the gesture input to a set of input events that are compatible with the virtualized application instance;
provide second object data based on the first object data and the set of input events, the second object data relating to the server-side GUI object, and the second object data executing a command when applied to the server-side GUI object of the virtualized application instance; and
synchronize the server-side GUI object with the client-side GUI object by applying the second object data to the server-side GUI object of the virtualized application instance.

2. The system of claim 1, the second object data comprising a second set of user interactions intended for the server-side GUI object of the virtualized application instance.

3. The system of claim 2, the application of the second object data to the server-side GUI object of the virtualized application instance comprising performing the second set of user interactions with respect to the client-side GUI object.

4. The system of claim 1, wherein the memory further stores instructions executable by the one or more processors to:
capture context data for the server-side GUI object of the virtualized application instance, and to transmit the context data to the remote client device as third object data.

5. The system of claim 4, the context data comprising information regarding a current graphical representation of the server-side GUI object of the virtualized application instance.

6. The system of claim 1, the client-side GUI object or the server-side GUI object of the virtualized application instance being a text box, a dialog box, a button, a drop down box, a toolbar, a toolbar item, a menu, a menu item, a radio option, or a check box.

7. A system comprising:
one or more processors; and
a memory accessible to the one or more processors, the memory storing instructions executable by the one or more processors to:
control a virtualized application instance operating in a virtual computing environment on a remote server;
receive from a remote client device a set of user interactions with respect to a client-side graphical user interface (GUI) object, the set of user interactions comprising a gesture input compatible with the client-side GUI object, and the client-side GUI object corresponding to a server-side GUI object of the virtualized application instance, wherein the gesture input is not natively compatible with the virtualized application instance;
convert the gesture input to a set of input events that are compatible with the virtualized application instance;
provide first object data relating to the set of user interactions received with respect to the client-side GUI object;
synchronize the client-side GUI object with the server-side GUI object of the virtualized application instance based on second object data relating to the server-side GUI object of the virtualized application instance, and the second object data being provided based on the first object data and the set of input events;
transmit to the remote server the first object data; and
receive from the remote server the second object data.

8. The system of claim 7, the second object data comprising context data relating to the server-side GUI object of the virtualized application instance.

9. The system of claim 7, the synchronization of the client-side GUI object with the server-side GUI object of the virtualized application instance comprising:
updating a current graphical representation of the client-side GUI object according to a current graphical representation of the server-side GUI object of the virtualized application instance based on the second object data.

10. The system of claim 7, the client-side GUI object or the server-side GUI object of the virtualized application instance being a text box, a dialog box, a button, a drop down box, a toolbar, a toolbar item, a menu, a menu item, a radio option, or a check box.

11. A method comprising:
executing a virtualized application instance based on a version of the application in a virtual computing environment;
receiving from a remote client device first object data relating to a first set of user interactions received at the remote client device with respect to a client-side graphical use interface (GUI) object at the remote client device, the first set of user interactions comprising a gesture input compatible with the client-side GUI object, and the client-side GUI object representing a server-side GUI object of the virtualized application instance, wherein the gesture input is not natively compatible with the virtualized application instance;
converting the gesture input to a set of input events that are compatible with the virtualized application instance;
translating the first object data to second object data relating to the server-side GUI object of the virtualized application instance, the second object data executing a command when applied to the server-side GUI object of the virtualized application instance based on the set of input events; and
synchronizing the server-side GUI object of the virtualized application instance with the client-side GUI object by applying the second object data to the server-side GUI object of the virtualized application instance.

12. The method of claim 11, the second object data comprising a second set of user interactions with respect to the server-side GUI object.

13. The method of claim 12, the application of the second object data to the server-side GUI object of the virtualized application instance comprising:
performing the second set of user interactions with respect to the set of server-side GUI elements.

14. The method of claim 11, further comprising:
capturing context data for the server-side GUI object of the virtualized application instance; and
transmitting the context data to the remote client device as third object data.

15. The method of claim 14, the context data comprising information regarding a current graphical representation of the server-side GUI object of the virtualized application instance.

16. The method of claim 11, the client-side GUI object being a text box, a dialog box, a button, a drop down box, a toolbar, a toolbar item, a menu, a menu item, a radio option, or a check box.

17. A system comprising:
one or more processors; and
a memory accessible to the one or more processors, the memory storing instructions executable by the one or more processors to:
execute a virtualized application instance based on a version of the application in a virtual computing environment;
receive from the remote client device first object data relating to a first set of user interactions received at the remote client device with respect to a client-side graphical use interface (GUI) object at the remote client device, the first set of user interactions comprising a gesture input compatible with the client-side GUI object, and the client-side GUI object representing a server-side GUI object of the virtualized application instance, wherein the gesture input is not natively compatible with the virtualized application instance;
convert the gesture input to a set of input events that are compatible with the virtualized application instance;
provide second object data based on the first object data and the set of input events, the second object data relating to the server-side GUI object of the virtualized application instance, and the second object data executing a command when applied to the server-side GUI object of the virtualized application instance; and
synchronize the server-side GUI object of the virtualized application instance with the client-side GUI object by applying the second object data to the server-side GUI object of the virtualized application instance.

18. A method comprising:
presenting a virtualized application instance operating in a virtual computing environment on a remote server;
receiving from a remote client device a set of user interactions with respect to a client-side graphical user interface (GUI) object, the set of user interactions comprising a gesture input compatible with the client-side GUI object, and the client-side GUI object representing a server-side GUI object of the virtualized application instance, wherein the gesture input is not natively compatible with the virtualized application instance;
converting the gesture input to a set of input events that are compatible with the virtualized application instance;
providing first object data relating to the set of user interactions received with respect to the client-side GUI object;
transmitting to the remote server the first object data;
receiving from the remote server the second object data; and
synchronizing the client-side GUI object with the server-side GUI object of the virtualized application instance based on second object data and the set of input events relating to the server-side GUI object of the virtualized application instance.

19. The method of claim 18, the second object data comprising context data relating to the server-side GUI object of the virtualized application instance.

20. The method of claim 18, the synchronization of the client-side GUI object with the server-side GUI object of the virtualized application instance comprising updating a current graphical representation of the client-side GUI object according to a current graphical representation of the server-side GUI object of the virtualized application instance based on the second object data.

21. The method of claim 18, the client-side GUI object being a text box, a dialog box, a button, a drop down box, a toolbar, a toolbar item, a menu, a menu item, a radio option, or a check box.

22. A system comprising:
one or more processors; and
a memory accessible to the one or more processors, the memory storing instructions executable by the one or more processors to:
present a virtualized application instance operating in a virtual computing environment on a remote server;
receive from a remote client device a set of user interactions with respect to a client-side graphical user interface (GUI) object, the set of user interaction comprising a gesture input compatible with the client-side GUI object, and the client-side GUI object representing a server-side GUI object of the virtualized application instance, wherein the gesture input is not natively compatible with the virtualized application instance;

convert the gesture input to a set of input events that are compatible with the virtualized application instance;

provide first object data relating to the set of user interactions received with respect to the client-side GUI object;

transmit to the remote server the first object data;

receive from the remote server the second object data; and synchronize the client-side GUI object with the server-side GUI object of the virtualized application instance based on second object data and the set of input events relating to the server-side GUI object of the virtualized application instance.

* * * * *